United States Patent
Hori et al.

(10) Patent No.: US 7,365,934 B2
(45) Date of Patent: Apr. 29, 2008

(54) MEDIA CARTRIDGE AUTOLOADER

(75) Inventors: Kenichi Hori, Tama (JP); Paddy Eliot Collins, Colorado Springs, CO (US)

(73) Assignees: Mitsumi Electric Co., Ltd., Tokyo (JP); Quantum Corporation, San Jose, CA (US)

( * ) Notice: Subject to any disclaimer, the term of this patent is extended or adjusted under 35 U.S.C. 154(b) by 350 days.

(21) Appl. No.: 11/273,743

(22) Filed: Nov. 15, 2005

(65) Prior Publication Data

US 2007/0047135 A1 Mar. 1, 2007

(30) Foreign Application Priority Data

Aug. 26, 2005 (JP) .............................. 2005-246541

(51) Int. Cl.
*G11B 15/68* (2006.01)
(52) U.S. Cl. ....................................................... 360/92
(58) Field of Classification Search .................. 360/92, 360/98.04; 369/30.72, 30.39, 30.45
See application file for complete search history.

(56) References Cited

U.S. PATENT DOCUMENTS 7,158,341 B2 * 1/2007 Taki et al. ..................... 360/92

| | | | |
|---|---|---|---|
| 2003/0095355 A1* | 5/2003 | Shimanuki | 360/92 |
| 2003/0117744 A1* | 6/2003 | Tanaka | 360/92 |
| 2004/0008445 A1* | 1/2004 | Vanderheyden | 360/92 |
| 2005/0162775 A1* | 7/2005 | Ojima et al. | 360/92 |
| 2005/0207058 A1* | 9/2005 | Taki et al. | 360/92 |

FOREIGN PATENT DOCUMENTS

JP 2003 115146 4/2003

* cited by examiner

*Primary Examiner*—Allen Cao
(74) *Attorney, Agent, or Firm*—Ladas & Parry LLP

(57) ABSTRACT

A media cartridge autoloader is disclosed that includes a main module having a rotation transmission path forming device and one or more media cartridge transport magazines. The rotation transmission path forming device can include a drive shaft unit, a drive shaft unit shifting mechanism, and a magazine drive motor module. A mechanism that rotates a turntable of a media cartridge picker can be used to move and selectively couple the drive shaft unit with one or more of the media cartridge transport magazines. A drive shaft of the drive shaft unit can be driven by a magazine drive motor of the magazine drive motor module, so that the coupled magazine is driven. This magazine drive motor can also release one or more of the media cartridge transport magazines from the engagement with one or more magazine locking mechanisms of the main module.

22 Claims, 49 Drawing Sheets

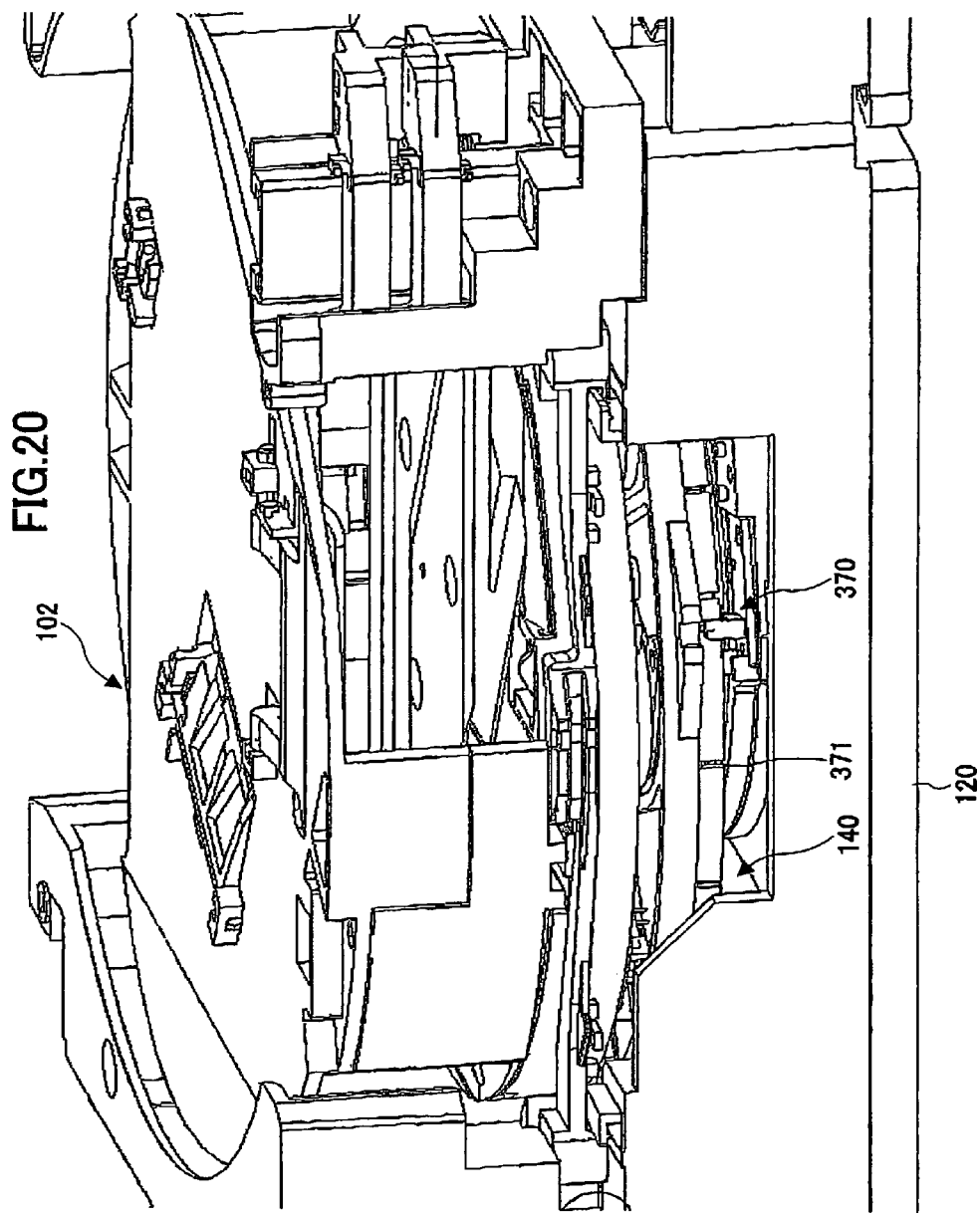

FIG.23

| ROTATING ANGLE | FIG. | GEAR MESHING | OPERATIONS |
|---|---|---|---|
| -90 | Figs. 21B, 35, 36 | 313X2→391Y2 | MAGAZINE 104 DRIVEN |
| -30 | Figs. 22B, 26, 27 | 318X1→500 | DOOR LOCK RELEASED |
| -15 | Figs. 22A, 24, 25 | 318X1→550X1 | LOCK OF MAGAZINE 103 RELEASED |
| 0 | Figs. 21A, 16 | | |
| 15 | Figs. 22C, 28, 29 | 318X2→550X2 | LOCK OF MAGAZINE 104 RELEASED |
| 30 | | | |
| 90 | Figs. 21C | 313X1→391Y2-1 | MAGAZINE 103 DRIVEN |

(+ CLOCKWISE DIRECTION)
(− COUNTERCLOCKWISE DIRECTION)

MEDIA CARTRIDGE AUTOLOADER

BACKGROUND OF THE INVENTION

1. Field of the Invention

The present invention generally relates to a media cartridge autoloader, and particularly relates to a mechanism that selectively moves either one of first or second media cartridge transport magazines in a media cartridge autoloader serving as a data storage device.

2. Description of the Related Art

A typical media cartridge autoloader includes a media cartridge picker, a mail slot, a read/write media drive, and one or more media cartridge transport magazines.

The media cartridge picker is configured to transport a media cartridge among the mail slot, the media drive, and the media cartridge transport magazines.

The media cartridge transport magazines each comprises plural media cartridge containers that store the media cartridges therein.

To store many media cartridges, a plurality of the media cartridge transport magazines can be used.

SUMMARY OF THE INVENTION

According to one aspect of the present invention, there is provided a media cartridge autoloader that meets the above-described demand.

According to one aspect of the present invention, there is provided a media cartridge autoloader comprising a main module, a media drive that receives a media cartridge, and first and second tape cartridge transport magazines that transportably store the media cartridge. The main module includes (i) a media cartridge picker that transports the media cartridge between the media drive and the first and second media cartridge transport magazines, (ii) a magazine drive motor that drives the first and second media cartridge transport magazines, (iii) a first magazine locking mechanism that includes a first locking member to engage the first media cartridge transport magazine, (iv) a second magazine locking mechanism that includes a second locking member to engage the second media cartridge transport magazine, and (v) a rotation transmission path forming unit that selectively transmits a rotational force of the magazine drive motor to one of the first media cartridge transport magazine, the second media cartridge transport magazine, the first magazine locking mechanism, and the second magazine locking mechanism, in accordance with a command. One of the first and second magazine locking members is selectively moved with the rotational force of the magazine drive motor transmitted by the rotation transmission path forming unit so as to disengage the corresponding first or second media cartridge transport magazine. In another embodiment, the media cartridge autoloader does not include a second media cartridge transport magazine.

In one embodiment, the single magazine drive motor drives both the first and second media cartridge transport magazines. This magazine drive motor also releases the first and second media cartridge transport magazines from the engagement with the first and second magazine locking mechanisms. Accordingly, there is no need to separately provide a motor for the first media cartridge transport magazine, a motor for the second media cartridge transport magazine, and drive sources, such as electromagnetic plungers, for the engagement releasing operations of the first and second magazine locking mechanisms. It is therefore possible to reduce the production cost of the media cartridge autoloader.

BRIEF DESCRIPTION OF THE DRAWINGS

FIG. 20 shows a photo sensor for detecting the rotation angle of the turntable;

FIG. 23 is a table showing relationships between the rotating angle of the turntable and formation of rotation transmission paths;

DETAILED DESCRIPTION OF TEE PREFERRED EMBODIMENT

An exemplary embodiment of the present invention is described hereinafter with reference to the accompanying drawings.

First Embodiment

The description of a first embodiment includes the following:

1. Configuration and Operations Overview of Tape Cartridge Autoloader 100
2. Configuration of Main Module 110
3. Configuration and Operations of Tape Cartridge Picker 102
4. Configuration of Rotation Transmission Path Forming Device 300
    4-1. Configuration of Drive Shaft Unit 301
    4-2. Configuration of Drive Shaft Unit Shifting Mechanism 320
    4-3. Configuration of Magazine Drive Motor Module 330
    4-4. Arrangement of Swing Pinions 318X1, 318X2, and Rack Sections 500, 550X1, 550X2
    4-5. Relations among Rotating Angle of Turntable 140, Moving Distance of Drive Shaft Unit 301, and Rack Sections 500, 550X1, 550X2
5. Overview of Power Transmission Paths from Drive Shaft Unit 301 to Magazines 103, 104, Door Locking Mechanism 345, and Magazine Locking Mechanisms 600X1, 600X2
6. Configuration of Tape Cartridge Transport Magazines 103, 104
7. Operations for Selectively Driving Tape Cartridge Transport Magazines 103, 104
8. Configuration of Mail Slot Module 340
9. Door Lock Releasing Operations by Mail Slot Module
10. Tape Cartridge Transport Magazine Locking Mechanism
11. Operations for Releasing Lock of Tape Cartridge Transport Magazine
    11-1. Lock Releasing Operations by Transport Magazine Locking Mechanism 600X1
    11-2. Lock Releasing Operations by Transport Magazine Locking Mechanism 600X2
12. Operations of Microcomputer of Motor Control Circuit 410
13. Emergency Operations for Releasing Lock of Tape Cartridge Transport Magazine 1 [Configuration and Operations Overview of Tape Cartridge Autoloader 100]

Figure 1:
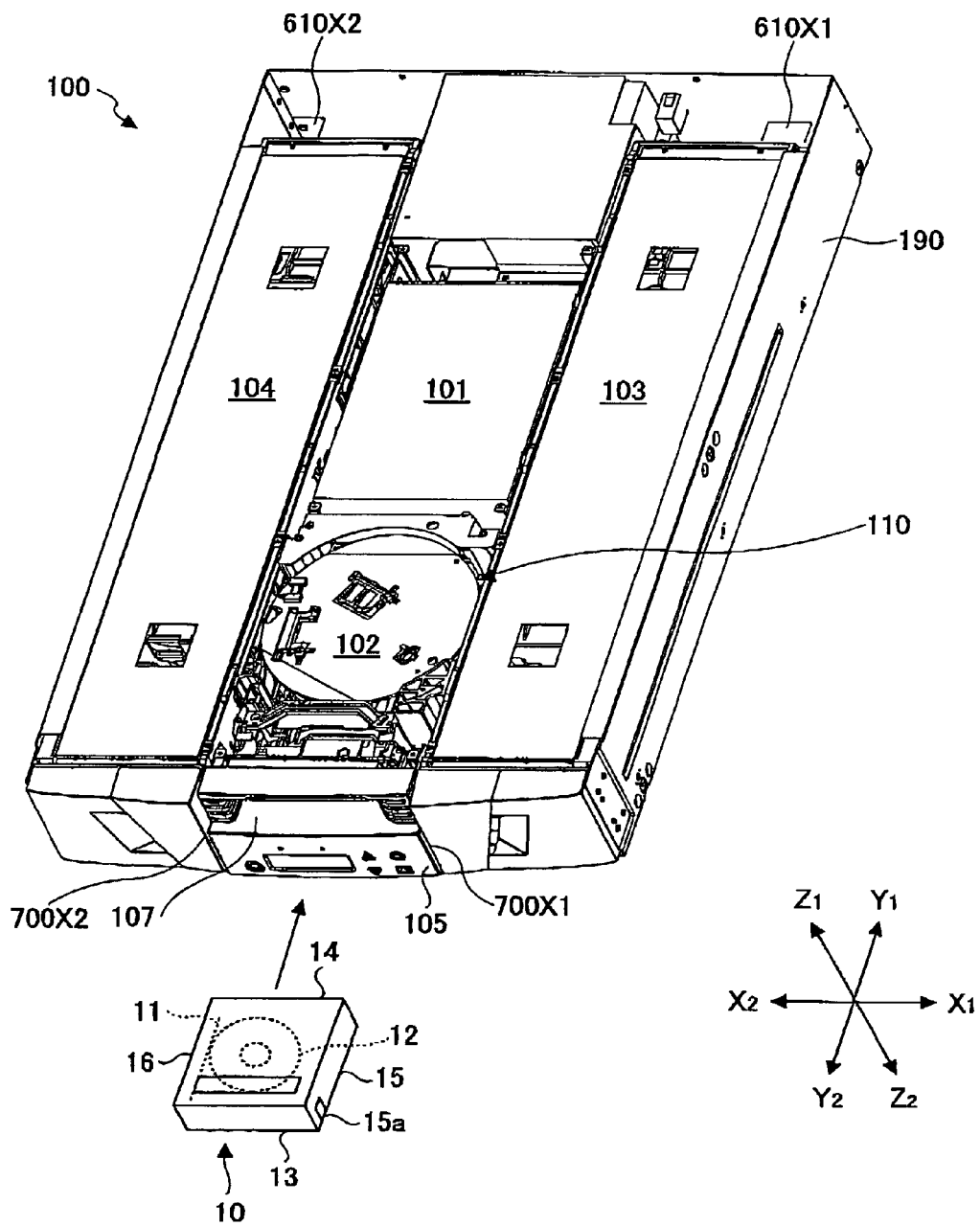
FIG. 1 is a perspective view illustrating a media cartridge autoloader with an upper cover thereof removed according to a first embodiment of the present invention.

FIG. 1 is a perspective view illustrating a tape cartridge autoloader 100 with an upper cover thereof removed according to the first embodiment of the present invention. In the embodiments illustrated in the figures, the media cartridge autoloader is used with one or more tape cartridges, and is therefore referred to as a tape cartridge autoloader. It is recognized, however, that although the following description and the figures provided herein pertain particularly to an autoloader used for tape cartridges, any other suitable type of media cartridge can equally be used with the present invention, such as an optical disk cartridge, as one non-exclusive example. The embodiments disclosed herein are not intended to limit the scope of the present invention in any manner to use with tape cartridges or any other particular type of media. In other words, it is understood that the term "tape" as used herein can equally be substituted for the term "media".

Figure 2:
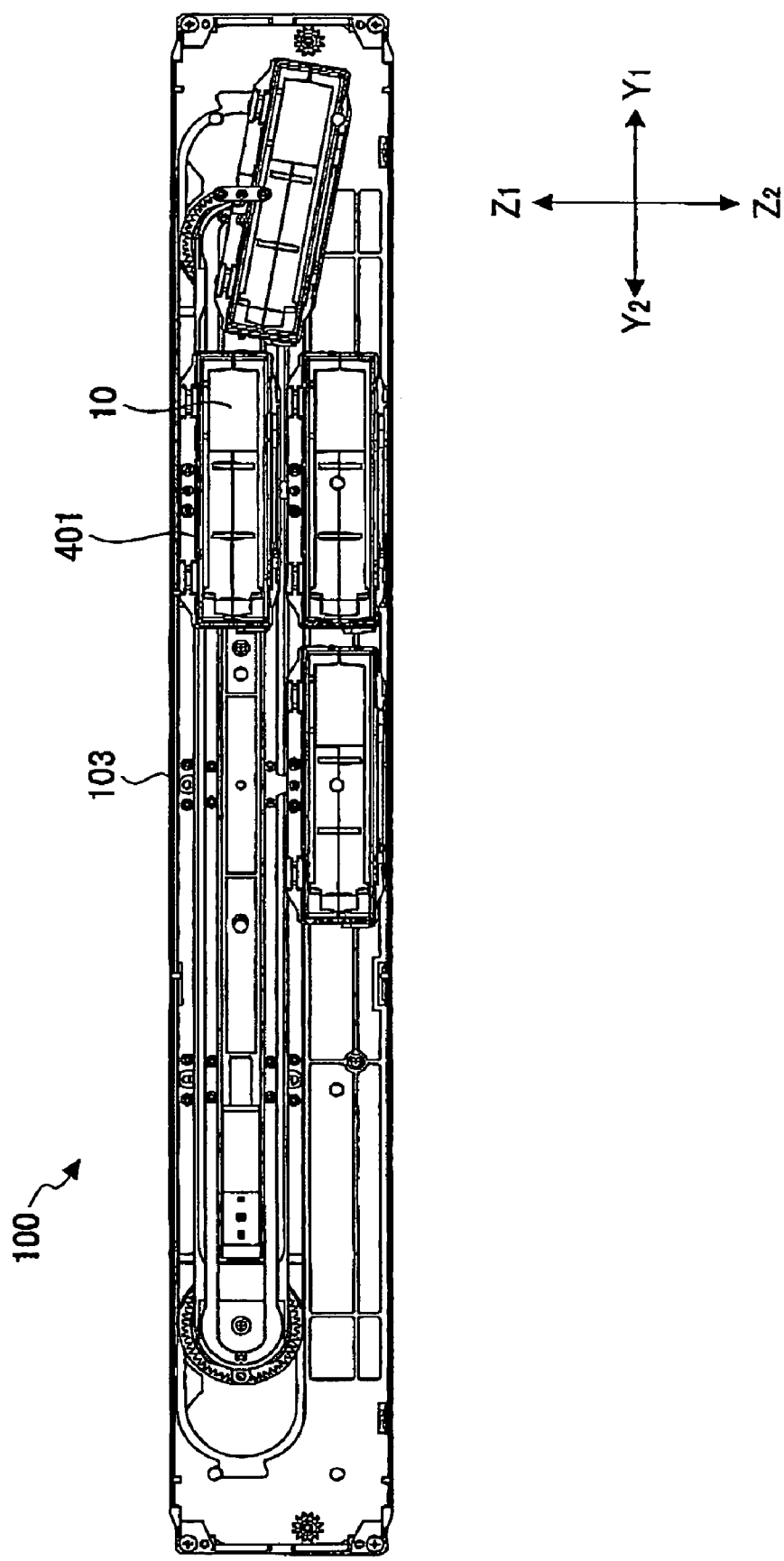
FIG. 2 is a side view illustrating the media cartridge autoloader of FIG. 1 with a side cover thereof removed.

FIG. 2 is a side view illustrating the tape cartridge autoloader 100 with a side cover thereof removed. Throughout the drawings, the width direction is indicated by a line X1-X2, the depth direction is indicated by a line Y1-Y2, and the height direction is indicated by a line Z1-Z2.

The tape cartridge autoloader 100 generally comprises a metal frame 190, a control panel 105 and a mail slot 107 both on a front panel, a main module 110 including a tape cartridge picker 102 at a position opposing the mail slot 107, a read/write tape drive 101 disposed at the Y1 side of the main module 110, and tape cartridge transport magazines 103 and 104 disposed at the X1 side and the X2 side of the main module 110. The tape cartridge transport magazines 103 and 104 are inserted toward the Y1 side from the front panel side and removably attached on opposing sides of the frame 190. In an alternative embodiment, the tape cartridge transport magazines 103, 104 can be positioned to have a different orientation relative to one another and/or to the main module 110. In one non-exclusive alternative embodiment, for example, although the tape cartridge transport magazines 103, 104 are shown to be generally parallel to one another in FIG. 1, they can be positioned in a substantially non-parallel orientation. It is understood that as used herein, either tape cartridge transport magazine 103, 104 can be the first tape cartridge transport magazine or the second tape cartridge transport magazine. The tape cartridge autoloader 100 can be mounted in a rack by, for example, fixing four corners of the frame 190 to poles of the rack.

In certain embodiments, the tape cartridge autoloader 100 is designed such that operations of the tape cartridge picker 102 do not coincide, in terms of time, with operations of the tape cartridge transport magazine 103, 104, operations for releasing door lock of the mail slot 107, and operations for releasing lock of the tape cartridge transport magazines 103, 104.

A tape cartridge 10 is used in the tape cartridge autoloader 100. Referring to FIG. 1, the tape cartridge 10 includes a magnetic tape 11 wound on a reel 12 therein such that the magnetic tape 11 is pulled out from a rear face of the tape cartridge 10. The tape cartridge 10 includes a front face 13, a rear face 14, side faces 15 and 16, and a notch 15a formed on the side face 15 which a cartridge pin 213 (FIG. 9, described below) engages.

The tape cartridge transport magazines 103 and 104 are each configured to store plural tape cartridges 10 in an orientation in which the front faces 13 oppose the tape cartridge picker 102. Each of the tape cartridge transport magazines 103 and 104 is also configured to transport the tape cartridges 10 along a racetrack path elongated in the Y1-Y2 direction, as illustrated in FIG. 2.

The tape drive 101 is operable to read and/or write data from or to the magnetic tape 11 pulled out from the loaded tape cartridge 10. The tape drive 101 includes a tape cartridge ejecting mechanism (not shown). Plural types of tape drives with different heights are available so that one drive is selected from them and attached to the tape cartridge autoloader 100. For this operation, the tape cartridge picker 102 is provided with a turntable lifting mechanism 150 (described below).

Figure 3:
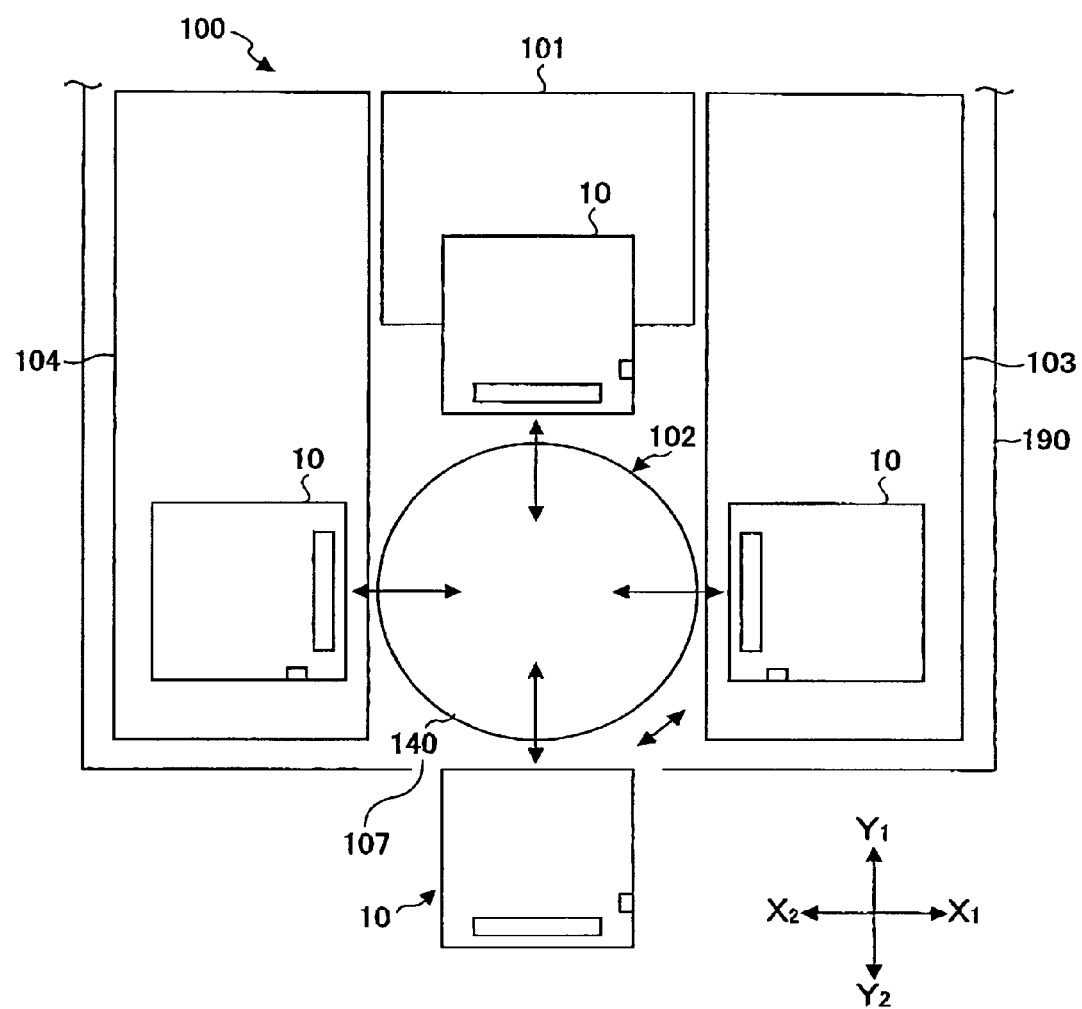
FIG. 3 is a schematic illustration showing operations of a media cartridge picker.

Referring to FIG. 3, the tape cartridge picker 102 is configured to transport the tape cartridge 10 onto or off of a turntable 140 for operations such as loading the tape cartridge 10 inserted through the mail slot 107 onto the tape drive 101, retrieving the tape cartridge 10 from the tape cartridge transport magazines 103 and 104 to load the tape cartridge 10 onto the tape drive 101, retrieving the tape cartridge 10 from the tape drive 101 to return the tape cartridge 10 to the tape cartridge transport magazines 103 or 104, and ejecting the tape cartridge 10 through the mail slot 107. The tape cartridge picker 102 is also configured to rotate the turntable 140 by a predetermined rotational increment, such as by approximately 90-degree increments, although the rotational interval can vary depending upon the design requirements of the autoloader 100. The tape cartridge picker 102 can also lift/lower the turntable 140. When the turntable 140 is rotated, the orientation of the tape cartridge 10 is changed.

Figure 4:
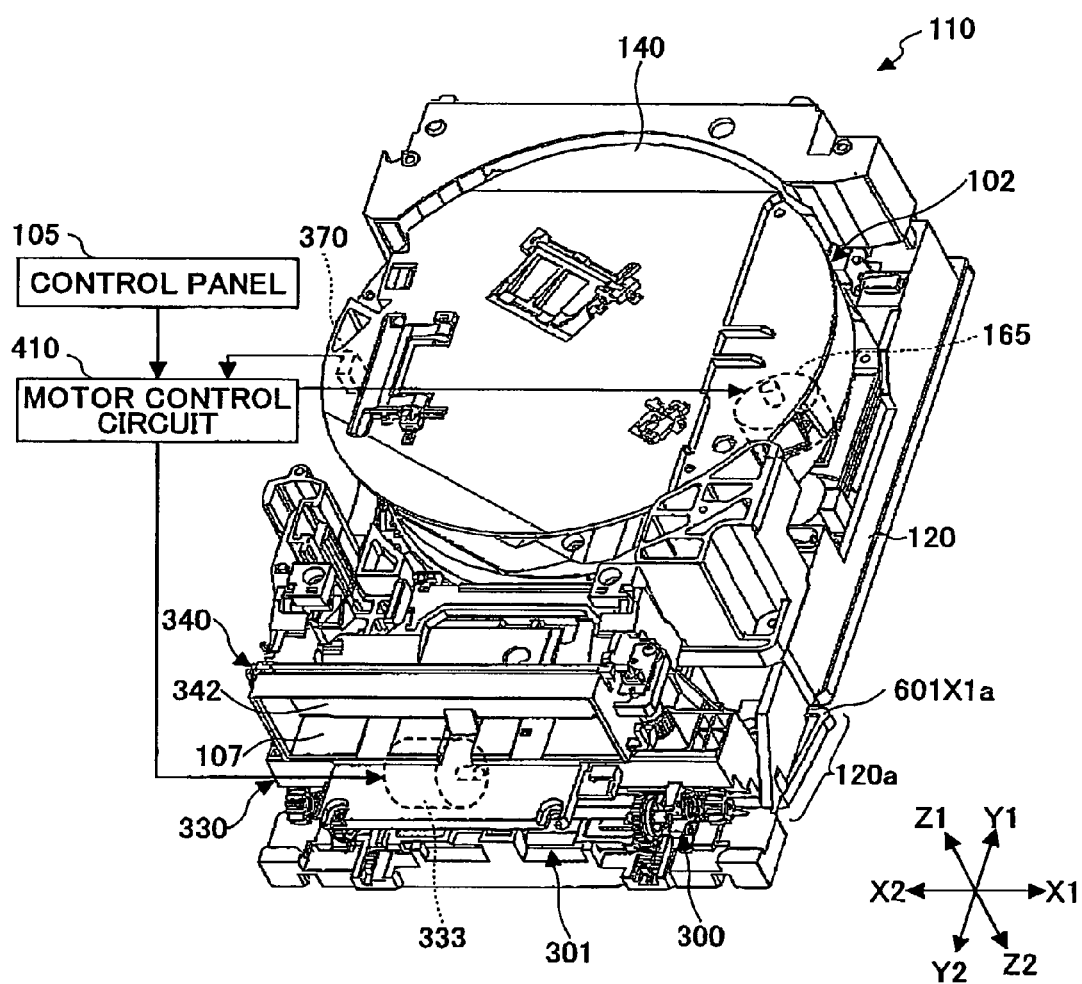
FIG. 4 is a perspective view illustrating a main module.
Figure 5:
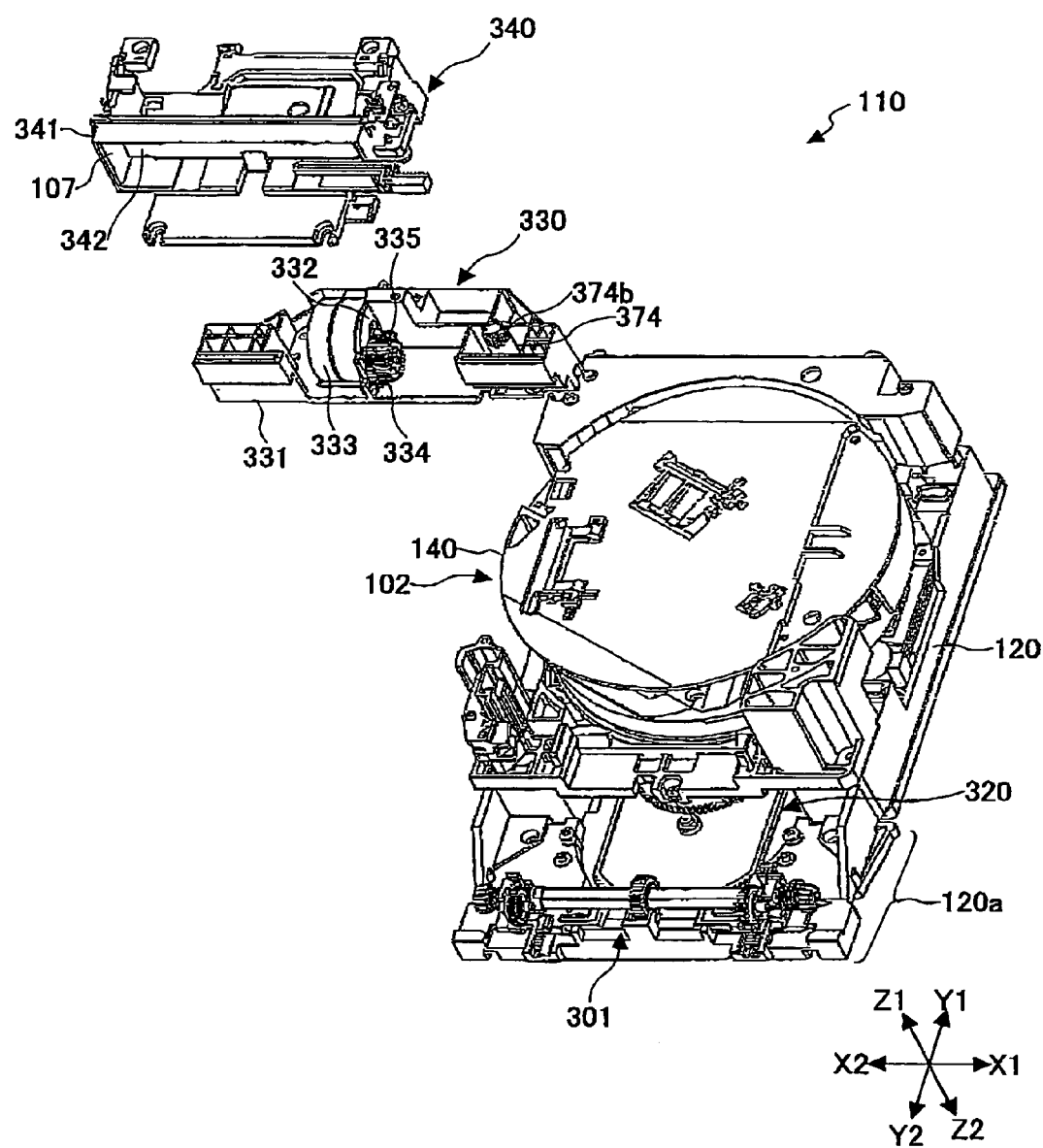
FIG. 5 is an exploded view illustrating the main module.
Figure 6:
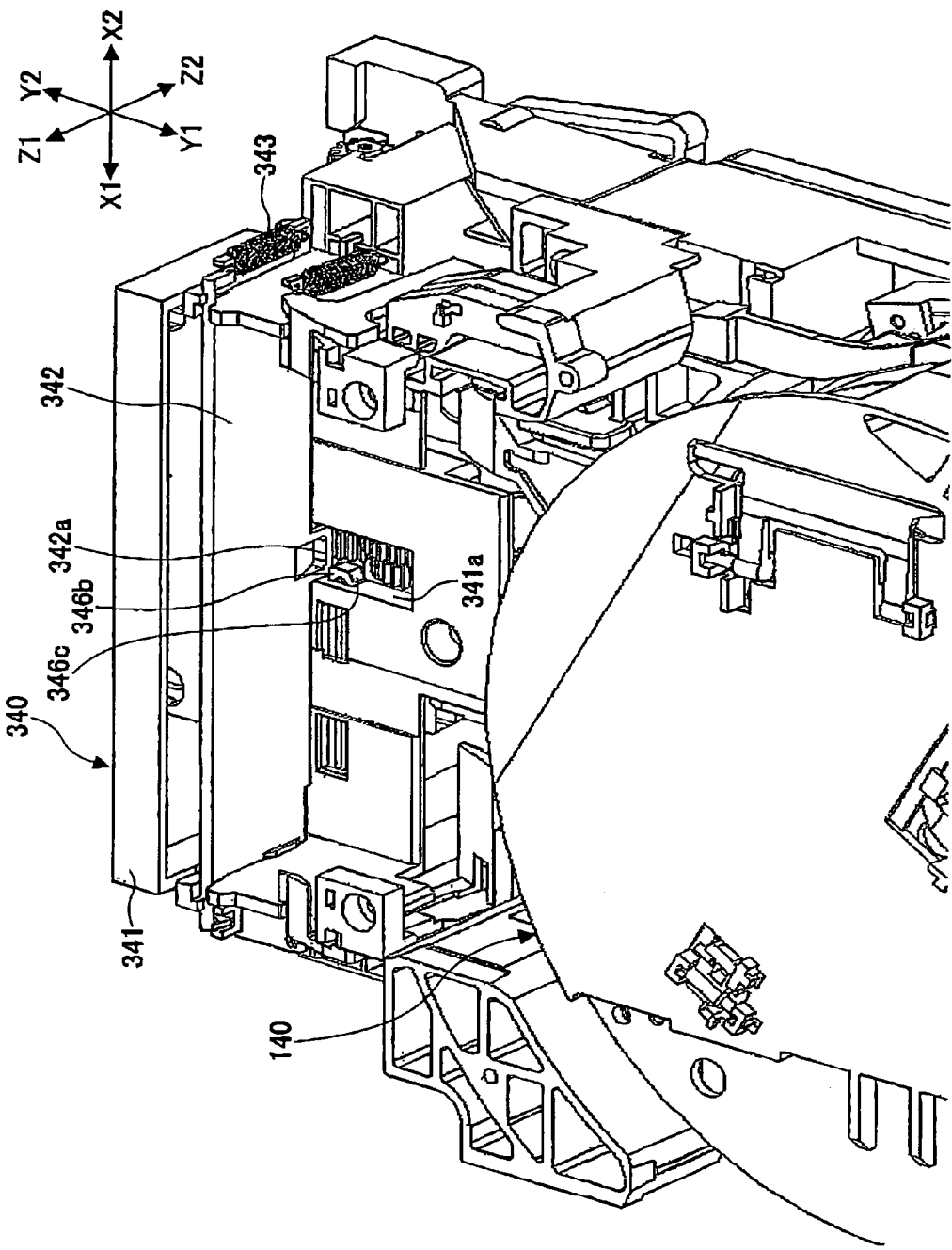
FIG. 6 is a perspective view of the main module, viewed from a Y1 side.

2 [Configuration of Main Module 110] (FIGS. 4-6)

FIG. 4 is a perspective view of the main module 110. FIG. 5 is an exploded view of the main module 110. FIG. 6 is a perspective view of the main module 110, viewed from the Y1 side.

In this embodiment, the main module 110 includes a base 120. The main module 110 also includes the tape cartridge picker 102, a tape cartridge transport magazine drive motor module 330, a mail slot module 340, and a rotation transmission path forming device 300. The tape cartridge picker 102 can occupy a large part of the base 120. The base 120 includes an extension 120a extending at the Y2 side of the tape cartridge picker 102. A drive shaft unit 301 and the tape cartridge transport magazine drive motor module 330 are disposed on the extension 120a. For example, the mail slot module 340 can be mounted on the upper side of the magazine drive motor module 330. The rotation transmission path forming device 300 comprises the drive shaft unit 301 and the magazine drive motor module 330 as described below in detail.

A motor control circuit 410 shown in FIG. 4 drives, in response to a command generated when a user operates the control panel 105, a stepping motor 165 and a magazine drive motor 333 in a manner described below while monitoring signals from a photo sensor 370.

3 [Configuration and Operations of Tape Cartridge Picker 102] (FIGS. 7-12)

Figure 7:
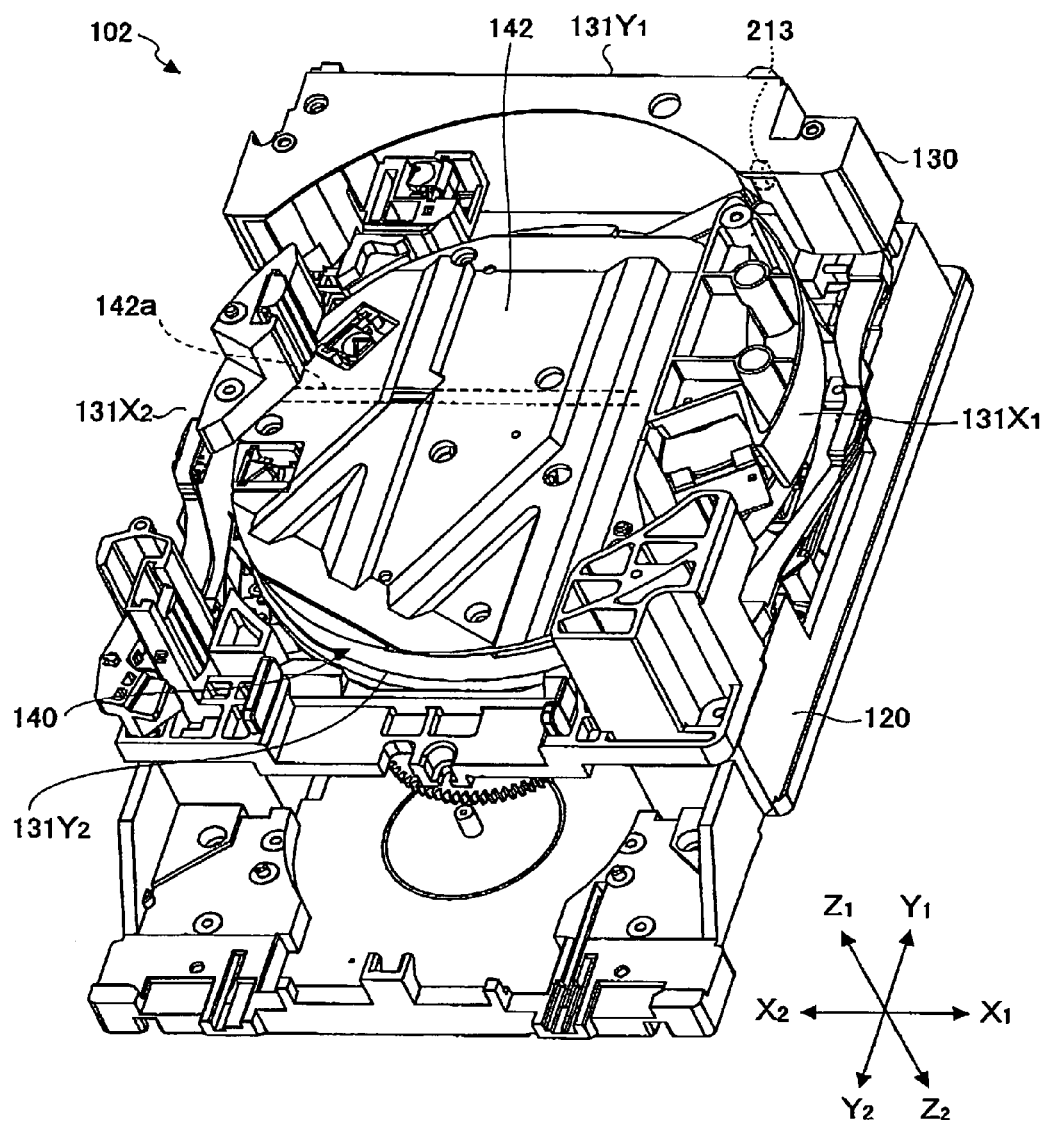
FIG. 7 is a perspective view illustrating the media cartridge picker.
Figure 8:
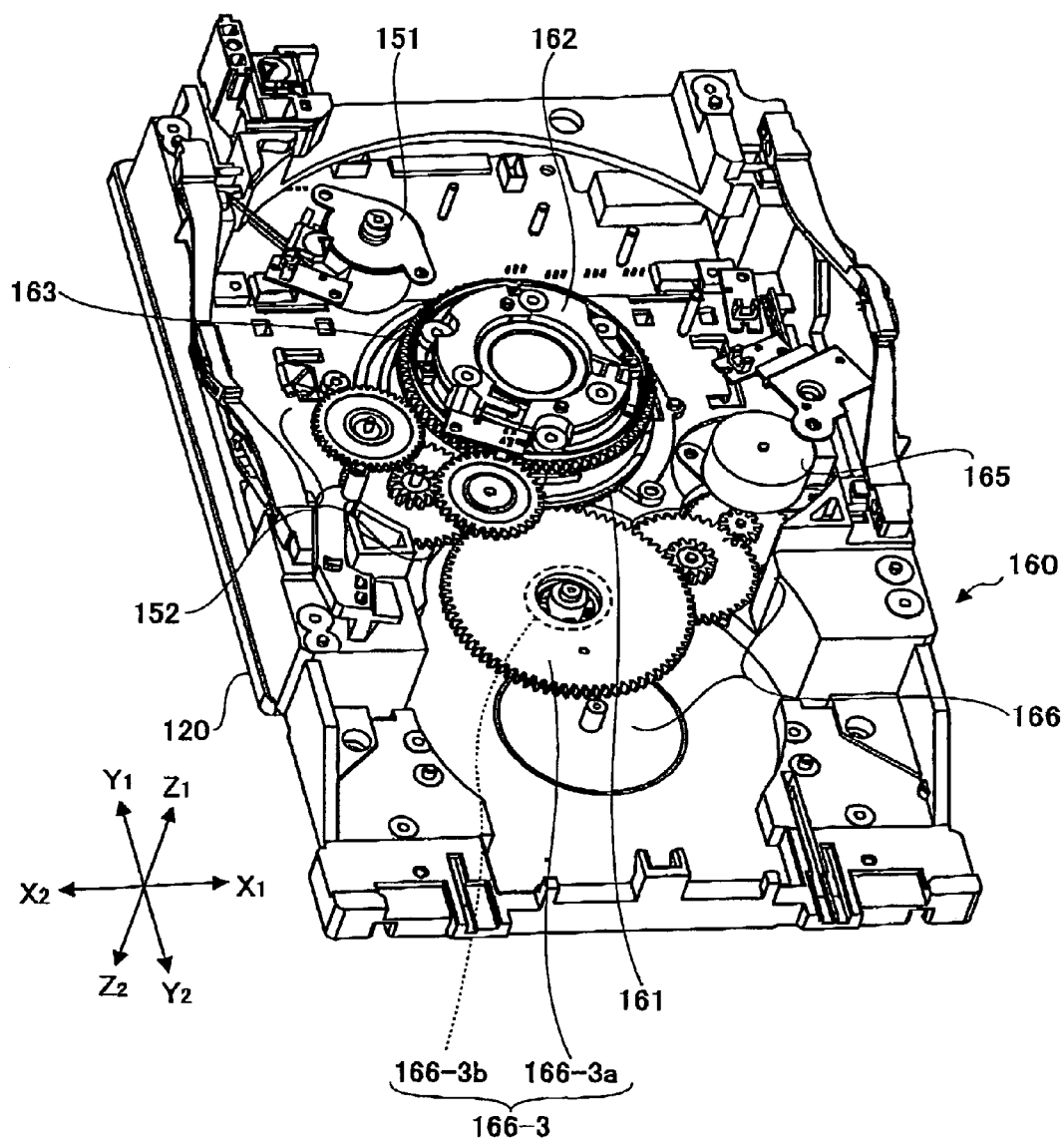
FIG. 8 is a perspective view illustrating the media cartridge picker with a pillar and a turntable removed.
Figure 9:
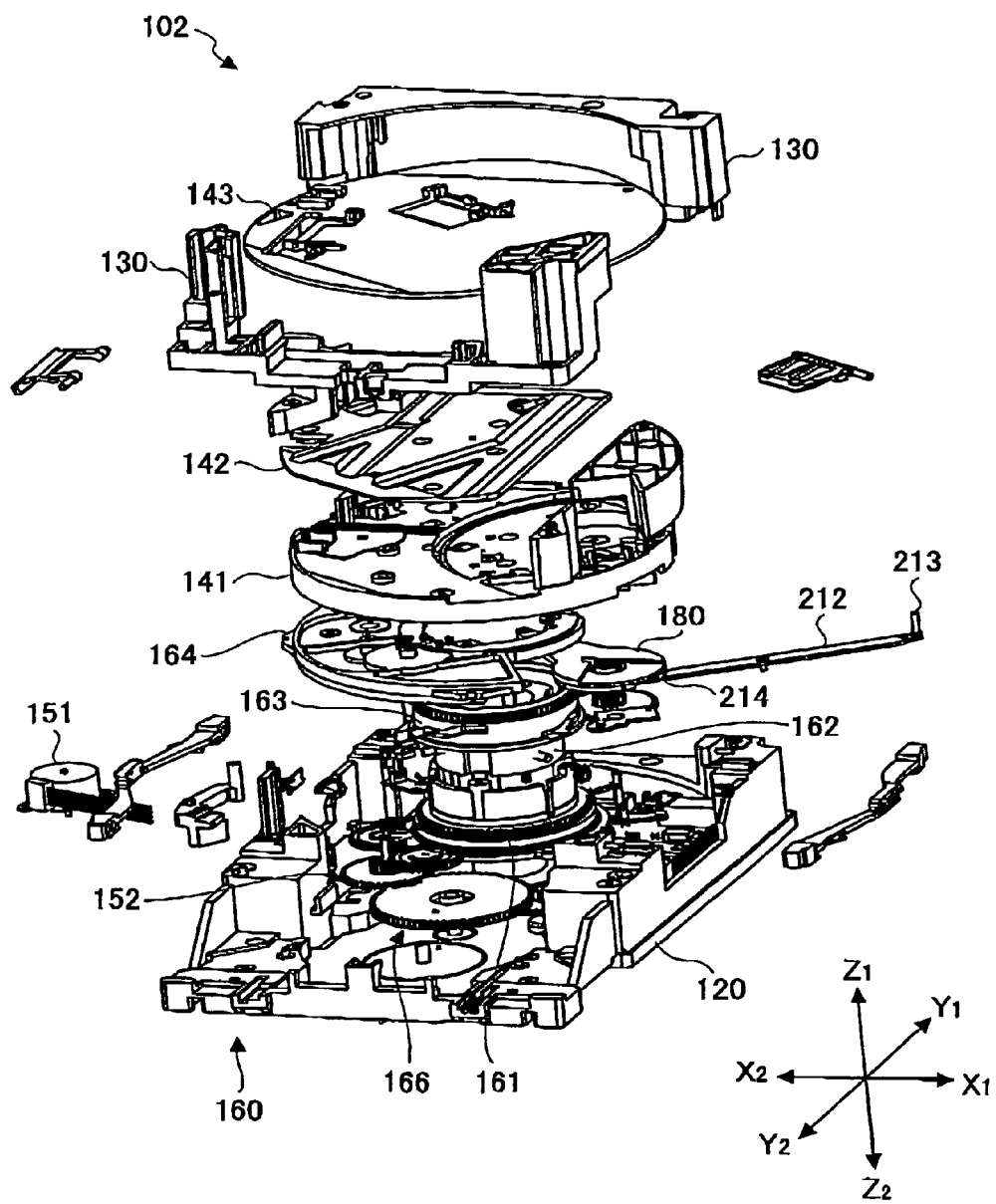
FIG. 9 is an exploded perspective view illustrating the media cartridge picker.
Figure 10:
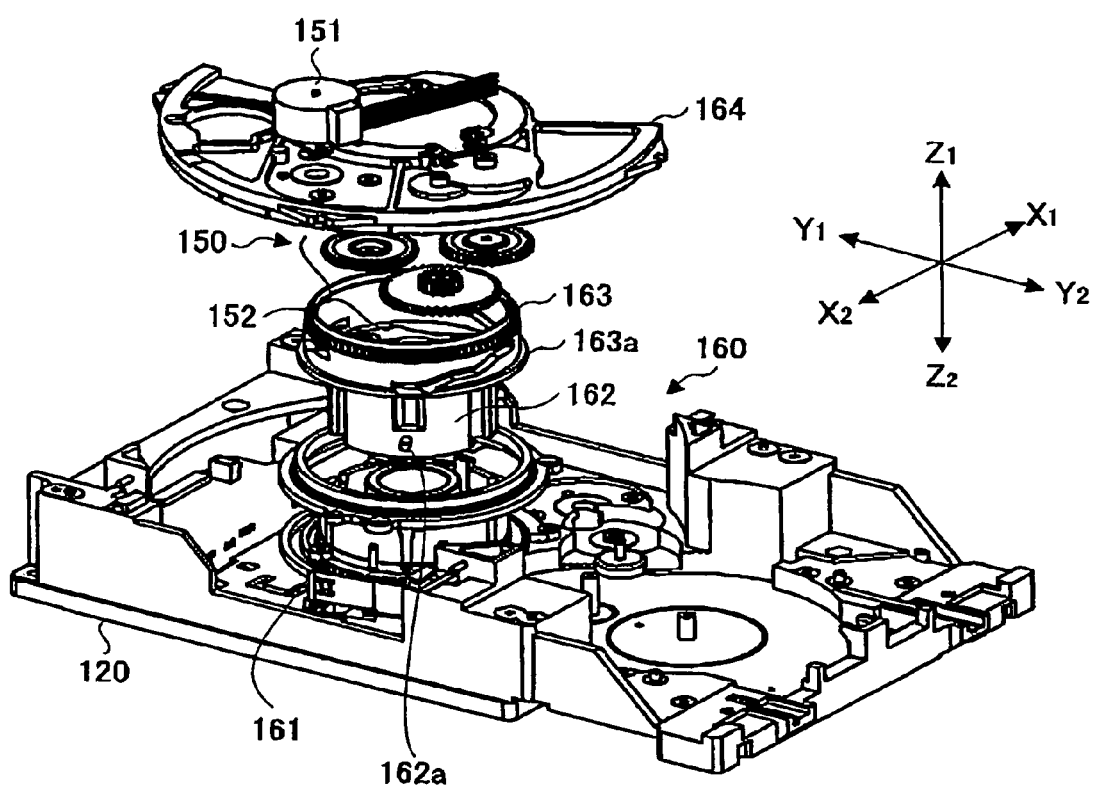
FIG. 10 is an exploded perspective view illustrating a turntable lifting mechanism in detail.

FIG. 7 illustrates the tape cartridge picker 102 with an upper plate 143 of the turntable 140 removed. FIG. 8 illustrates the tape cartridge picker 102 with a pillar 130 and the turntable 140 removed. FIG. 9 is an exploded perspective view illustrating the tape cartridge picker 102. FIG. 10 illustrates the turntable lifting mechanism 150 in detail.

The tape cartridge picker 102 includes the pillar 130 mounted on the base 120, the turntable 140 (FIG. 11) configured to support the tape cartridge 10, the turntable lifting mechanism 150 (FIG. 10) configured to slightly raise and lower the turntable 140 for height position adjustment, and a turntable rotating mechanism 160 configured to rotate the turntable 140 by a predetermined rotational increment, such as in 90-degree increments, for example. The tape cartridge picker 102 has ports 131X1, 131X2, 131Y1, and 131Y2 on the corresponding four sides thereof (see FIG. 7).

A rotating ring gear 161, a cylindrical stand 162, a lifting ring gear 163, and a sub base 164 are disposed on the base 120. The rotating ring gear 161 is rotatably coupled to the base 120. The cylindrical stand 162 is arranged at the inner side of the rotating ring gear 161 and the lifting ring gear 163 so as to be rotated along with the rotating ring gear 161 and be raised independently from the rotating ring gear 161. The lifting ring gear 163 is arranged at the upper side of the rotating ring gear 161 so as to be rotated independently from the rotating ring gear 161. A boss 162a (FIG. 10) of the cylindrical stand 162 is configured to engage a diagonal groove 163a of the lifting ring gear 163. The cylindrical stand 162 is rotated by rotation of the rotating ring gear 161, and raised/lowered by rotation of the lifting ring gear 163. The sub base 164 is a semi-circular plate fixed to a position slightly separated from and at the upper side of the base 120.

Figure 11:
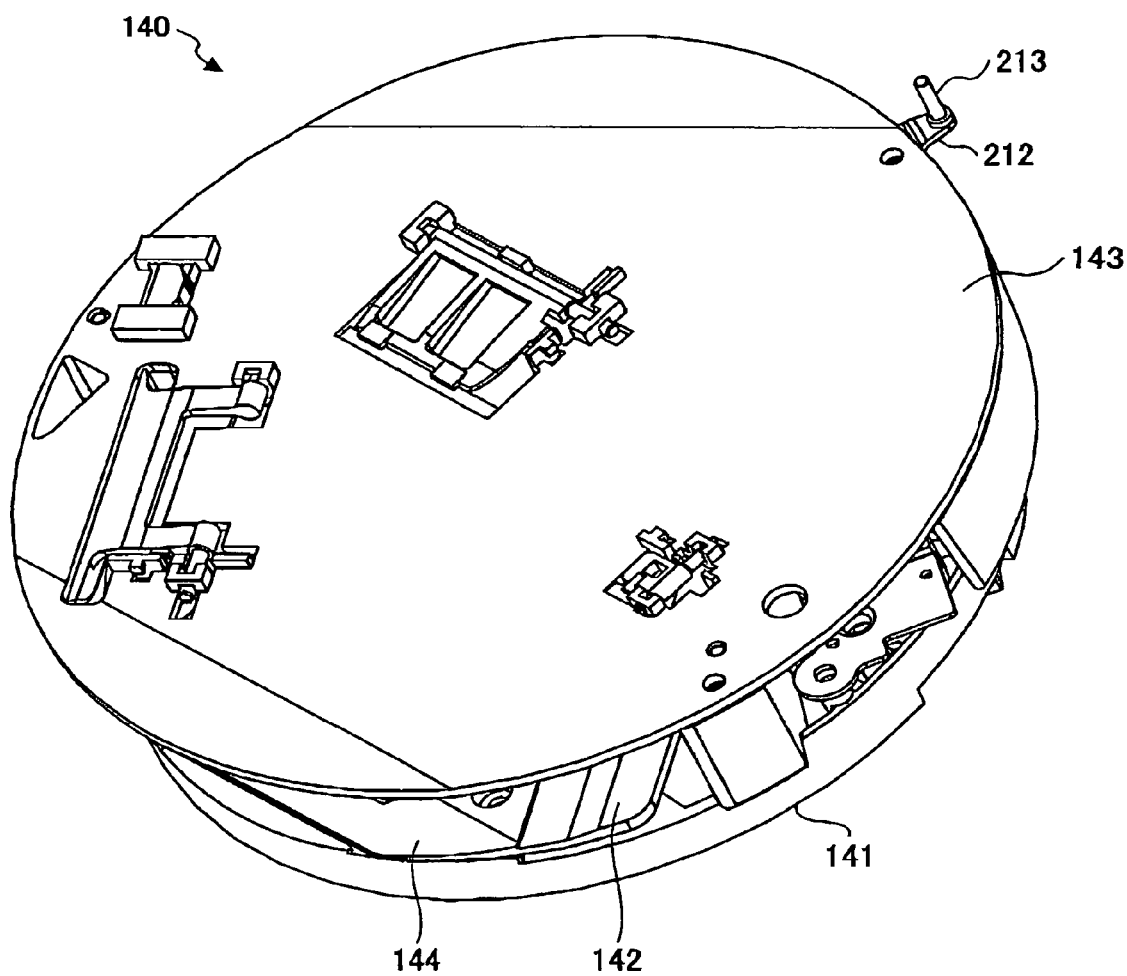
FIG. 11 is a perspective view illustrating the turntable.

Referring to FIG. 11, the turntable 140 includes a base plate 141, a floor plate 142, the upper plate 143, and a clearance 144 between the floor plate 142 and the upper plate 143 to receive the tape cartridge 10. The base plate 141 is screwed onto the cylindrical stand 162 (FIG. 10).

Referring to FIG. 10, the lifting mechanism 150 includes a stepping motor 151, a gear train 152, and the lifting ring gear 163. Both the stepping motor 151 and the gear train 152 are provided on the base plate 141.

As shown in FIG. 8, the turntable rotating mechanism 160 includes the stepping motor 165, a reduction gear train 166, and the rotating ring gear 161, all of which are provided on the base 120. A two-stage gear 166-3, which is the last stage gear of the reduction gear train 166, comprises a large-diameter gear section 166-3a and a small-diameter gear section 166-3b.

The lifting mechanism 150 has a function of initializing the turntable 140 by raising/lowering the turntable 140 to a home position thereof in the Z direction. The turntable rotating mechanism 160 has a function of initializing the turntable 140 by rotating the turntable 140 to the home position in the rotation direction. The home position of the turntable 140 is a position where a y-axis (described later) becomes parallel to the aforesaid Y-axis. The lifting mechanism initialization operation and the turntable rotating mechanism initialization operation apply a method of moving an object to an operation end position defined as a reference position, and then moving the object back by a predetermined distance. The same method is applied to operations for initializing a tape cartridge transport mechanism 170 (described below).

Figure 12:
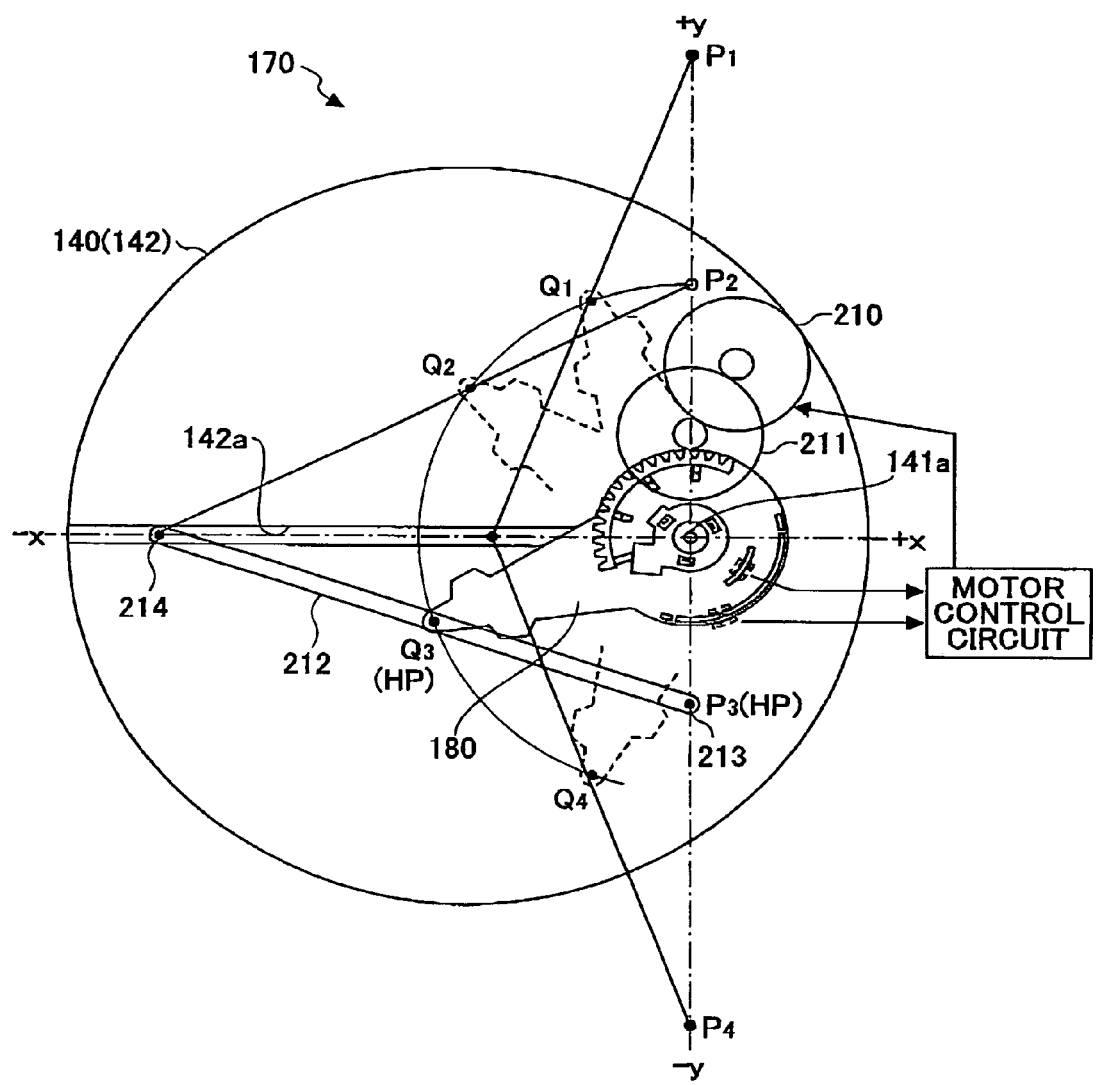
FIG. 12 is a schematic illustration showing a media cartridge transport mechanism.

Referring to FIG. 11 the turntable 140 includes the base plate 141, the floor plate 142, the upper plate 143, and the clearance 144 between the floor plate 142 and the upper plate 143 to receive the tape cartridge 10. Referring to FIG. 12, coordinates are applied to the turntable 140, wherein the position of a pin 141a (to be described below) is defined as the origin, a guide groove 142a (to be described below) is defined as an x-axis, and an axis passing through the origin and being orthogonal to the x-axis is defined as a y-axis.

The tape cartridge transport mechanism 170 and a stepping motor 210 (described later), both shown in FIG. 12, are provided on the base plate 141 (FIG. 11).

The tape cartridge transport mechanism 170 moves the tape cartridge 10 between a position on the turntable 140, i.e., a position inside the clearance 144, and a position outside the tape cartridge picker 102. In one embodiment, the movement of the tape cartridge 10 can be substantially linear. Alternatively, the movement of the tape cartridge 10 can be non-linear or can combine both linear and non-linear movements. The tape cartridge transport mechanism 170 includes a rotary arm 180 rotatably attached to the pin 141a formed on the base plate 141, the stepping motor 210 configured to reciprocally rotate the rotary arm 180 between positions Q1 and Q4 within a predetermined angular range, a reduction gear mechanism 211 configured to transmit the rotation of the stepping motor 210 at a reduced rotation rate to the rotary arm 180, and a lever 212 with a center part rotatably connected to a tip end of the rotary arm 180. A cartridge pin 213 is vertically fixed to an end of the lever 212, while a pin 214 is fixed to the other end of the lever 212. The pin 214 engages a guide groove 142a formed on a lower face of the floor plate 142. In one embodiment, the guide groove 142a can be substantially linear. Alternatively, the guide groove 142a can be curved or can have another suitable configuration.

In one embodiment, the turntable rotating mechanism 160 can rotate the turntable 140 in predetermined rotational increments, such as by approximately 90-degree increments, for example, in the clockwise direction or the counterclockwise direction with respect to the home position such that the orientation of the tape cartridge 10 is changed. In non-exclusive alternative embodiments, the turntable 140 can be rotated greater than or less than 90 degrees in either direction. The tape cartridge transport mechanism 170 retrieves the tape cartridge 10 and transports it onto and off of the turntable 140 (see FIG. 3) while the cartridge pin 213 is engaged in the notch 15a of the tape cartridge 10 (FIG. 1).

4 [Configuration of Rotation Transmission Path Forming Device 3003] (FIGS. 4-6, FIGS. 13-19)

Figure 13:
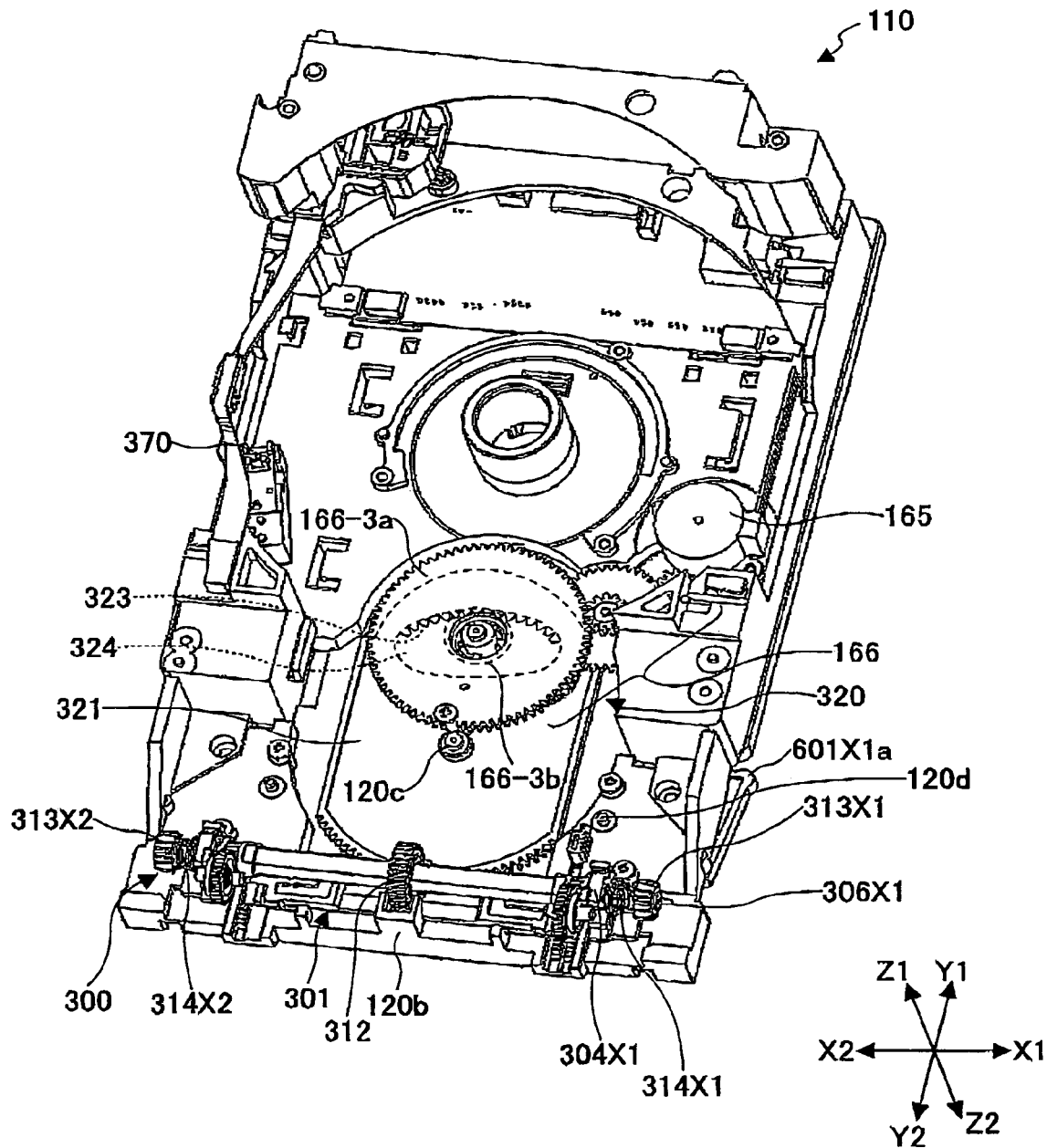
FIG. 13 is a perspective view of the main module with the cartridge picker, a mail slot module, and a motor module removed, viewed from a Y2 side.
Figure 14:
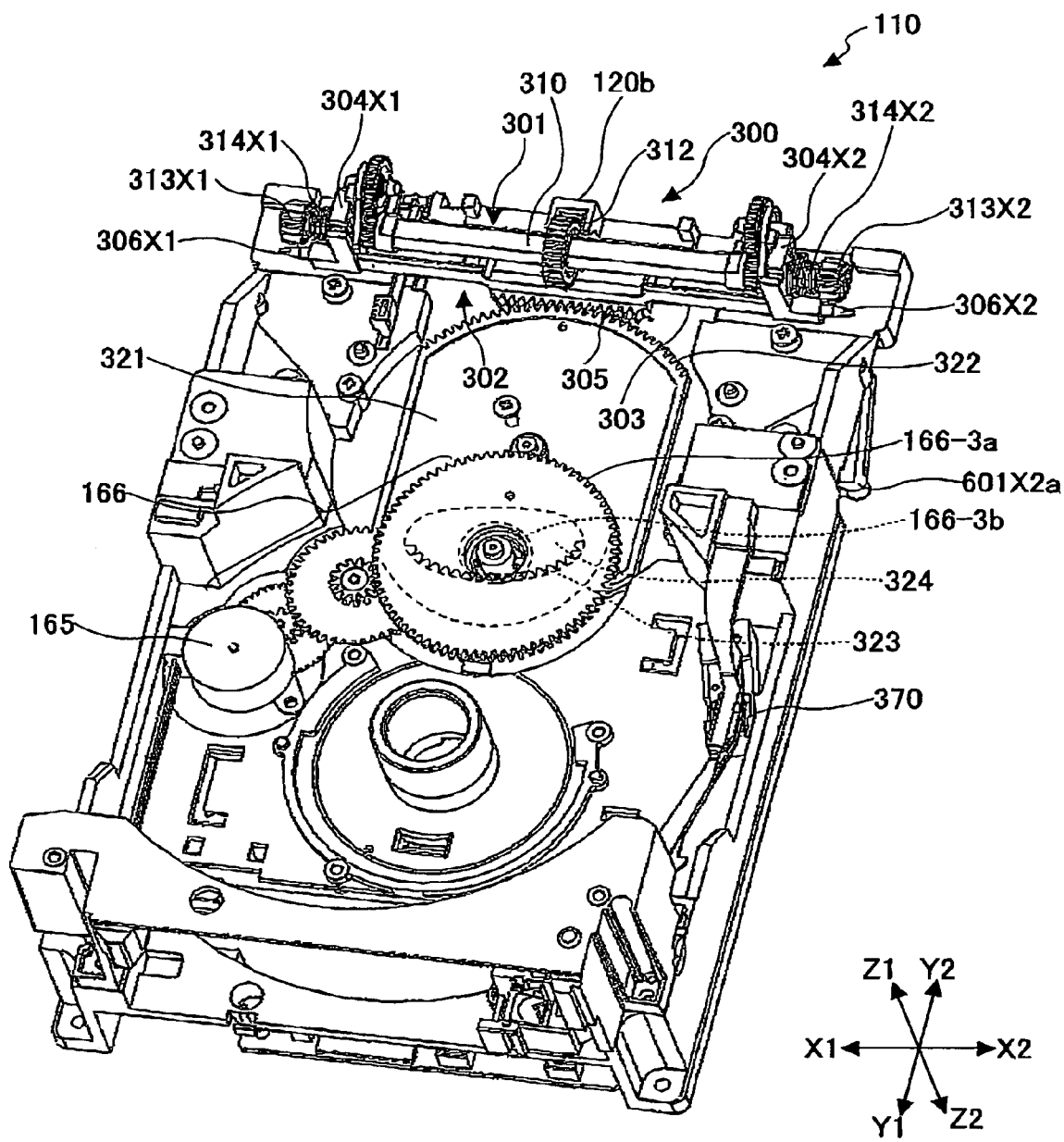
FIG. 14 is a perspective view of the main module of FIG. 13, viewed from the Y1 side.
Figure 15:
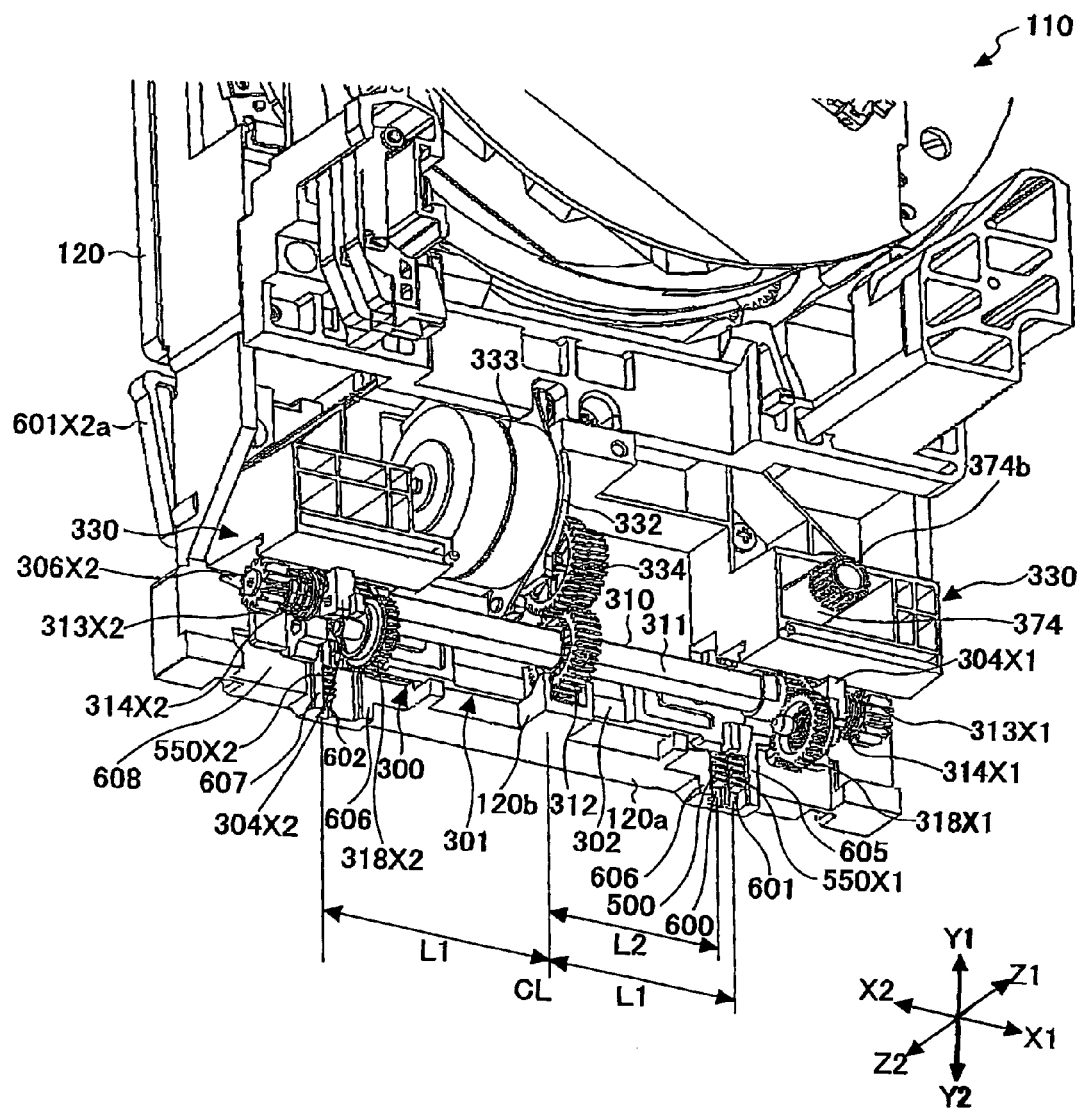
FIG. 15 is a perspective view of a Y2-side part of the main module with the mail slot module removed, viewed obliquely from an X2 side.

FIG. 13 is a perspective view of the main module 110 with the tape cartridge picker 102, the mail slot module 340, and the magazine drive motor module 330 removed, viewed from the Y2 side. FIG. 14 is a perspective view of the main module 110 of FIG. 13, viewed from the Y1 side. FIG. 15 is a perspective view of a Y2-side part of the main module 110 with the mail slot module 340 removed.

With reference to FIGS. 4, 5, and 13-15, the rotation transmission path forming device 300 comprises the drive shaft unit 301, the drive shaft unit shifting mechanism 320, and the magazine drive motor module 330.

4-1 [Configuration of Drive Shaft Unit 301]

Referring to FIGS. 5, 6, and 13-17, the drive shaft unit 301 comprises a frame 302, a drive shaft 310, a center gear 312, and drive gears 313X1 and 313X2 disposed one on each end of the drive shaft 310. The drive shaft unit 301 is installed on the base 120 and bidirectionally movable along an axis substantially in the X1-X2 direction.

Figure 19:
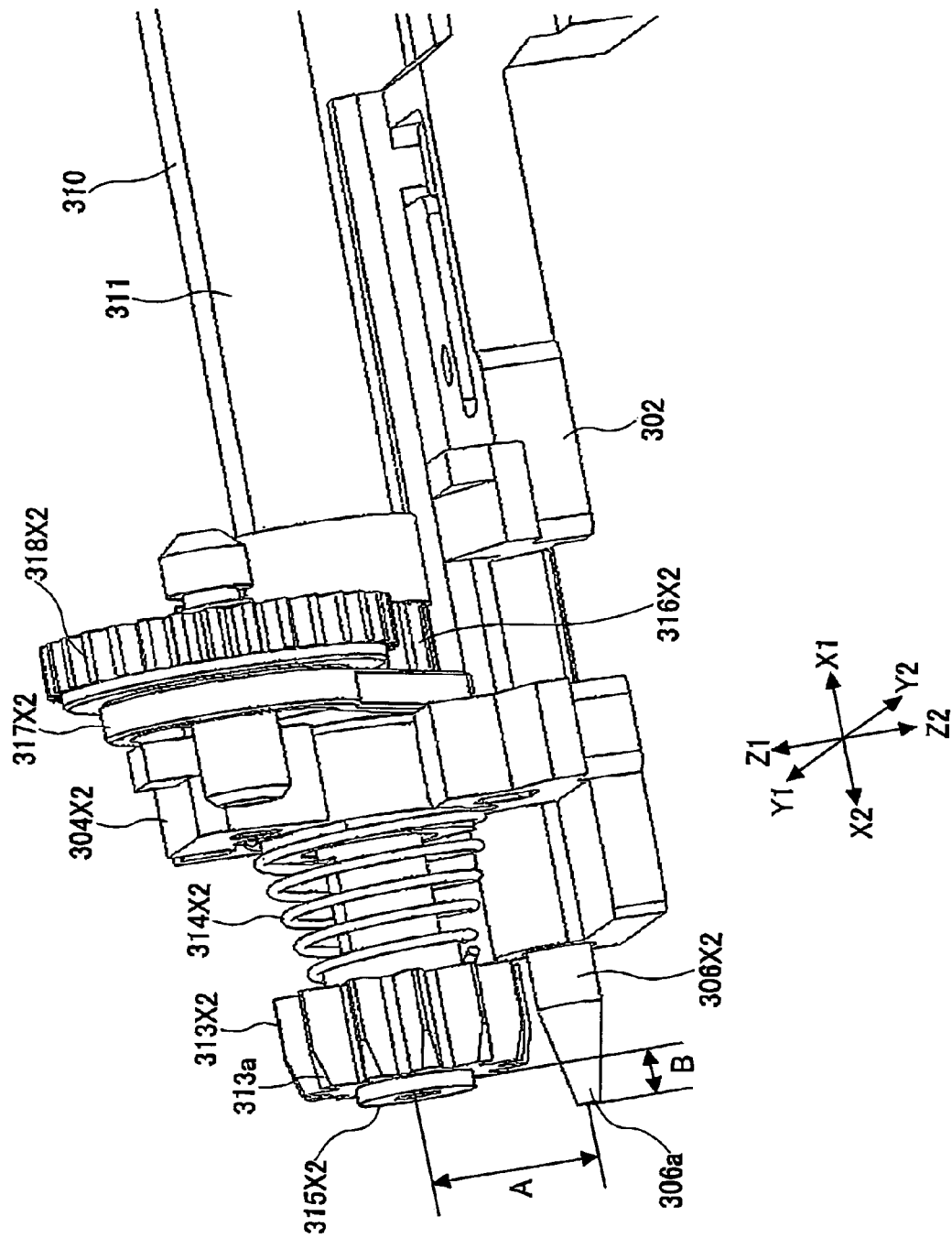
FIG. 19 is an enlarged perspective view showing a drive gear and a positioning pin disposed at the X2 side.

The frame 302 (FIG. 15) comprises a frame main body 303 (FIG. 14) elongated in the X1-X2 direction, flanges 304X1 and 304X2 formed one at each end of the frame main body 303, a rack 305 (FIG. 14) at the center of the frame main body 303, and positioning pins 306X1 and 306X2 provided one on each end of the frame main body 303. Each of the positioning pins 306X1 and 306X2 includes a conical section 306a (FIG. 19). The frame 302 is disposed on the extension 120a of the base 120 and movable in the X1-X2 direction.

The drive shaft 310 is rotatably supported at both ends by the flanges 304X1 and 304X2. Gears 316X1 and 316X2 (FIG. 19) are secured to the drive shaft 310 at the inner side of the flanges 304X1 and 304X2. The gears 316X1 and 316X2 prevent the drive shaft 310 from moving with respect to the flanges 304X1 and 304X2 in the X1-X2 direction. The drive shaft 310 has a flat face 311 in its diametrical direction at least at the center and ends thereof so as to have a D-shaped cross section, on which the center gear 312 fits. The drive shaft 310, configured to rotate with the center gear 312 and is movable in the X1-X2 direction with respect to the center gear 312. In one embodiment, as the center gear 312 is fitted in a holder section 120b formed integrally on the base 120, the movement of the center gear 312 in the X1-X2 direction is restricted.

The drive gears 313X1 and 313X2 are attached to the drive shaft 310 at the outer side of the flanges 304X1 and 304X2, respectively. The drive gears 313X1 and 313X2 are configured to rotate with the drive shaft 310 about the axis that is oriented substantially in the X1-X2 direction, and are slidable along the drive shaft 310 in the axial direction of the drive shaft 310. Washers 315X2 (FIG. 19) can be threaded on the end faces of the drive shaft 310 to prevent the drive gears 313X1 and 313X2 from dropping off. Compression coil springs 314X1 and 314X2 are wound around the drive shaft 310 between the drive gears 313X1, 313X2 and the flanges 304X1, 304X2, respectively. The drive gear 313X2 compresses the compression coil spring 314X2 to move in the X1 direction when a force in the X1 direction is applied to the drive gear 313X2. The drive gear 313X1 compresses the compression coil spring 314X1 to move in the X2 direction when a force in the X2 direction is applied to the drive gear 313X1.

As shown in detail in FIG. 19, there is a distance A between the positioning pin 306X2 and the drive shaft 310. The positioning pin 306X2 extends further outward than the drive gear 313X2 by a distance B. The drive gear 313X2 is a spur gear having a tapered face 313a on the outer end. The drive gears 313X1 and the positioning pin 306X1 also have the configurations as described above.

Figure 21A:
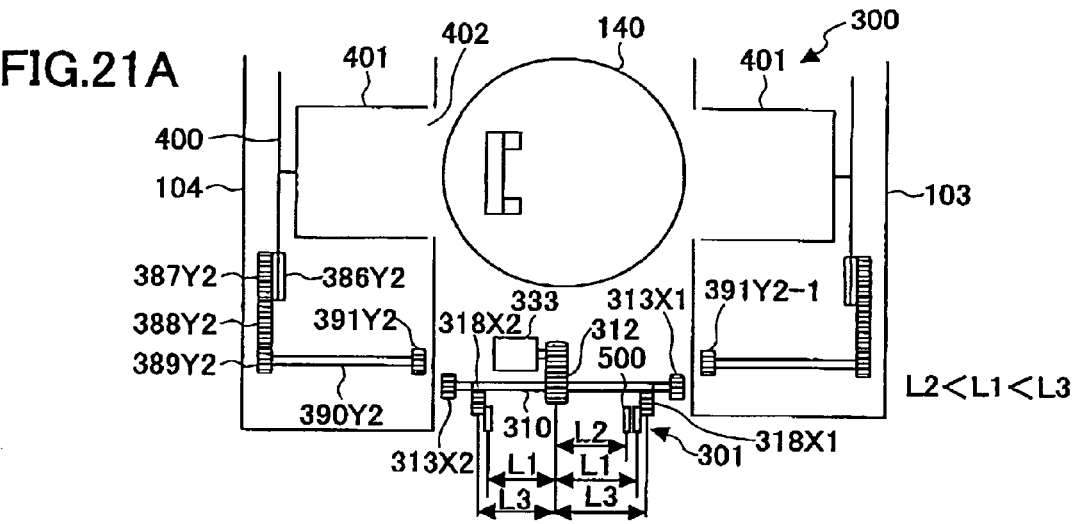
FIG. 21A is a schematic illustration showing a transmission rotation path forming device in an initial state.

The drive shaft unit 301 is usually located at a home (center) position shown in FIGS. 4 and 21A. When the drive shaft unit 301 is at the home position, the positioning pins 306X1 and 306X2 are located within the width of the base 120 in the X1-X2 direction.

Swing arms 317X1 and 317X2 are attached to the drive shaft 310 between the gears 316X1, 316X2 and the flanges 304X1, 304X2, respectively. Swing pinions 318X1 and 318X2 are attached to ends of the swing arms 317X1 and 317X2. The swing pinions 318X1 and 318X2 engage, e.g., mesh with, the gears 316X1 and 316X2, respectively, and are rotated by rotation of the drive shaft 310. The swing pinions 318X1 and 318X2 are pressed against the inner side faces of the swing arms 317X1 and 317X2 by biasing forces of spring members (not shown) attached to shafts of the swing pinions 318X1 and 318X2, respectively. With frictional forces generated between the swing pinions 318X1, 318X2, and the swing arms 317X1, 317X2, the swing arms 317X1 and 317X2 rotate in the same direction as the direction in which the drive shaft 310 rotates.

4-2 [Configuration of Drive Shaft Unit Shifting Mechanism 320]

The drive shaft unit shifting mechanism 320 utilizes the stepping motor 165 that rotates the turntable 140. The drive shaft unit shifting mechanism 320 comprises the stepping motor 165 and a gear member 321 (see FIGS. 13 and 14).

The gear member 321 has a generally elliptical shape, comprising an outer gear section 322 and an inner gear section 323 along the edge of an inner opening 324. A center hole of the gear member 321 fits on a shaft portion 120c of the base 120. The inner gear section 323 engages the small-diameter gear section 166-3b, while the outer gear section 322 engages the rack 305 (FIG. 14).

When the stepping motor 165 is driven, the turntable 140 is rotated through the gear train 166. At the same time, the gear member 321 is rotated thought the small-diameter gear section 166-3b in the clockwise direction or the counterclockwise direction in accordance with the rotational direction of the stepping motor 165, so that the drive shaft unit 301 is moved through the rack 305 in the X2 direction or the X1 direction.

Referring to FIG. 20, the photo sensor 370 for detecting the rotating angle of the turntable 140 is provided. The photo sensor 370 detects the rotating angle of the turntable 140 by detecting slits 371, which can be formed in a predetermined arrangement on a rib around a lower face of the turntable 140. In one embodiment, for example, the rotating angle of the turntable 140 and the moving distance of the drive shaft unit 301 have the following relation: When the rotating angle of the turntable 140 is approximately 15 degrees, the moving distance of the drive shaft unit 301 is 2.5 mm; when the rotating angle of the turntable 140 is approximately 30 degrees, the moving distance of the drive shaft unit 301 is 5 mm; and when the rotating angle of the turntable 140 is approximately 90 degrees, the moving distance of the drive shaft unit 301 is 15 mm. However, it is recognized that other equally suitable arrangements can be utilized with the present invention depending upon the design requirements of the autoloader 100. As the drive shaft unit 301 is interlocked with the turntable 140, the moving distance of the drive shaft unit 301 is found by detecting the rotating angle of the turntable 140. Therefore, there is no need to provide the drive shaft unit 301 with a mechanism for detecting the moving distance.

4-3 [Configuration of Magazine Drive Motor Module 330]

Referring to FIG. 5, the magazine drive motor 333 is a stepping motor and secured to a flange section 332 of a frame 331 of the magazine drive motor module 330. A reduction gear 334 is held in the flange section 332. The reduction gear 334 engages a gear 335 secured to a spindle of the magazine drive motor 333.

The magazine drive motor module 330 is secured to the Y1-side end of the base 120 such that the reduction gear 334 engages the gear 312 as shown in FIG. 15.

When the magazine drive motor 333 is driven, the gear 312 is rotated through the reduction gear 334. Accordingly, the drive shaft 310 and the drive gears 313X1 and 313X2 are rotated.

Figure 16:
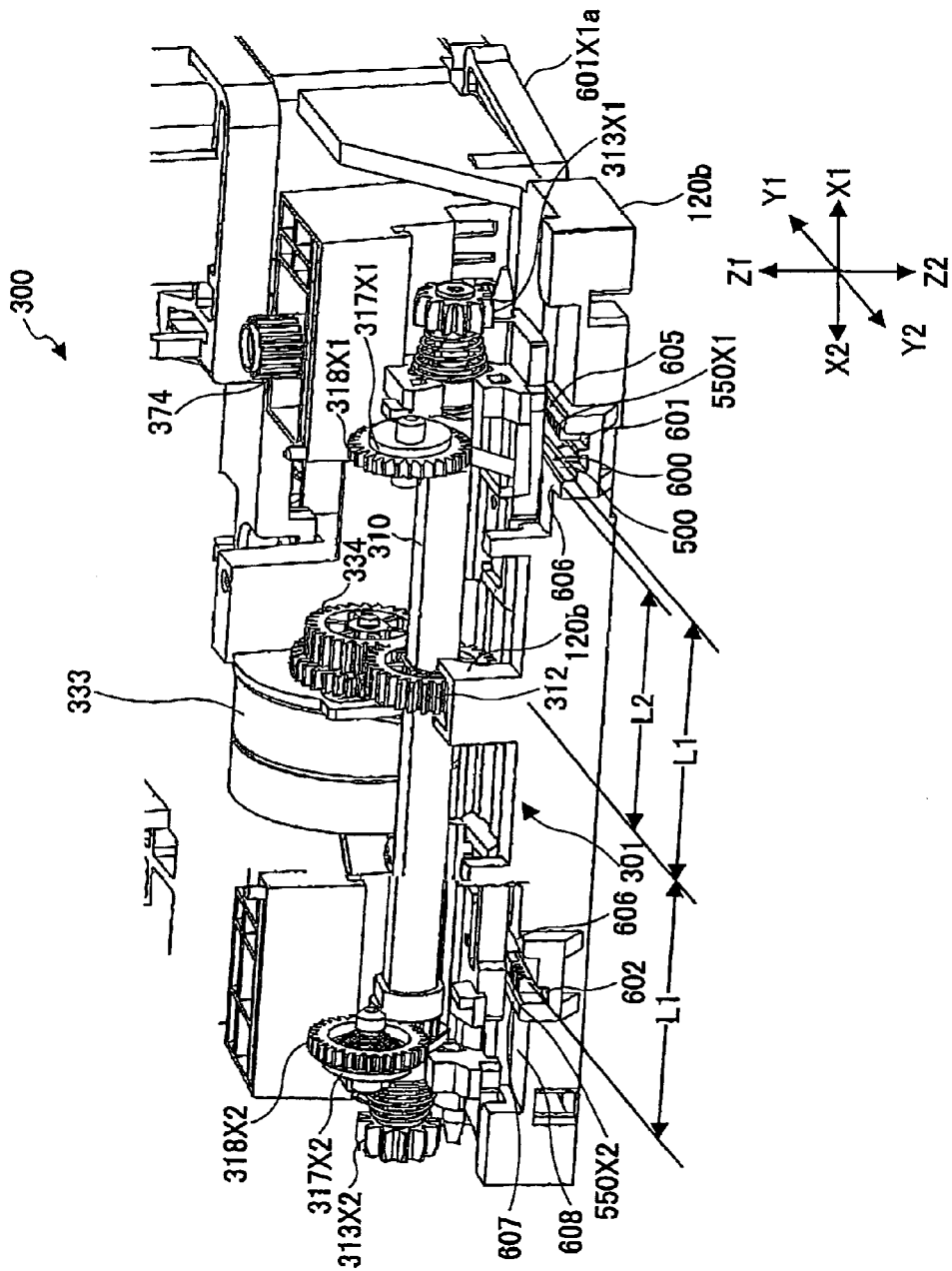
FIG. 16 is a perspective view illustrating a rotation transmission path forming device with a drive shaft unit located at a home position.

4-4 [Arrangement of Swing Pinions 318X1, 318X2, and Rack Sections 500, 550X1, 550X2] (FIGS. 15, 16, 21A)

With reference to FIGS. 15, 16, and 21A, rack sections 500, 550X1, and 550X2 are disposed on the extension 120a of the base 120. A line CL (FIG. 15) extending in Y1-Y2 direction is the center line of the extension 120a (and the base 120) in the X1-X2 direction. The rack section 550X1 and the rack section 550X2 are disposed symmetrically with respect to the center line of the base 120, each of which is spaced at a distance L1 from the center line CL. In this embodiment, the rack section 500 is disposed adjacent to the rack section 550X1 at the side of the center line CL. The distance between the center line CL and the rack section 500 is L2 (<L1).

Grooves 600, 601, 602, extending in the Y1-Y2 direction, and banks 605, 606, 606, 607 are formed on the extension 120a. The bank 605 and the bank 606 (X1 side) face each other across the grooves 600 and 601, while the bank 606 (X2 side) and the bank 607 face each other across the groove 602. The rack section 500 is disposed inside the groove 600, and the rack section 550X1 is disposed inside the groove 601. Also, the rack section 550X2 is disposed inside the groove 602.

While the drive shaft unit 301 is located in the home position, the swing pinions 318X1 and 318X2 are located symmetrically with respect to the center line CL of the base 120 and at the outer sides of the rack sections 550X1 and 550X2, respectively. In this embodiment, the distance from the center line CL to each of the swing pinions 318X1 and 318X2 is L3 (>L1) (FIG. 21A).

4-5 [Relation among Rotating Angle of Turntable 140, Moving Distance of Drive Shaft Unit 301, and Rack Sections 500, 550X1, 550X2]

FIGS. 21A-21C and 22A-22C schematically show the positions of the drive gears 313X1, 313X2, and the swing pinions 318X1, 31BX2, with respect to magazine gears 391Y2-1, 391Y2, and the rack sections 550, 550X1, 550X2 when the drive shaft unit 301 is moved by the rotation of the turntable 140. FIG. 23 is a table showing rotating angles of the turntable 140 and counterparts with which the drive gears 313X1, 313X2 and the swing pinions 31BX1, 318X2 mesh in accordance with the rotation.

First, one embodiment of operations that occur when the turntable 140 is rotated from the home position in the counterclockwise direction are described. It is understood that the angles of rotation of the turntable in either direction that effectuate the movements and functions provided below can vary depending upon the design requirements of the autoloader, and that the following example is representative and is provided for ease of understanding.

Figure 22A:
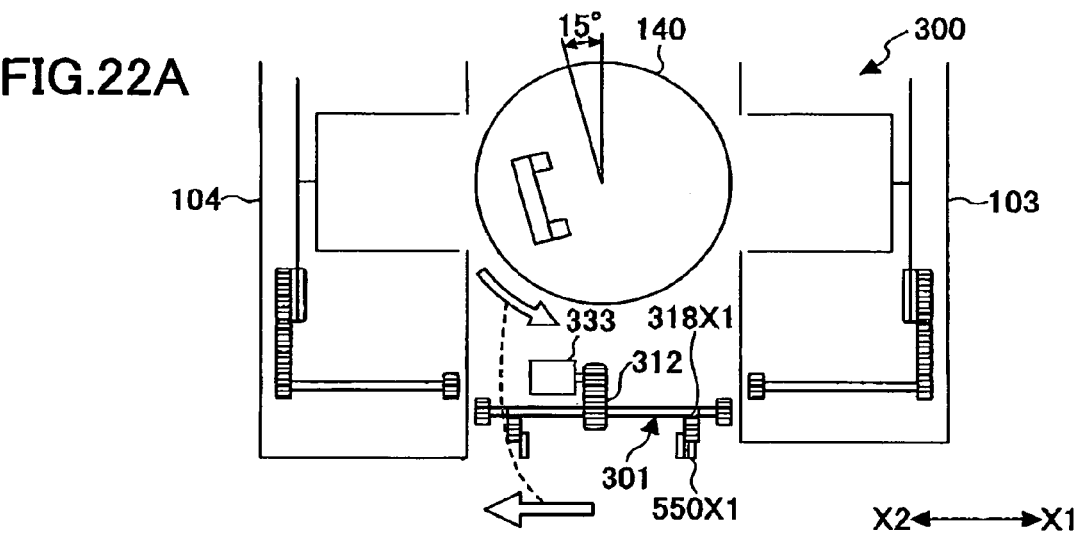
FIG. 22A is a schematic illustration showing the transmission rotation path forming device in a state wherein a rotation transmission path to a locking mechanism for the X1-side magazine is formed.
Figure 24:
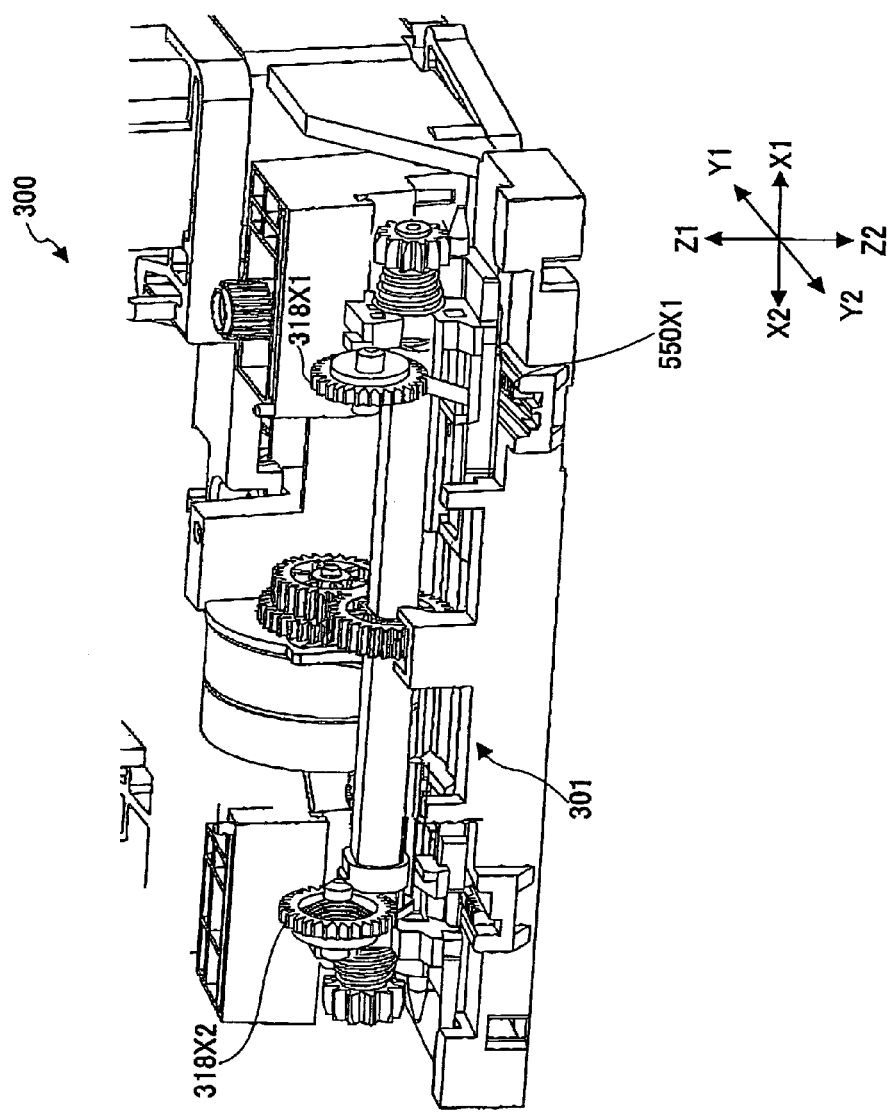
FIG. 24 shows a rotation transmission path forming device in an initial state of operations corresponding to a command to release the lock by an X1-side media cartridge transport magazine locking mechanism.
Figure 25:
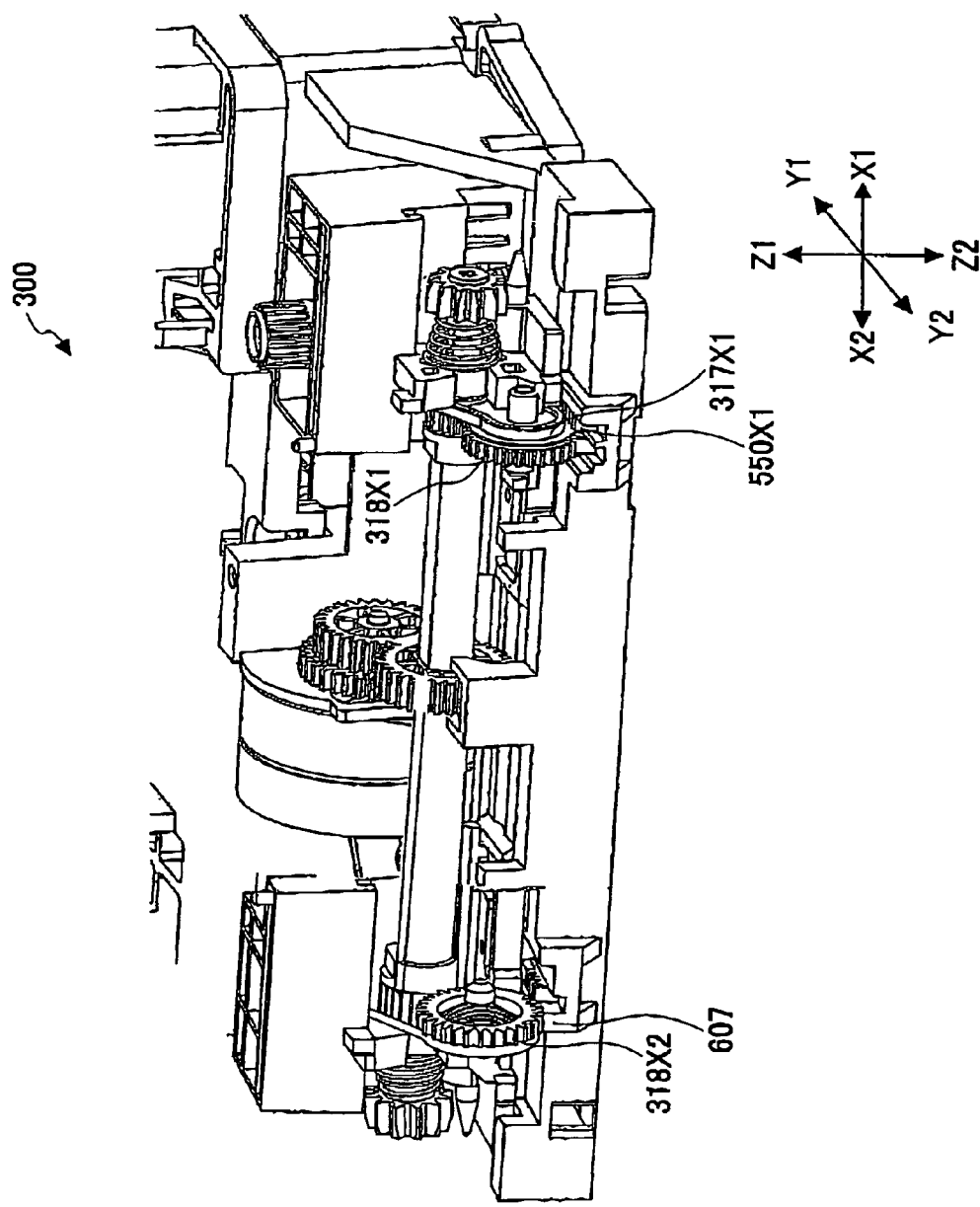
FIG. 25 shows the rotation transmission path forming device in a final state of the aforesaid operations of FIG. 25 wherein a rotation transmission path to the X1-side media cartridge transport magazine locking mechanism is formed.

For example, when the turntable 140 is rotated approximately 15 degrees, the swing pinion 31BX1 is aligned with the rack section 550X1 as shown in FIGS. 22A and 24. Then the swing arm 317X1 is rotated, so that the swing pinion 318X1 engages the rack section 550X1 as shown in FIG. 25. Thus, a rotation transmission path to a transport magazine locking mechanism 600X1 (FIGS. 30, 41) is formed as described below in greater detail.

Figure 22B:
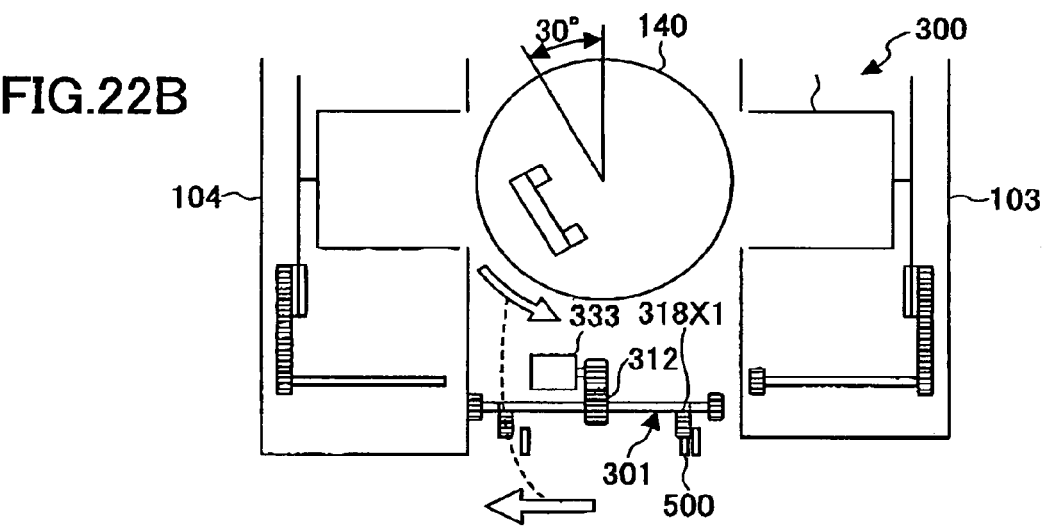
FIG. 22B is a schematic illustration showing the transmission rotation path forming device in a state wherein a rotation transmission path to a door locking mechanism is formed.
Figure 27:
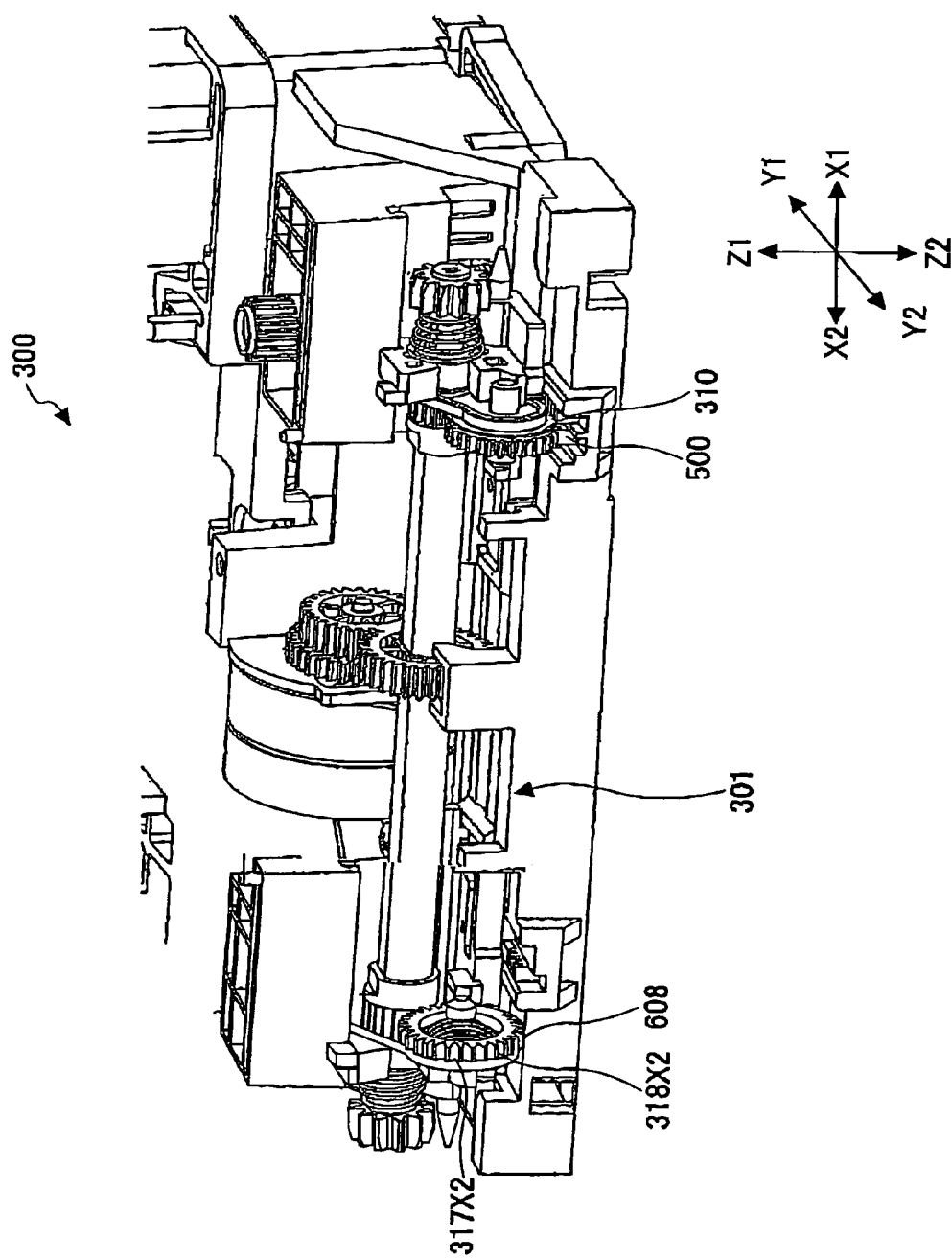
FIG. 27 shows the rotation transmission path forming device in a final state of the aforesaid operations of FIG. 26 wherein a rotation transmission path to the door locking mechanism is formed.

When the turntable 140 is rotated approximately 30 degrees from the home position, the swing pinion 318X1 is aligned with the rack section 500 as shown in FIG. 22B. Then the swing arm 317X1 is rotated, so that the swing pinion 31BX1 engages the rack section 500 as shown in FIG. 27. Thus, a rotation transmission path to a door locking mechanism 345 is formed as described below in greater detail.

Figure 21B:
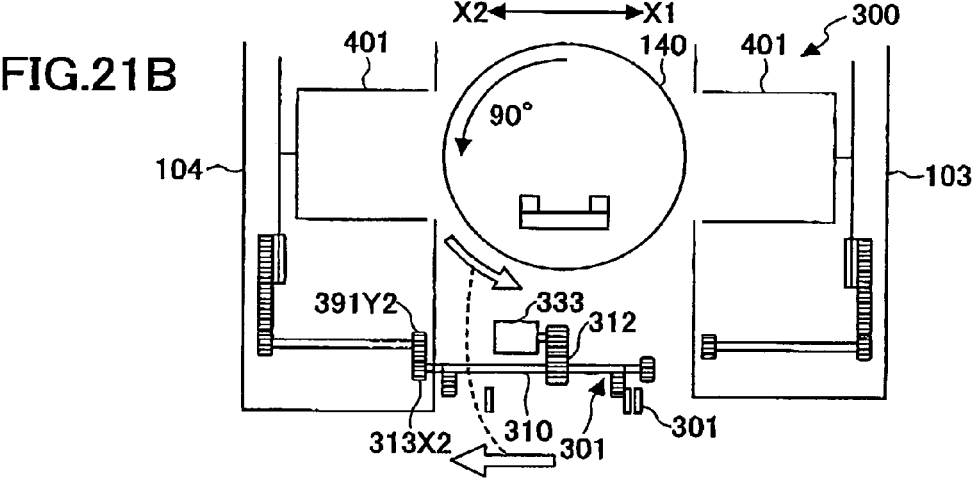
FIG. 21B is a schematic illustration showing the transmission rotation path forming device in a state wherein a rotation transmission path to an X2-side magazine is formed.
Figure 36:
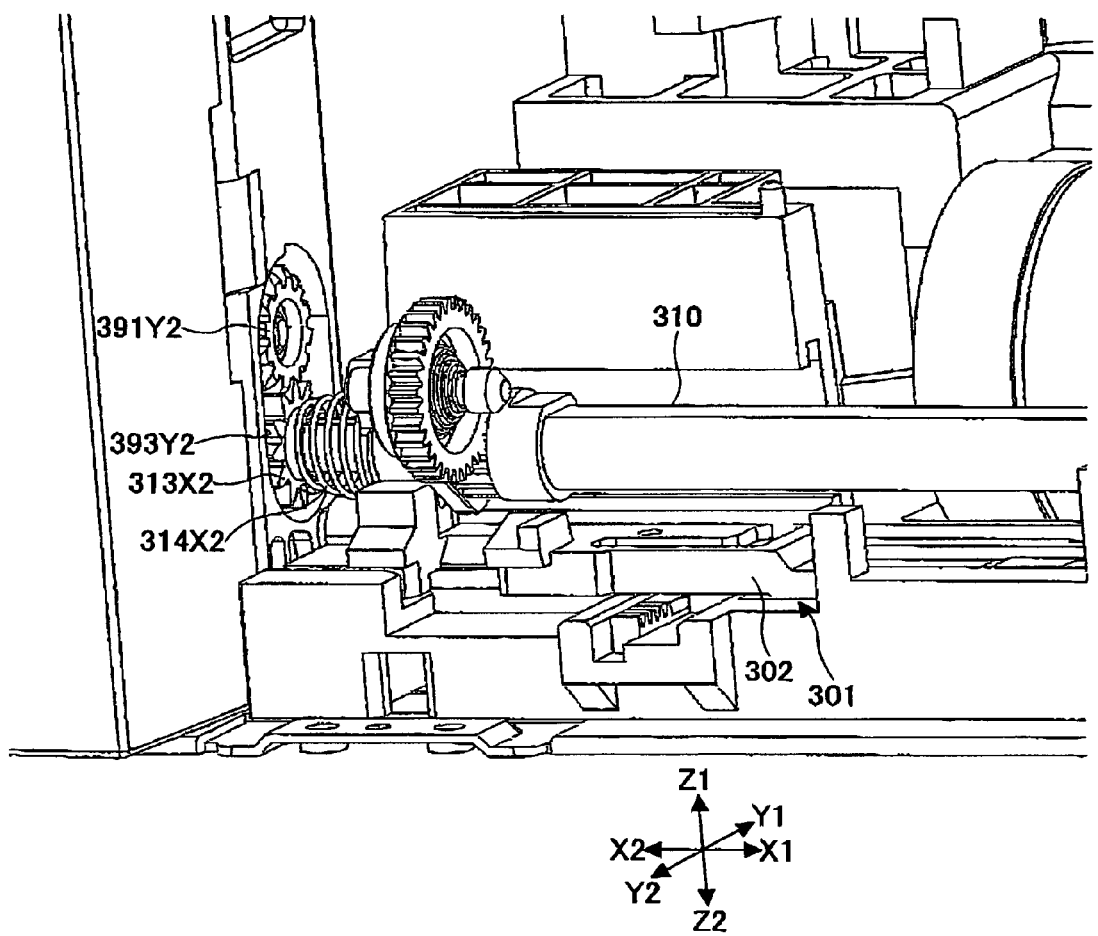
FIG. 36 illustrates the X2-side part of the drive shaft unit coupled with the magazine.

When the turntable 140 is rotated approximately 90 degrees from the home position, the drive gear 313X2 engages the magazine gear 391Y2 as shown in FIGS. 21B and 36. Thus, a rotation transmission path to the tape cartridge transport magazine 104 is formed as described below in greater detail.

Next, operations that occur when the turntable 140 is rotated from the home position in the clockwise direction are described.

Figure 22C:
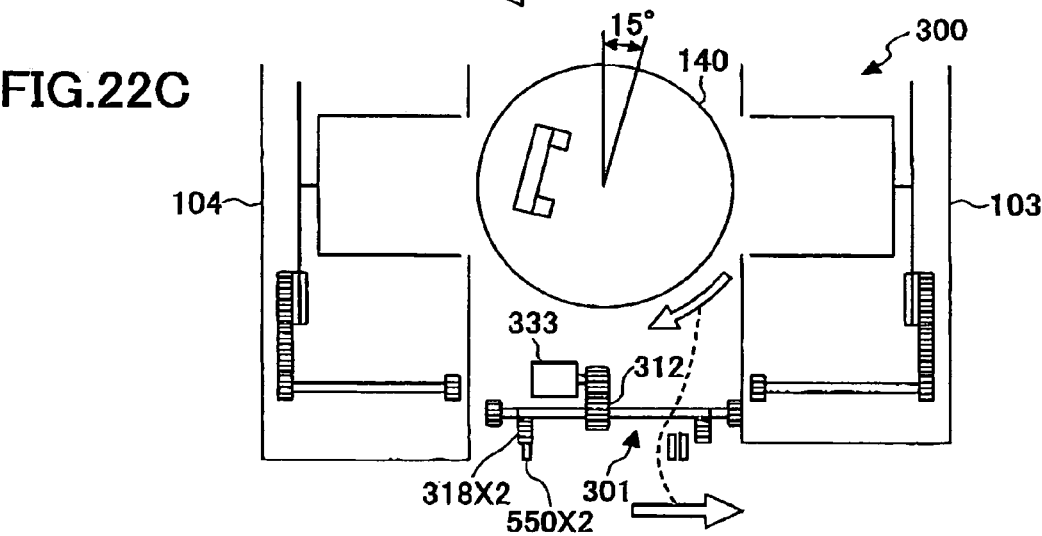
FIG. 22C is a schematic illustration showing the transmission rotation path forming device in a state wherein a rotation transmission path to a locking mechanism for the X2-side magazine is formed.
Figure 29:
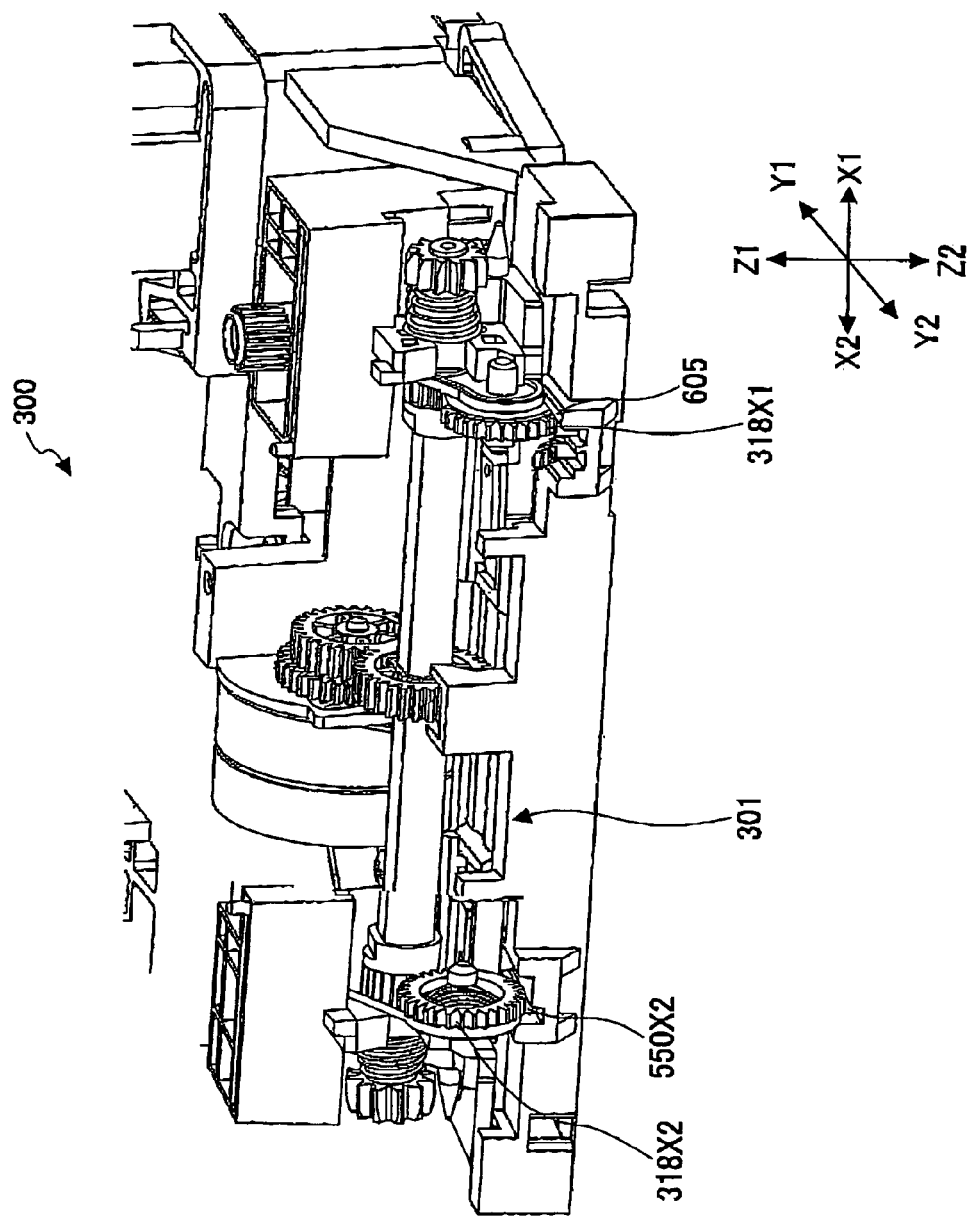
FIG. 29 shows the rotation transmission path forming device in a final state of the aforesaid operations of FIG. 28 wherein a rotation transmission path to the X2-side media cartridge transport magazine locking mechanism is formed.

When the turntable 140 is rotated approximately 15 degrees, the swing pinion 318X2 is aligned with the rack section 550X2 as shown in FIGS. 22C and 2B. Then the swing arm 317X2 is rotated, so that the swing pinion 318X2 engages the rack section 550X2 as shown in FIG. 29. Thus, a rotation transmission path to a transport magazine locking mechanism 600X2 (FIG. 30, 42) is formed as described below.

Figure 21C:
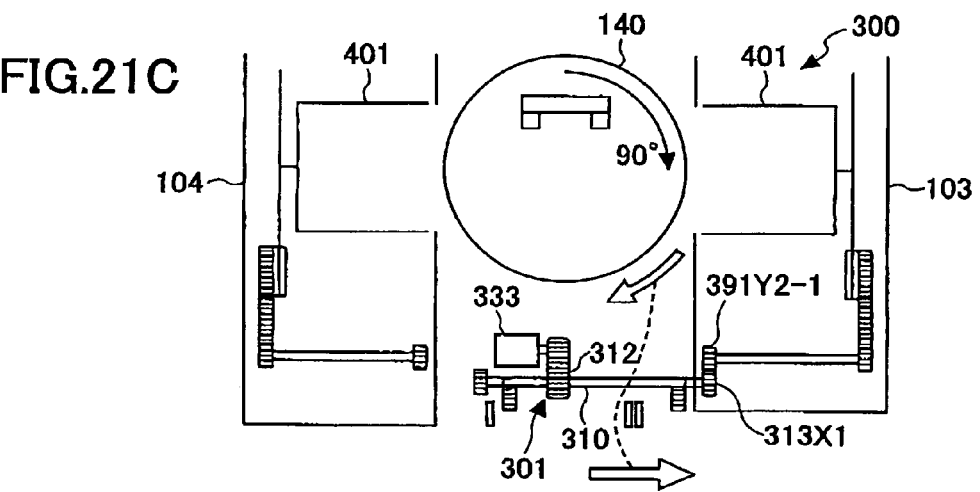
FIG. 21C is a schematic illustration showing the transmission rotation path forming device in a state wherein a rotation transmission path to an X1-side magazine is formed.

When the turntable 140 is rotated approximately 90 degrees from the home position, the drive gear 313X1 engages the magazine gear 391Y2-1 as shown in FIGS. 21C. Thus, a rotation transmission path to the tape cartridge transport magazine 103 is formed as described below in greater detail.

Figure 30:
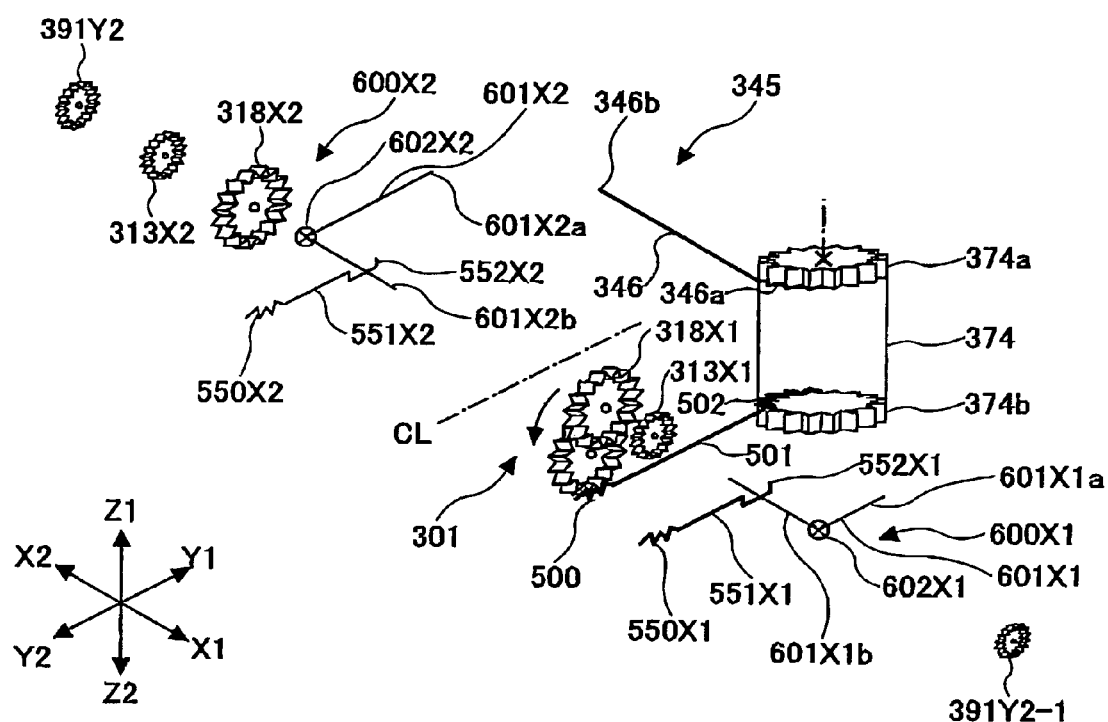
FIG. 30 is a schematic illustration showing power transmission paths from a drive shaft unit to magazines, a door locking mechanism, and magazine locking mechanisms.

5 [Overview of Power Transmission Paths from Drive Shaft Unit 301, to Tape Cartridge Transport Magazines 103, 104, Door Locking Mechanism 345, and Magazine Locking Mechanisms 600X1, 600X2] (FIG. 30)

FIG. 30 schematically illustrates power transmission paths from the drive shaft unit 301, to the tape cartridge transport magazines 103, 104, the door locking mechanism 345, and the magazine locking mechanisms 600X1, 600X2.

A power transmission path to the tape cartridge transport magazine 103 is formed when the drive gear 313X1 engages the magazine gear 391Y2-1.

A power transmission path to the tape cartridge transport magazine 104 is formed when the drive gear 313X2 engages the magazine gear 391Y2.

A power transmission path to the door locking mechanism 345 is formed when the swing pinion 318X1 engages the rack section 500.

A power transmission path to the magazine locking mechanism 600X1 is formed when the swing pinion 318X1 engages the rack section 550X1.

A power transmission path to the magazine locking mechanism 600X2 is formed when the swing pinion 318X2 engages the rack section 550X2.

Operations for forming these power transmission paths are described below in detail.

Figure 31:
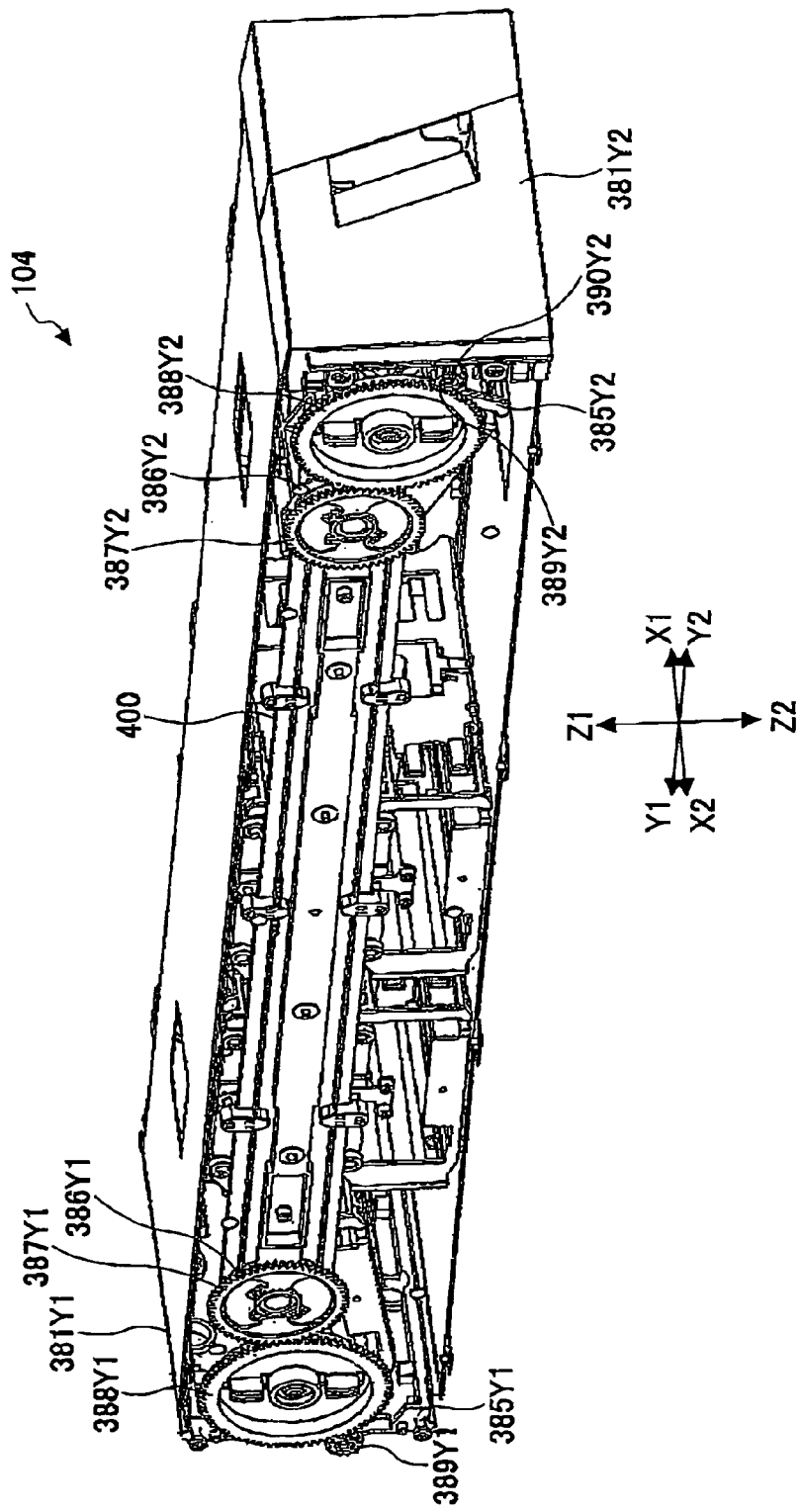
FIG. 31 is a perspective view of the X2-side media cartridge transport magazine with an X2-side lateral plate removed, viewed from the X2 side.
Figure 32:
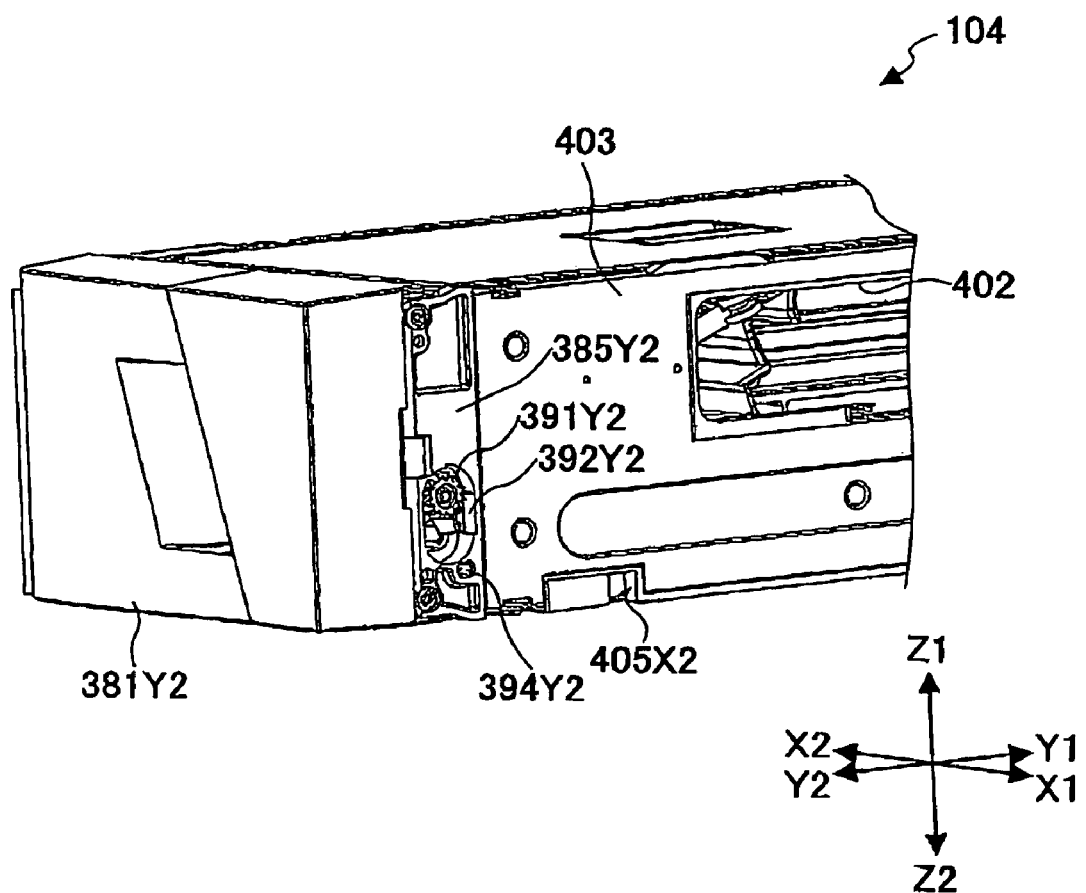
FIG. 32 is a perspective view of the media cartridge transport magazine of FIG. 31, viewed from the X1 side.
Figure 33:
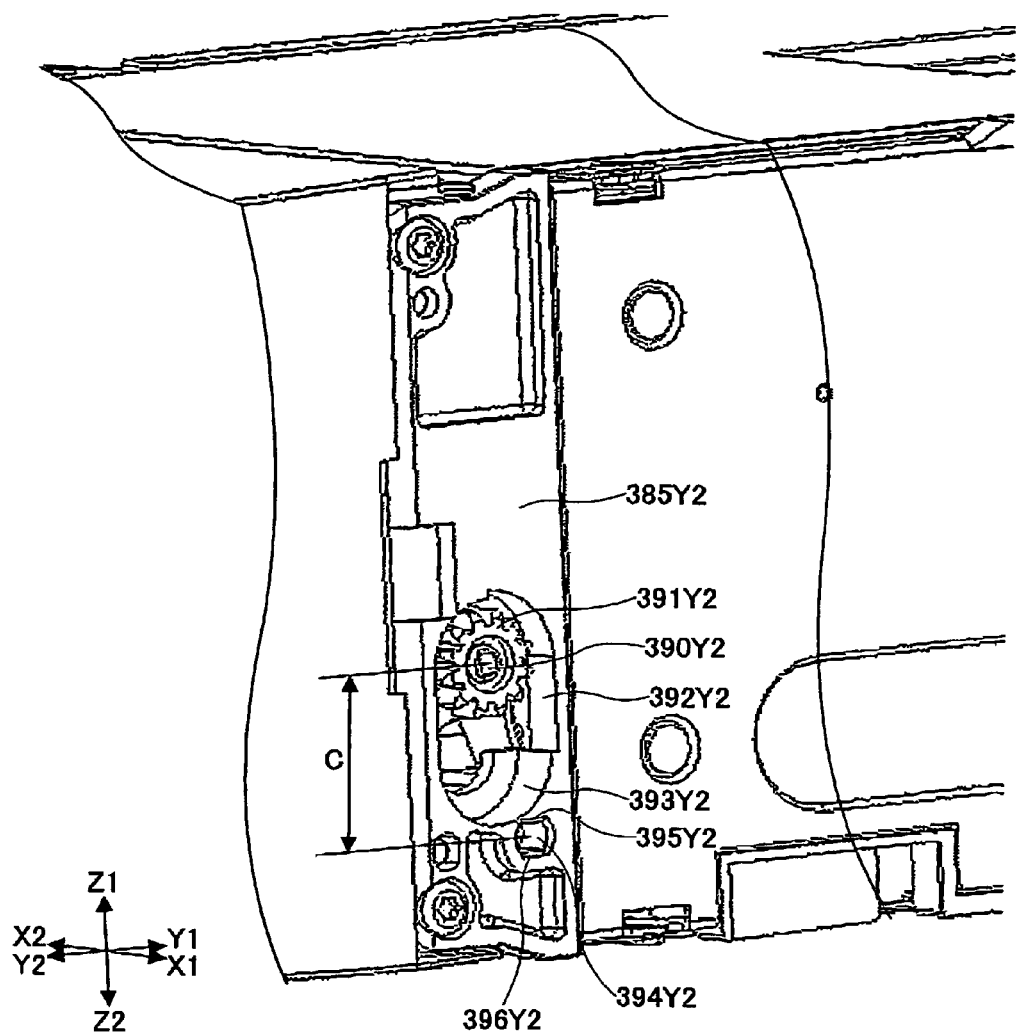
FIG. 33 is an enlarged view illustrating a part of the media cartridge transport magazine of FIG. 31.

6 [Configuration of Tape Cartridge Transport Magazines 103, 104] (FIGS. 31-33)

FIG. 31 is a perspective view of the tape cartridge transport magazine 104 with an X2-side lateral plate removed, viewed from the X2 side. FIG. 32 is a perspective view of the tape cartridge transport magazine 104 of FIG. 31, viewed from the X1 side. FIG. 33 is an enlarged view illustrating a part of the tape cartridge transport magazine 104 of FIG. 32.

Referring to FIG. 31, the tape cartridge transport magazine 104 is a quadrangular prism elongated in the Y1-Y2 direction and comprises decorative panels 381Y1 and 381Y2 at opposing longitudinal ends. In one embodiment, the tape cartridge transport magazine 104 can be installable at both the X1 side and the X2 side of the main module 110 by reversing the longitudinal orientation without turning it upside down. Alternatively, the tape cartridge transport magazine 104 can be positioned and/or oriented differently relatively to the main module 110.

As shown in FIG. 31, a frame 385Y2, a pulley 386Y2, a large-diameter gear member 388Y2 that engages a gear section 387Y2 provided at the end of the pulley 386Y2, and a small-diameter gear member 389Y2 that engages the large-diameter gear member 38SY2 are provided at the Y2 side. The small-diameter gear member 389Y2 is secured to an end of a rotary shaft 390Y2.

As shown in FIGS. 32 and 33, the magazine gear 391Y2 having a small diameter is secured to the opposite end of the rotary shaft 390Y2. An opening 392Y2 elongated in the Z direction is formed in the frame 385Y2. The magazine gear 391Y2 is exposed from a Z1-side part of the opening 392Y2. The opening 392Y2 includes an opening portion 393Y2 having a size that allows the drive gear 313X2 to be fitted therein. A positioning hole 394Y2 is formed at the Z2 side of the opening portion 393Y2 in the frame 3B5Y2.

Referring back to FIG. 31, a frame 38SY1, a pulley 386Y1, a gear section 387Y1, a large-diameter gear member 388Y1, a small-diameter gear member 389Y1, and the magazine gear (not shown in FIG. 31) are provided at the Y1 side similar to the Y2 side.

Plural tape cartridge containers 401 (FIG. 2) are disposed at even intervals on a belt 400 extending around the pulleys 386Y1 and 386Y2.

An opening 402 (FIG. 32) having a size corresponding to the tape cartridge 10 is formed in an X2-side lateral plate 403 of the tape cartridge transport magazine 104 so as to oppose the tape cartridge picker 102 when the tape cartridge transport magazine 104 is mounted. Also, openings (not shown) for inserting tape cartridges 10 are formed in the lateral plate 403 of the tape cartridge transport magazine 104 so as to oppose the corresponding tape cartridge containers 401.

Figure 34:
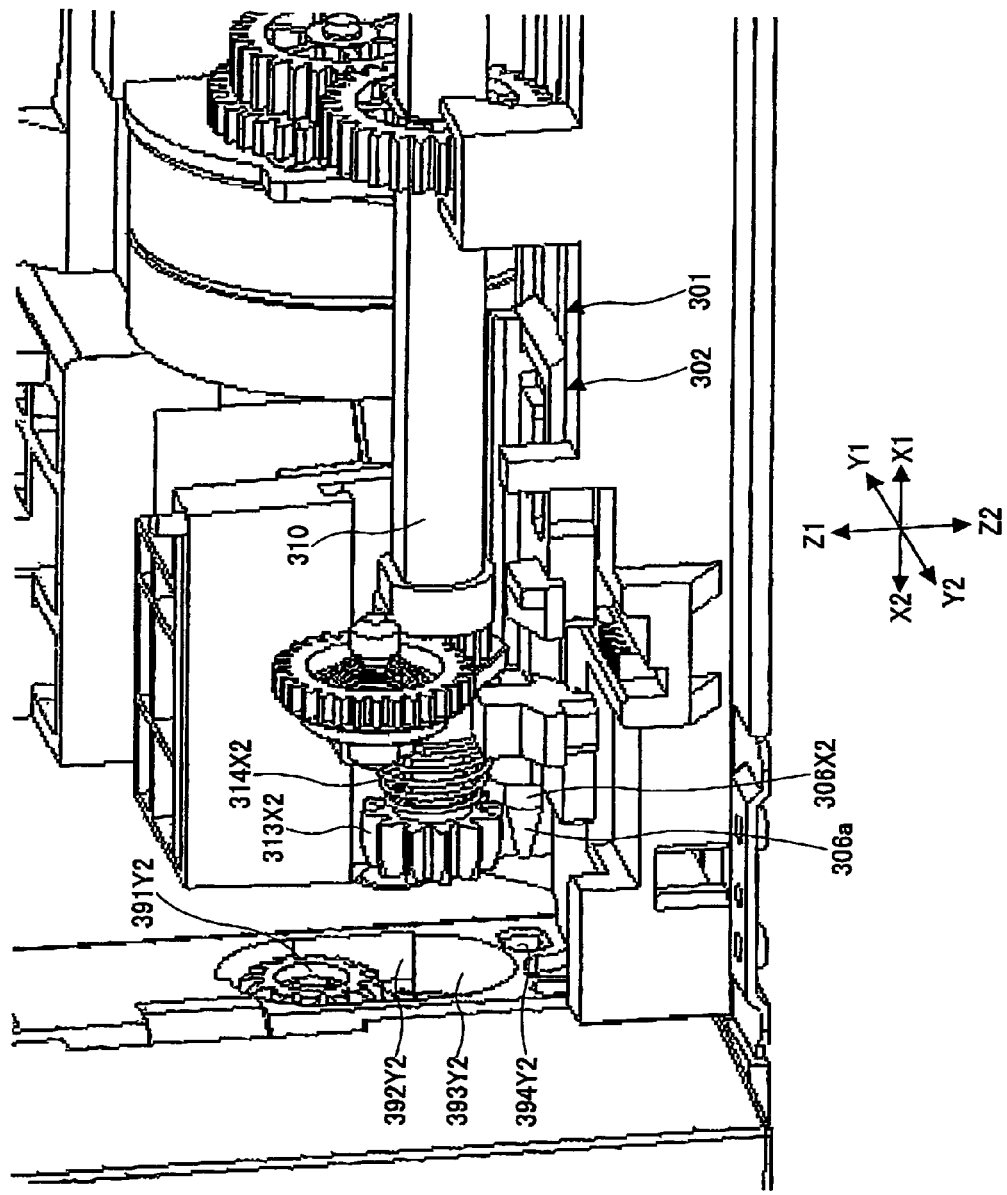
FIG. 34 illustrates an X2-side part of the drive shaft unit opposing a magazine in the initial state.

When the tape cartridge transport magazines 103 and 104 are attached at the X1 side and the X2 side as shown in FIG. 1, the drive shaft unit 301 can be located at the home position shown in FIG. 21A. At the X2 side, as shown in FIG. 34, the magazine gear 391Y2, the opening 392Y2, and the positioning hole 394Y2 oppose the drive gear 313X2 (313X1) and the positioning pin 306X2 (306X1). The opening 402 opposes the tape cartridge picker 102.

Figure 35:
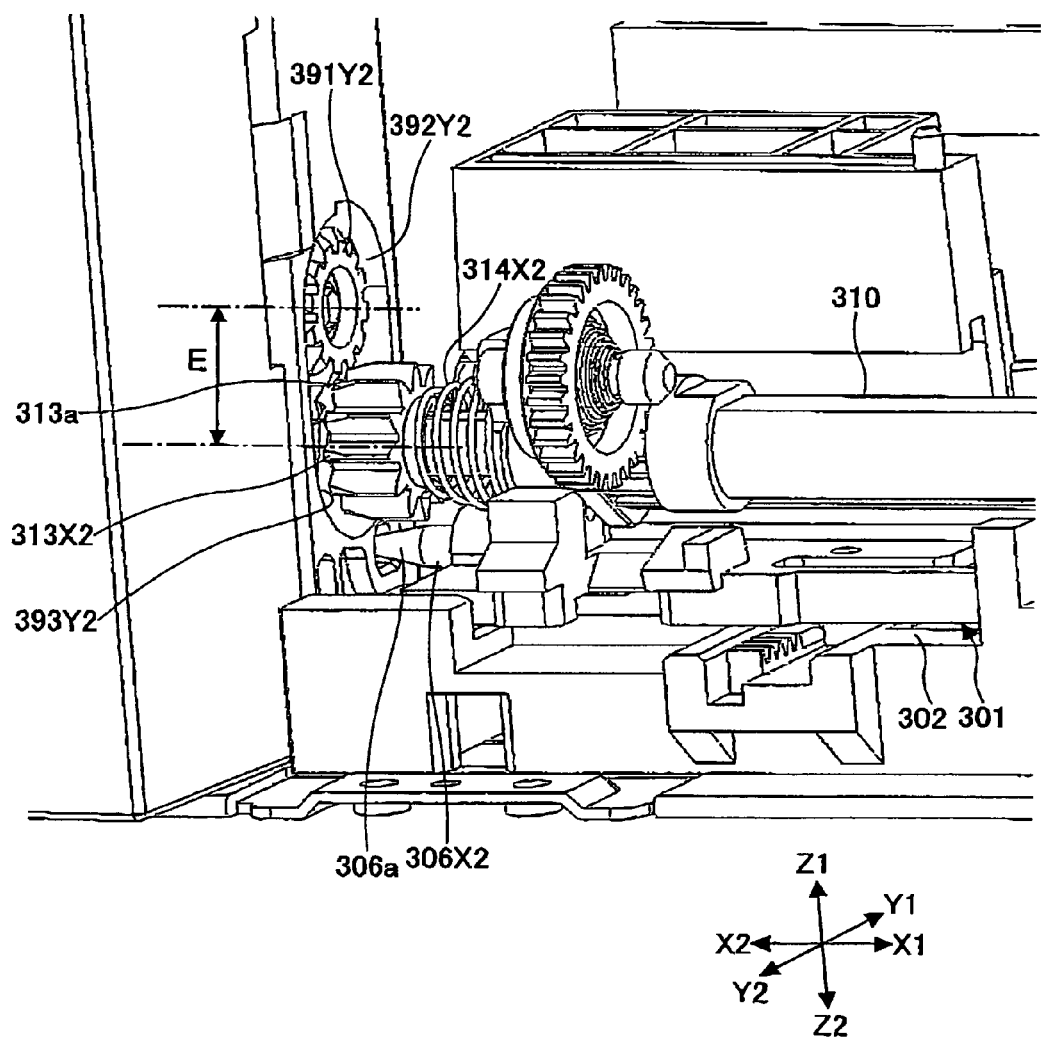
FIG. 35 illustrates the X2-side part of the drive shaft unit in a process of being coupled with the magazine.

7 [Operations for Selectively Driving Tape Cartridge Transport Magazines 103, 104] (FIGS. 34-36)

FIG. 21B shows a state to drive the tape cartridge transport magazine 104. FIG. 21C shows a state to drive the tape cartridge transport magazine 103.

When a command to drive the tape cartridge transport magazine 104 is entered, the stepping motor 165 is driven in the normal direction by the motor control circuit 410. Then, the magazine drive motor 333 is driven (see FIG. 4).

When the stepping motor 165 is driven, the turntable 140 is rotated in the counterclockwise direction through the reduction gear train 166. At the same time, the drive shaft unit 301 is driven in the X2 direction through the gear member 321 (FIG. 13). The stepping motor 165 is stopped at the time when the photo sensor 370 detects that the turntable 140 is rotated approximately 90 degrees in the counterclockwise direction. The drive shaft unit 301 is moved in the X2 direction, so that the drive gear 313X2 is inserted into the opening portion 393Y2 to engage the magazine gear 391Y2. Thus, the rotation transmission path forming device 300 forms the rotation transmission path from the magazine drive motor 333 to the tape cartridge transport magazine 104.

At the end of the movement of the drive shaft unit 301 in the X2 direction, the positioning pin 306X2 fits into the positioning hole 394Y2 so as to set the center distance between the magazine gear 391Y2 and the drive gear 313X2 to the appropriate value. E, as shown in FIG. 35, for example. When the drive shaft unit 301 is further moved in the X2 direction to be inserted into the opening portion 393Y2 from the lateral side thereof, tooth sections of the drive gear 313X2 fit into tooth groove sections of the magazine gear 391Y2 as shown in FIG. 36. Thus, the drive gear 313X2 correctly engages the magazine gear 391Y2. The tapered face 313a helps the drive gear 313X2 to smoothly engage the magazine gear 391Y2.

After the drive gear 313X2 engages the magazine gear 391Y2, the gear 312 is rotated by the magazine drive motor 333 through the reduction gear 334. Accordingly, the drive shaft 310 and the drive gears 313X1, 313X2 are rotated. The rotation of the drive gear 313X2 is transmitted to the magazine gear 391Y2, the large-diameter gear member 388Y2, the gear section 387Y2, and to the pulley 386Y2. Thus, the belt 400 is driven so as to move the tape cartridge containers 401 together with the tape cartridges 10 stored in the tape cartridge containers 401.

When a command to stop driving the tape cartridge transport magazine 104 is entered, the magazine drive motor 333 is stopped. Then, the stepping motor 165 is driven in the reverse direction to rotate the turntable 140 back to the home position, Also, the drive shaft unit 301 is moved in the X1 direction back to the home position shown in FIG. 21A.

If a command to drive the tape cartridge transport magazine 103 is entered when the drive shaft unit 301 is located at the home position shown in FIG. 21A, the stepping motor 165 is driven in the reverse direction by the motor control circuit 410 (FIG. 4). Then, the magazine drive motor 333 is driven. Thus, the drive gear 313X1 correctly engages the magazine gear 391Y2-1 of the tape cartridge transport magazine 103 (see FIG. 21C) in substantially the same manner as described above. Accordingly, the belt 400 is driven by the magazine drive motor 333 so as to move the tape cartridge containers 401.

When a command to stop driving the tape cartridge transport magazine 103 is entered, the magazine drive motor 333 is stopped. Then, the stepping motor 165 is driven in the reverse direction to rotate the turntable 140 back to the home position. Also, the drive shaft unit 301 is moved in the X2 direction back to the home position shown in FIG. 21A.

Figure 37:
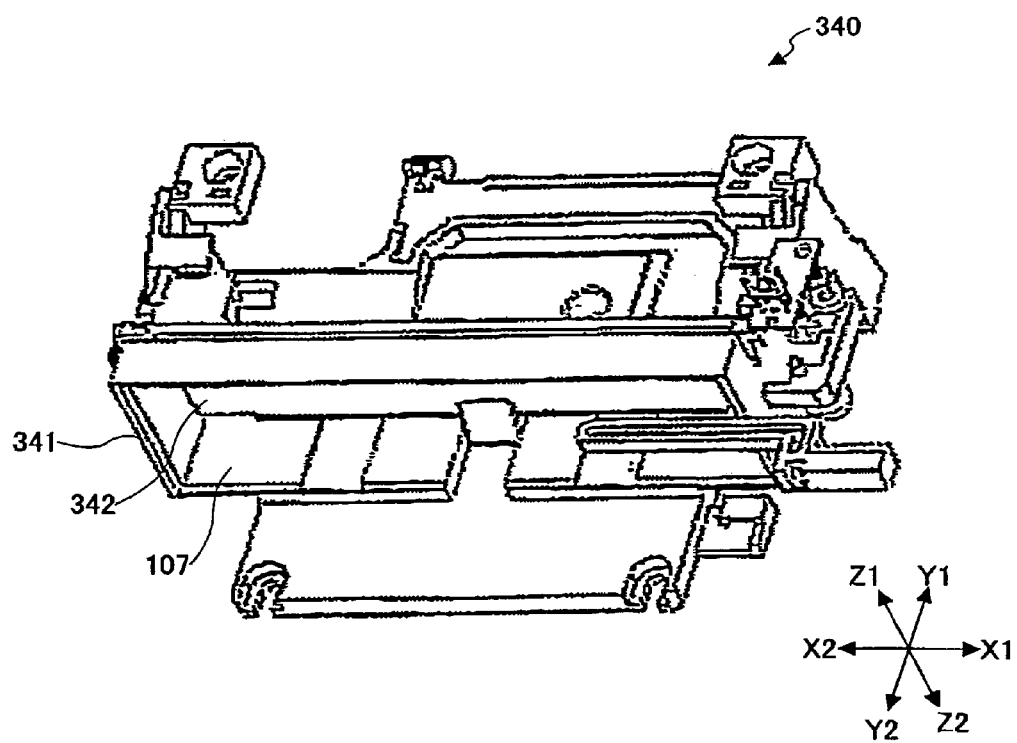
FIG. 37 is a perspective view illustrating a mail slot module.
Figure 38:
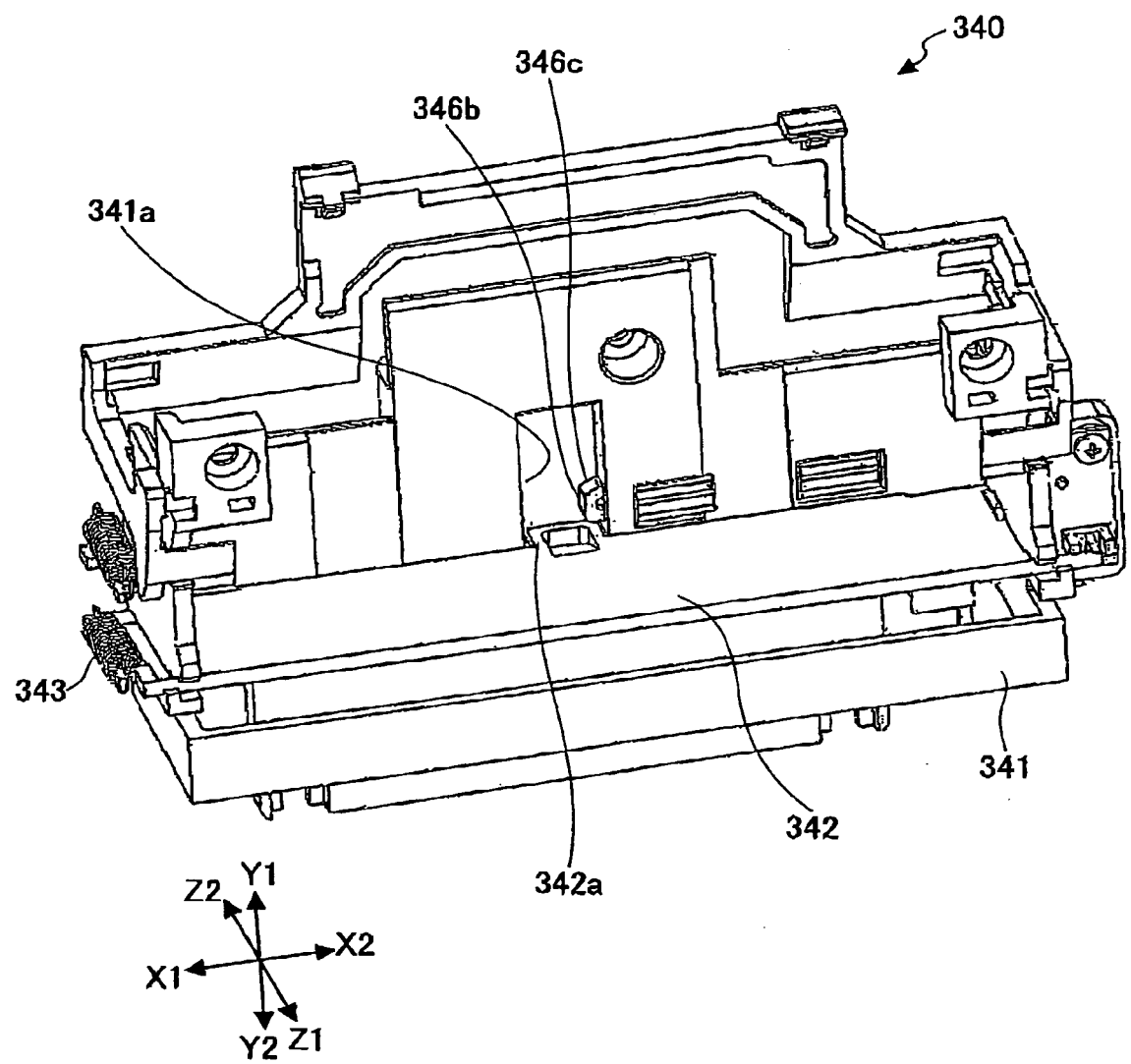
FIG. 38 is a perspective view of the mail slot module, viewed from the upper side of the Y1 side.
Figure 39:
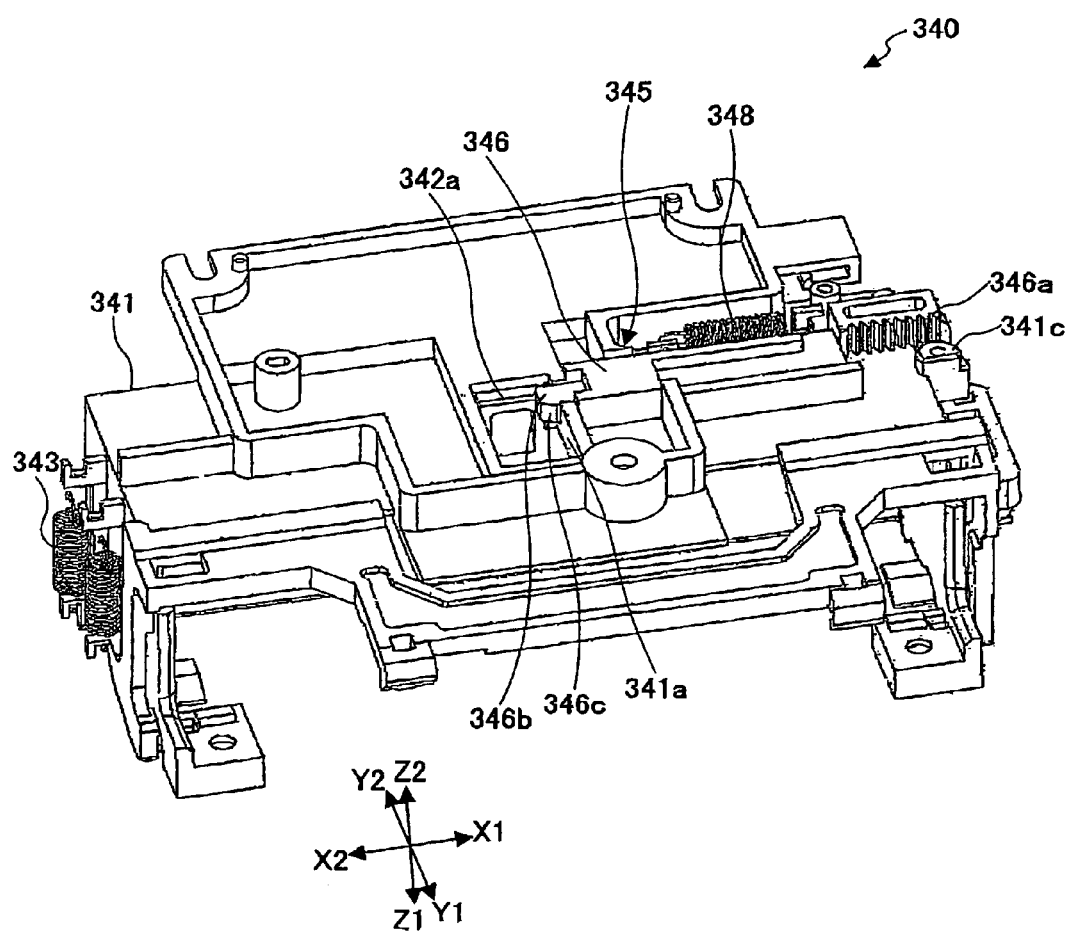
FIG. 39 is a perspective view of the mail slot module, viewed from the lower side of the Y1 side.

8 [Configuration of Mail Slot Module 340] (FIGS. 37-39)

With reference to FIGS. 37-39, the mail slot module 340 comprises a frame 341 having the mail slot 107, a door 342 that closes the mail slot 107, and the door locking mechanism 345 that locks the door 342 in a locked position wherein the mail slot 107 is closed by the door 342.

In one embodiment, the door 342, which pivots about the Z1 side thereof, is biased in the closed direction by a spring member 343 and configured to be pushed open by the tape cartridge 10 being inserted. The door 342 includes an extending portion 342a at the center, which extends in the Z2 direction. While the door 342 is closed, the extending portion 342a is fitted in a groove 341a formed in the frame 341.

The door locking mechanism 345 comprises a door locking member 346 that is slidably supported on a lower face of the frame 341, and a spring member 348 for biasing the door locking member 346 in the X2 direction. The door locking member 346 includes a rack section 346a at the X1 side and a locking section 346b at the X2 side. The locking section 346b includes a slant face 346c at the Y1 side.

Figure 17:
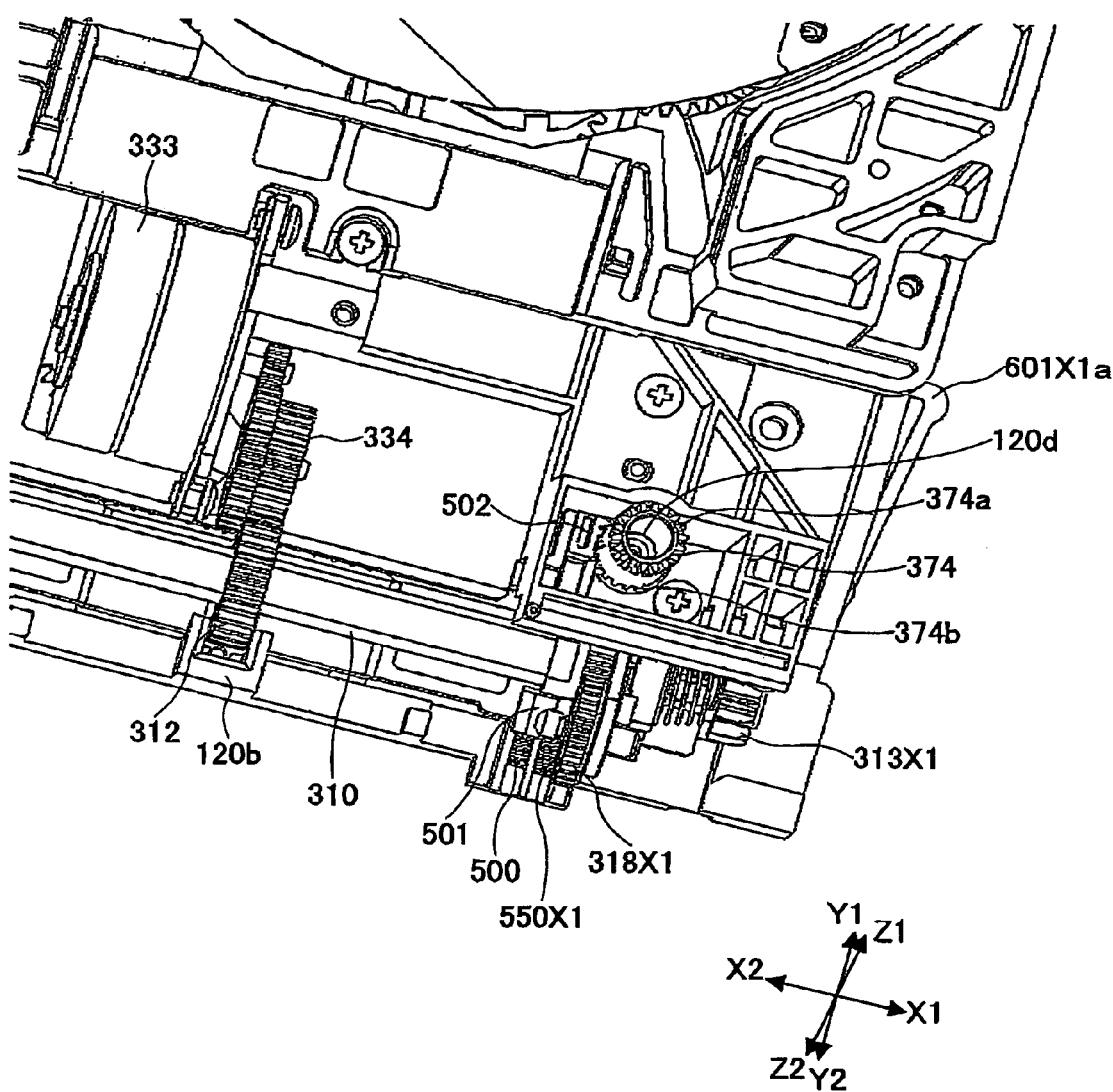
FIG. 17 is a perspective view showing an X1-side portion of the Y2-side part of the main module with the mail slot module removed.
Figure 18:
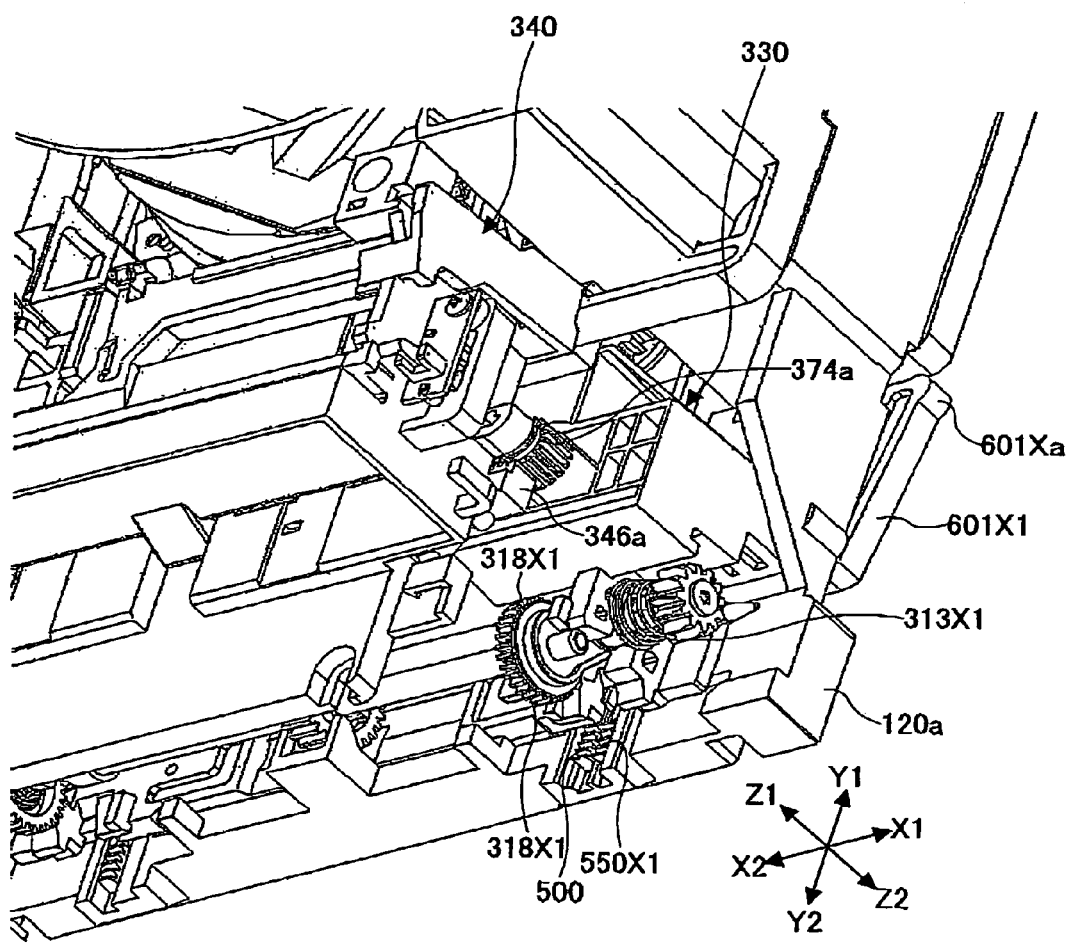
FIG. 18 is a perspective view of the Y2-side part of the main module, viewed obliquely from an X1 side.

Referring to FIGS. 15-17, a cylindrical pinion member 374 includes pinion sections 374a and 374b at the upper side and the lower side, respectively. The lower end of the pinion gear fits with respect to a projection 120d (FIGS. 13 and 17), while the lower end fits with respects to a projection 341c (FIG. 39) formed on the lower face of the frame 341. Thus, the pinion member 374 extends through the magazine drive motor module 330 and is vertically rotatable. The rack section 346a and the pinion section 374a engage each other.

As shown in FIG. 17, the rack section 500 is formed at the Y2 end of a rack member 501. The rack member 501 includes a rack section 502 at the Y1 end thereof. The rack section 502 and the pinion section 374b engage each other.

With reference to FIG. 30, the rack member 501 is connected to the pinion member 374 to allow power transmission therebetween, and the pinion member 374 is connected to the door locking member 346 to allow power transmission therebetween.

In a state shown in FIGS. 6, 38 and 39, the door locking member 346 is biased in the X2 direction by a biasing force of the spring member 348, and the locking section 346b extending from the X1 side into the groove 341a locks a rear face of the extending portion 342a, thereby locking the door 342 in the locked position.

Figure 26:
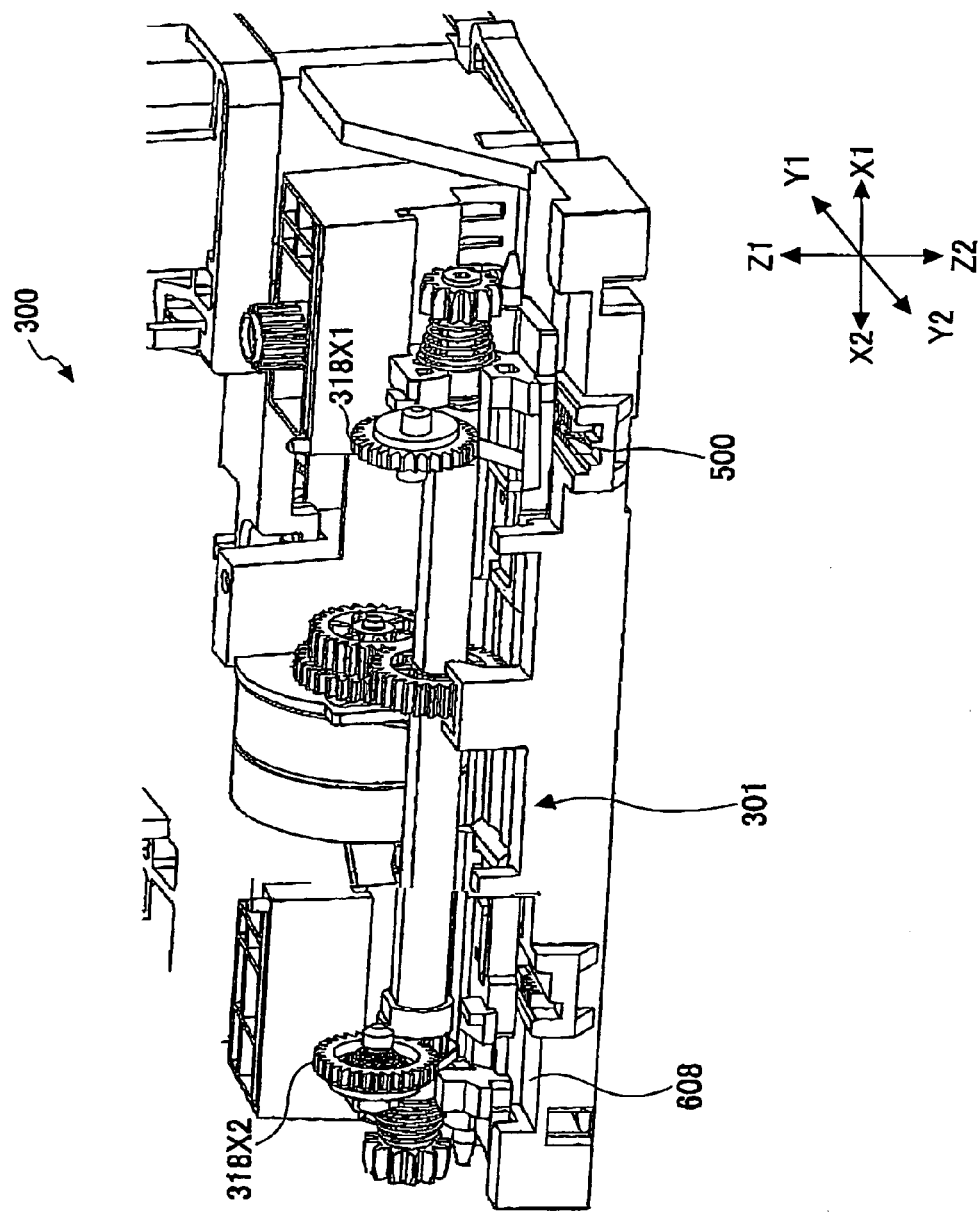
FIG. 26 shows the rotation transmission path forming device in an initial state of operations corresponding to a command to release the lock by a door locking mechanism.
Figure 40:
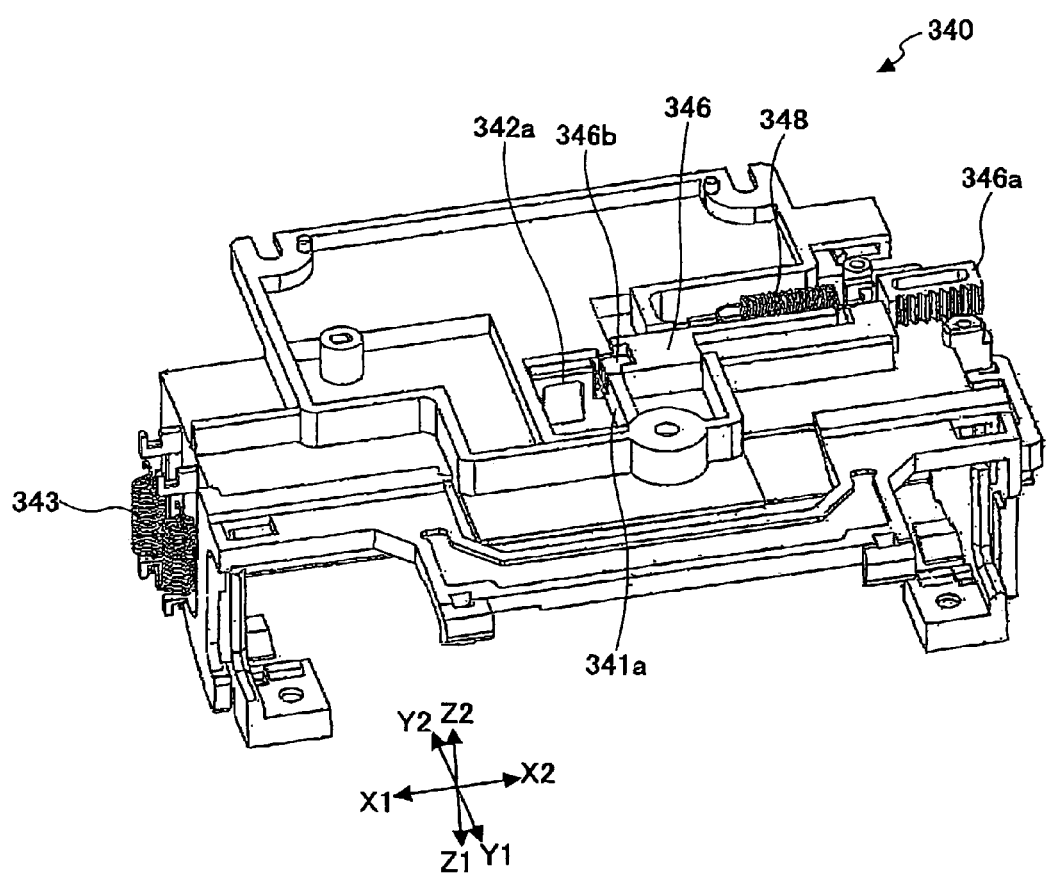
FIG. 40 illustrates the mail slot module in a state wherein a door lock is released, viewed from the same direction as FIG. 39.

9 [Door Lock Releasing Operations by Mail Slot Module 340] (FIGS. 26, 27, 40)

When a command to release the door lock is entered, the motor control circuit 410 (FIG. 4) rotates the stepping motor 165 in a direction that moves the drive shaft unit 301 in the X2 direction and rotates the turntable 140 in the counterclockwise direction. In one embodiment, the stepping motor 165 is stopped at the time when the photo sensor 370 detects that the turntable 140 is rotated approximately 30 degrees in the counterclockwise direction as shown in FIG. 22B. In this state, the drive shaft unit 301 is located at the position shown in FIG. 26 such that the swing pinion 318X1 is substantially aligned with the rack section 500.

After that, the magazine drive motor 333 is driven to cause the drive shaft 310 to rotate in the counterclockwise direction (viewed from the X1 side). The rotation of the drive shaft 310 causes the swing pinion 31BX1 to rotate in the clockwise direction, and the swing arms 317X1 and 317X2 are rotated in the counterclockwise direction. Thus the swing pinion 318X1 engages the rack section 500 as shown in FIG. 27, so that the rotation transmission path forming device 300 forms the rotation transmission path from the magazine drive motor 333 to the door locking mechanism 345.

The rotation of the swing pinion 318X1 causes the rack member 501 to move in the Y2 direction as shown in FIG. 40, so that the door locking member 346 is moved in the X1 direction by the pinion member 374. Thus, the door 342 is released from the locked state.

The door 342 is pushed open by the tape cartridge 10 when the tape cartridge 10 is inserted into the mail slot 107 (see FIG. 1). Thus, a part of the inserted tape cartridge 10 reaches the tape cartridge picker 102.

When the insertion of the tape cartridge 10 into the mail slot 107 is detected, the motor control circuit 410 rotates the magazine drive motor 333 in the reverse direction and subsequently rotates the stepping motor 165 in the reverse direction.

The reverse rotation of the magazine drive motor 333 causes the swing arms 317X1 and 317X2 to rotate in the clockwise direction, so that the swing pinion 31BX1 is moved away from the rack section 500. Then the door locking member 346 is moved back to its original position in the X2 direction by the biasing force of the spring member 348, and the rack member 501 is moved back to its original position in the Y2 direction.

When the tape cartridge 10 is moved onto the tape cartridge picker 102, the door 342 is closed by the spring member 343. In the process of closing the door 342, the extending portion 342a hits the slant face 346c to push the locking section in the X1 direction for a moment. When the door 342 is closed, the locking section 346b projects in the groove 341a to lock the door 342 closed.

The reverse rotation of the stepping motor 165 causes the turntable 140 to rotate back to the home position, and causes the drive shaft unit 301 to move in the X1 direction back to the home position shown in FIGS. 21A, 15, and 16.

The above-mentioned counterclockwise rotation of the swing arm 317X2 causes the swing pinion 318X2 to contact a flat face 608 (FIG. 27) such that the swing pinion 318X2 is slidably rotated on the flat face 608. Therefore, the swing pinion 318X2 does not interrupt the lock releasing operations.

Figure 41:
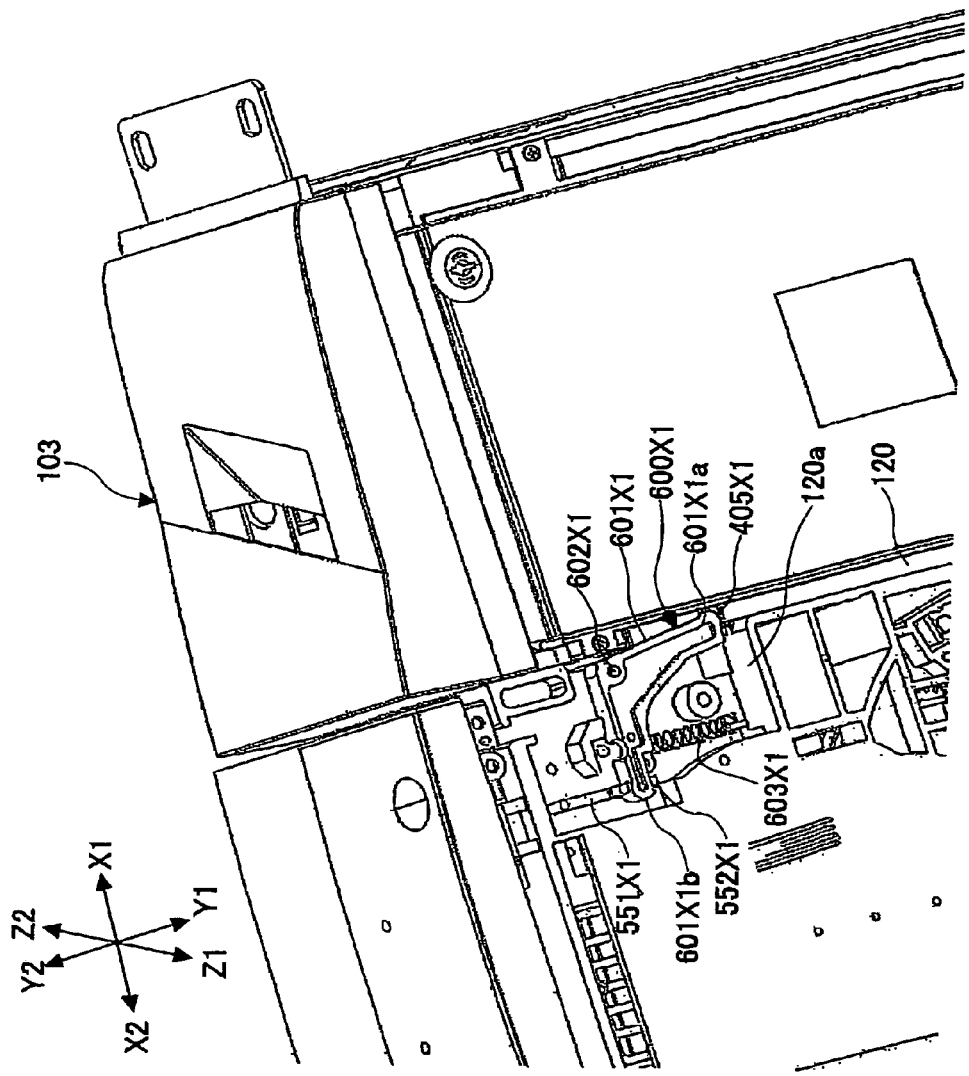
FIG. 41 illustrates an X1-side media cartridge transport magazine locking mechanism, viewed from a lower side of a media cartridge autoloader.
Figure 42:
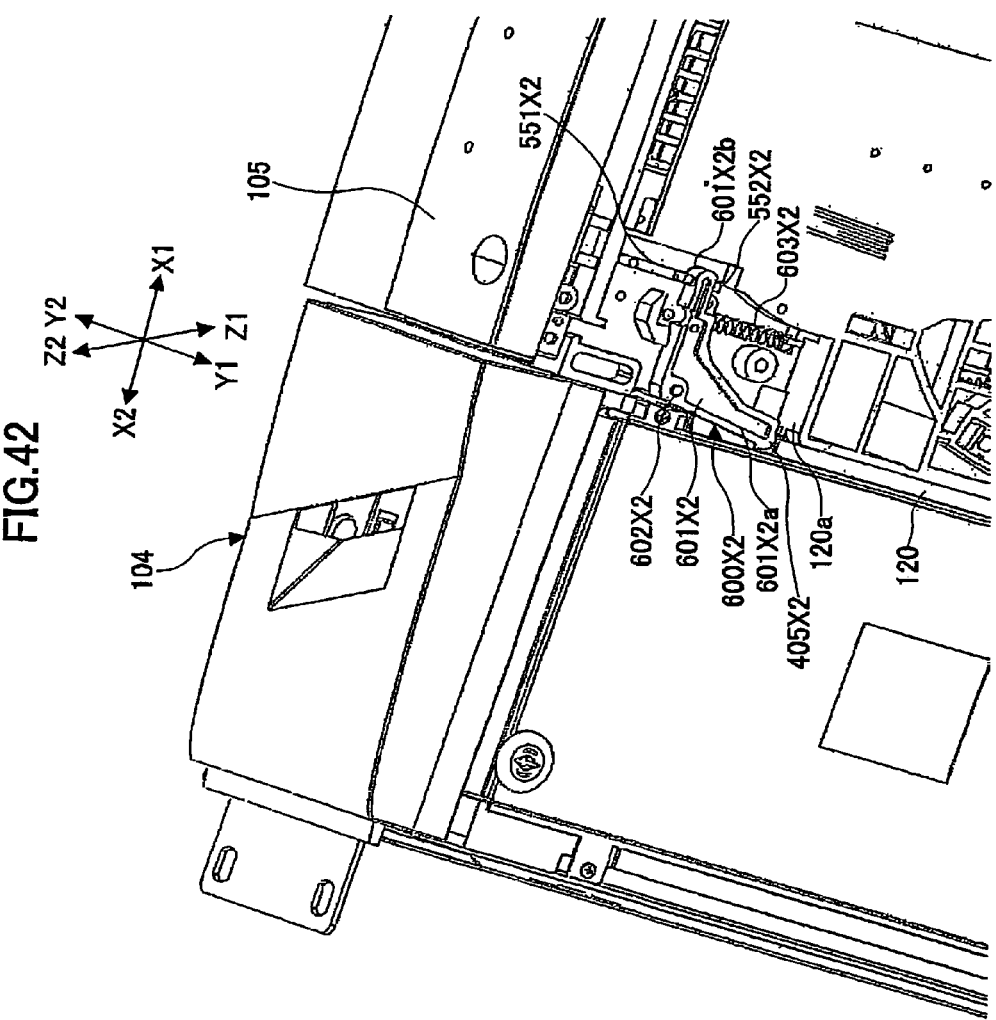
FIG. 42 illustrates an X2-side media cartridge transport magazine locking mechanism, viewed from a lower side of a media cartridge autoloader.

10 [Tape Cartridge Transport Magazine Locking Mechanism] (FIGS. 41, 42)

In the embodiments illustrated in FIGS. 41 and 42, the transport magazine locking mechanisms 600X1 and 600X2 are disposed on the lower face of the extension 120a of the base 120 of the main module 110.

Referring to FIG. 41, the transport magazine locking mechanism 600X1 is disposed on the X1 side of the main module 110, and includes an L-shaped locking member 601X1, a spring member 603X1, and a rack member 551X1.

The locking member 601X1 includes arms 601X1a and 601X1b, and is rotatably supported by a pin 602X1. The spring member 603X1 biases the locking member 601X1 in a direction such that the arm 601X1a projects over the base 120 in the X1 direction. The rack member 551X1 includes the aforesaid rack section 550X2 on the Y2 end side thereof and a hook section 552X1 on the Y1 end side thereof, and is supported by the base 120 to be slidable in the Y1-Y2 direction. The hook section 552X1 engages the arm 601X1b.

Referring to FIG. 42, the transport magazine locking mechanism 600X2 having a substantially similar configuration as the transport magazine locking mechanism 600X1 is disposed on the Y1 side of the main module 110.

In the embodiment illustrated in FIG. 1, magazine pushing mechanisms 610X1 and 610X2 are provided at the X1 side and the X2 side, respectively, at the Y1 end of the tape cartridge autoloader 100. The magazine pushing mechanisms 610X1 and 610X2 are configured to push out the tape cartridge transport magazines 103 and 104 in the Y2 direction.

In this embodiment, the tape cartridge transport magazine 103 is inserted in the Y1 direction from the Y2 side of the tape cartridge autoloader 100 through the X1 side of the control panel 105, and locked by transport magazine locking mechanism 600X1 when the arm 601X1a engages a recess 405X1 as shown in FIG. 41.

The tape cartridge transport magazine 104 is inserted in the Y1 direction from the Y2 side of the tape cartridge autoloader 100 through the X2 side of the control panel 105, and locked by transport magazine locking mechanism 600X2 when an arm 601X2a engages a recess 405X2 as shown in FIG. 42.

11 [Operations for Releasing Lock of Tape Cartridge Transport Magazine]

Figure 28:
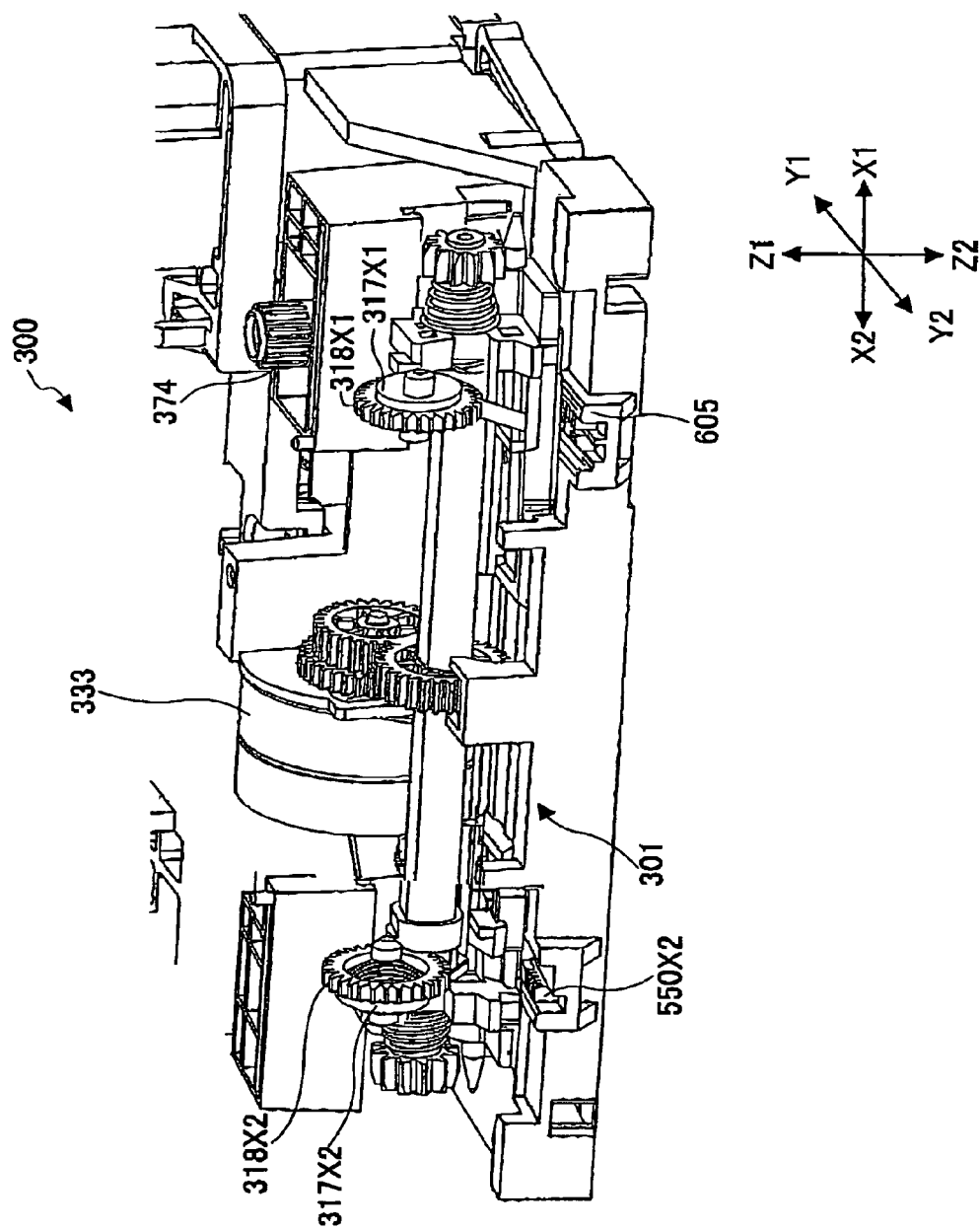
FIG. 28 shows the rotation transmission path forming device in an initial state of operations corresponding to a command to release the lock by an X2-side media cartridge transport magazine locking mechanism.
Figure 43:
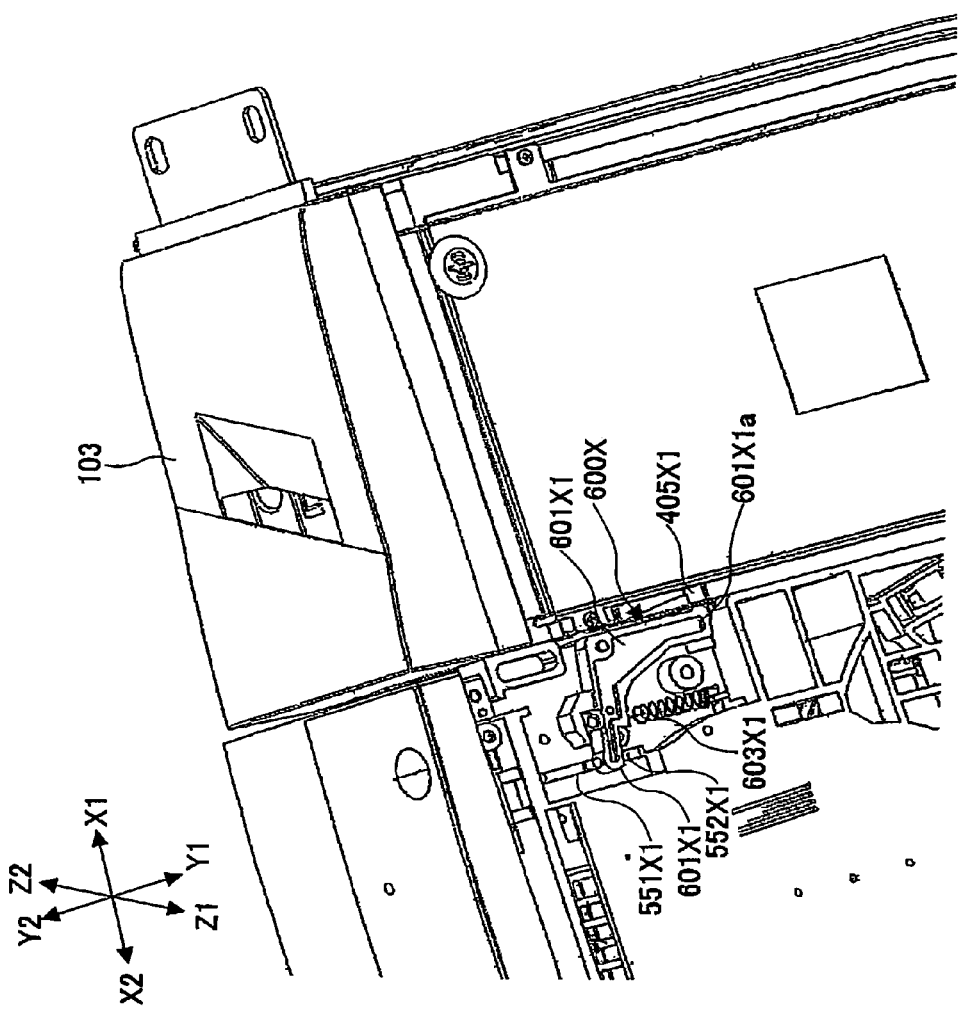
FIG. 43 shows the magazine locking mechanism of FIG. 41 in a state where the lock is released.

11-1 (Operations for Releasing Lock of Transport Magazine Locking Mechanism 600X1] (FIGS. 28, 29, 43)

When a command to release the lock by the transport magazine locking mechanism 600X1 is entered, the motor control circuit 410 (FIG. 4) rotates the stepping motor 165 in the normal direction. Thus, the drive shaft unit 301 is moved in the X2 direction, and the turntable 140 is rotated in the counterclockwise direction. In one embodiment, the stepping motor 165 is stopped at the time when the photo sensor 370 detects that the turntable 140 is rotated by approximately 15 degrees in the counterclockwise direction as shown in FIG. 22A. In this state, the drive shaft unit 301 is located at the position shown in FIG. 24 such that the swing pinion 318X1 faces the rack section 550X1.

After that, the magazine drive motor 333 causes the drive shaft 310 to rotate in the clockwise direction (viewed from the X1 side). The rotation of the drive shaft 310 causes the swing pinion 318X1 to rotate in the counterclockwise direction, and the swing arms 317X1 and 317X2 are rotated in the counterclockwise direction. Thus, the swing pinion 318X1 engages the rack section 550X1 as shown in FIG. 25, so that the rotation transmission path forming device 300 forms the rotation transmission path from the magazine drive motor 333 to the transport magazine locking mechanism 600X1.

The rotation of the swing pinion 318X1 causes the rack member 551X1 to move in the Y2 direction. With this movement, the locking member 601X1 is rotated to bring the arm 601X1a out of the recess 405X1, thereby releasing the tape cartridge transport magazine 103 from the locked state. The tape cartridge transport magazine 103 is then pushed a small distance in the Y2 direction by the pushing mechanism 610X1.

Then, the motor control circuit 410 can rotate the magazine drive motor 333 in the reverse direction, and can subsequently rotate the stepping motor 165 in the reverse direction.

The reverse rotation of the magazine drive motor 333 causes the swing arms 317X1 and 317X2 to rotate in the clockwise direction, so that the swing pinion 318X1 is moved away from the rack section 550X1. Then the transport magazine locking mechanism 600X1 is rotated back to the original locking position by a biasing force of the spring member 603X1.

The reverse rotation of the stepping motor 165 causes the turntable 140 to rotate back to the home position, and causes the drive shaft unit 301 to move in the X1 direction back to the home position shown in FIGS. 21A, 15, and 16.

The above-mentioned counterclockwise rotation of the swing arm 317X2 causes the swing pinion 318X2 to contact the bank 607 (FIG. 25) such that the swing pinion 31BX2 is slidably rotated on the bank 607. Therefore, the swing pinion 318X2 does not interrupt the lock releasing operations.

Figure 44:
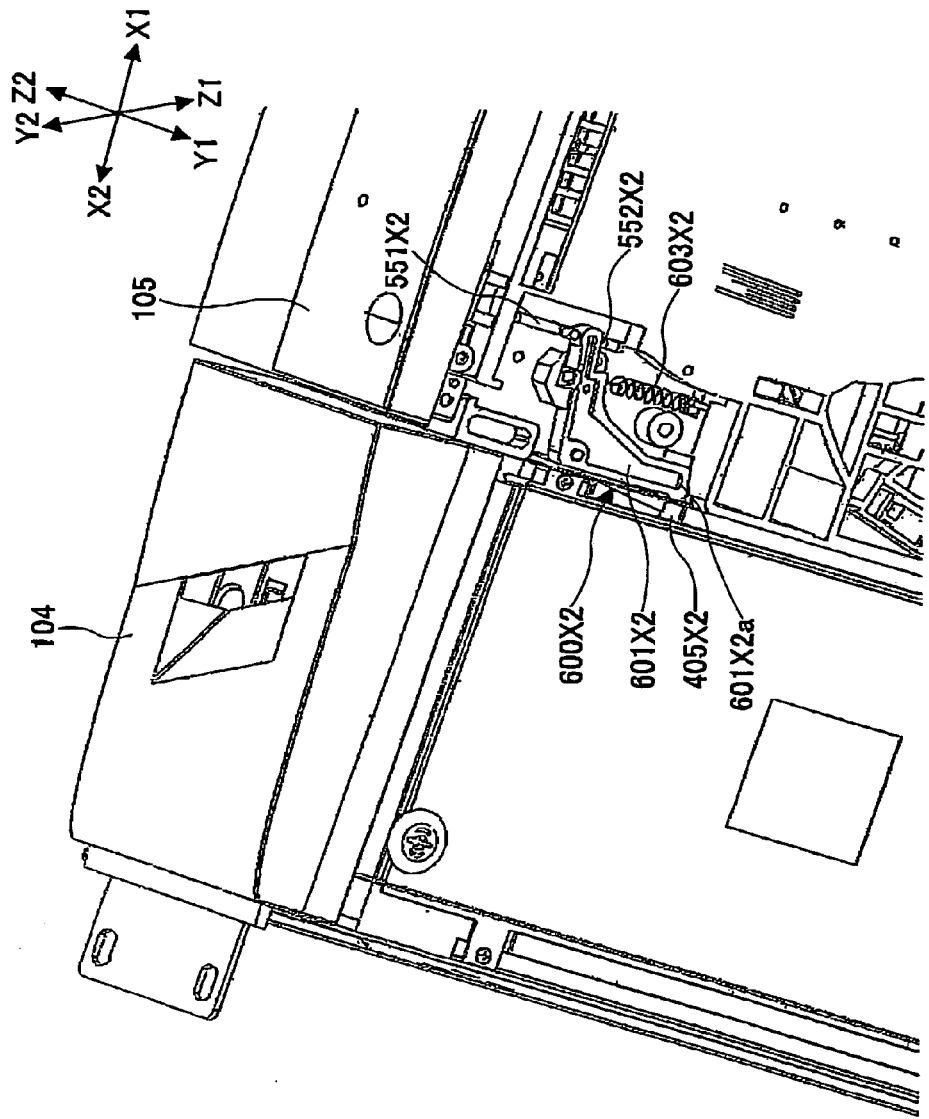
FIG. 44 shows the magazine locking mechanism of FIG. 42 in a state where the lock is released.

11-2 [Lock Releasing Operations by Transport Magazine Locking Mechanism 600X2] (FIGS. 28, 29, 44)

When a command to release the lock by the transport magazine locking mechanism 600X2 disposed at the X2 side is entered, the motor control circuit 410 (FIG. 4) rotates the stepping motor 165 in the reverse direction. Thus, the drive shaft unit 301 is moved in the X1 direction, and the turntable 140 is rotated in the clockwise direction The stepping motor 165 is stopped at the time when the photo sensor 370 detects that the turntable 140 is rotated by approximately 15 degrees in the clockwise direction as shown in FIG. 22C. In this state, the drive shaft unit 301 is located at the position shown in FIG. 28 such that the swing pinion 318X2 faces the rack section 550X2.

After that, the magazine drive motor 333 causes the drive shaft 310 to rotate in the counterclockwise direction (viewed from the X1 side). The rotation of the drive shaft 310 causes the swing pinion 31X2 to rotate in the clockwise direction, and the swing arms 317X1 and 317X2 are rotated in the counterclockwise direction. Thus the swing pinion 318X2 engages the rack section 550X2 as shown in FIG. 29, so that the rotation transmission path forming device 300 forms the rotation transmission path from the magazine drive motor 333 to the transport magazine locking mechanism 600X2.

The rotation of the swing pinion 31BX2 causes a rack member 551X2 to move in the Y2 direction. With this movement, a locking member 601X2 is rotated to bring the arm 601X2a out of the recess 405X2, thereby releasing the tape cartridge transport magazine 104 from the locked state. The tape cartridge transport magazine 104 is then pushed a small distance in the Y2 direction by the pushing mechanism 610X2.

Then, the motor control circuit 410 can rotate the magazine drive motor 333 in the reverse direction, and can subsequently rotate the stepping motor 165 in the normal direction.

The reverse rotation of the magazine drive motor 333 causes the swing arms 317X1 and 317X2 to rotate in the clockwise direction, so that the swing pinion 318X2 is moved away from the rack section 550X2. Then the transport magazine locking mechanism 600X2 is rotated back to the original locking position by a biasing force of a spring member 603X2.

The normal rotation of the stepping motor 165 causes the turntable 140 to rotate back to the home position, and causes the drive shaft unit 301 to move in the X2 direction back to the home position shown in FIGS. 21A, 15, and 16.

The above-mentioned counterclockwise rotation of the swing arm 317X1 causes the swing pinion 318X1 to contact the bank 605 (FIG. 29) such that the swing pinion 318X1 is slidably rotated on the bank 605. Therefore, the swing pinion 318X1 does not interrupt the lock releasing operations.

Figure 45:
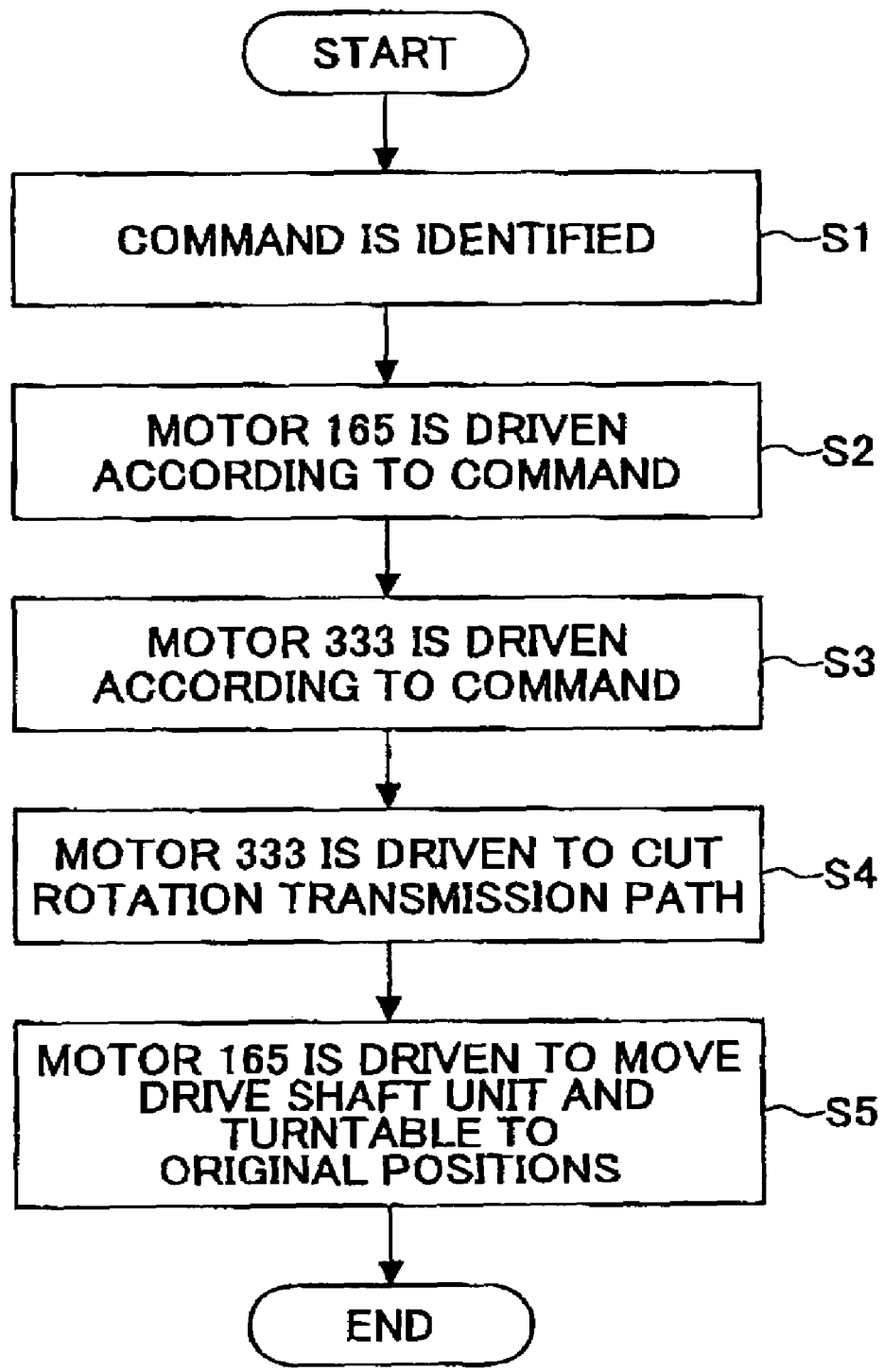
FIG. 45 is a flowchart illustrating operations of a microcomputer of a motor control circuit.

12 [Operations of Microcomputer of Motor Control Circuit 410] (FIG. 45)

The microcomputer of the motor control circuit 410 operates as illustrated in FIG. 45.

First, an entered command (S1) is identified. Then, the stepping motor 165 is driven in accordance with the entered command while signals from the photo sensor 370 are monitored (S2). Subsequently, the magazine drive motor 333 is driven in accordance with the entered command (S3).

After that, the magazine drive motor 333 is rotated so as to cut a corresponding rotation transmission path (S4). In the last step, the stepping motor 165 is driven to return the turntable 140 and the drive shaft unit 301 to their home positions (S5).

13 [Emergency Operations for Releasing Lock of Tape Cartridge Transport Magazine] (FIGS. 46-49)

Referring to FIG. 1, there is a first gap 700X1 between the main module 110 and the X1-side tape cartridge transport magazine 103 in the tape cartridge autoloader 100. Similarly, there is a second gap 700X2 between the main module 110 and the X2-side tape cartridge transport magazine 104. The gaps 700X1 and 700X2 continue to extend through the front panel of the tape cartridge autoloader 100.

Figure 46:
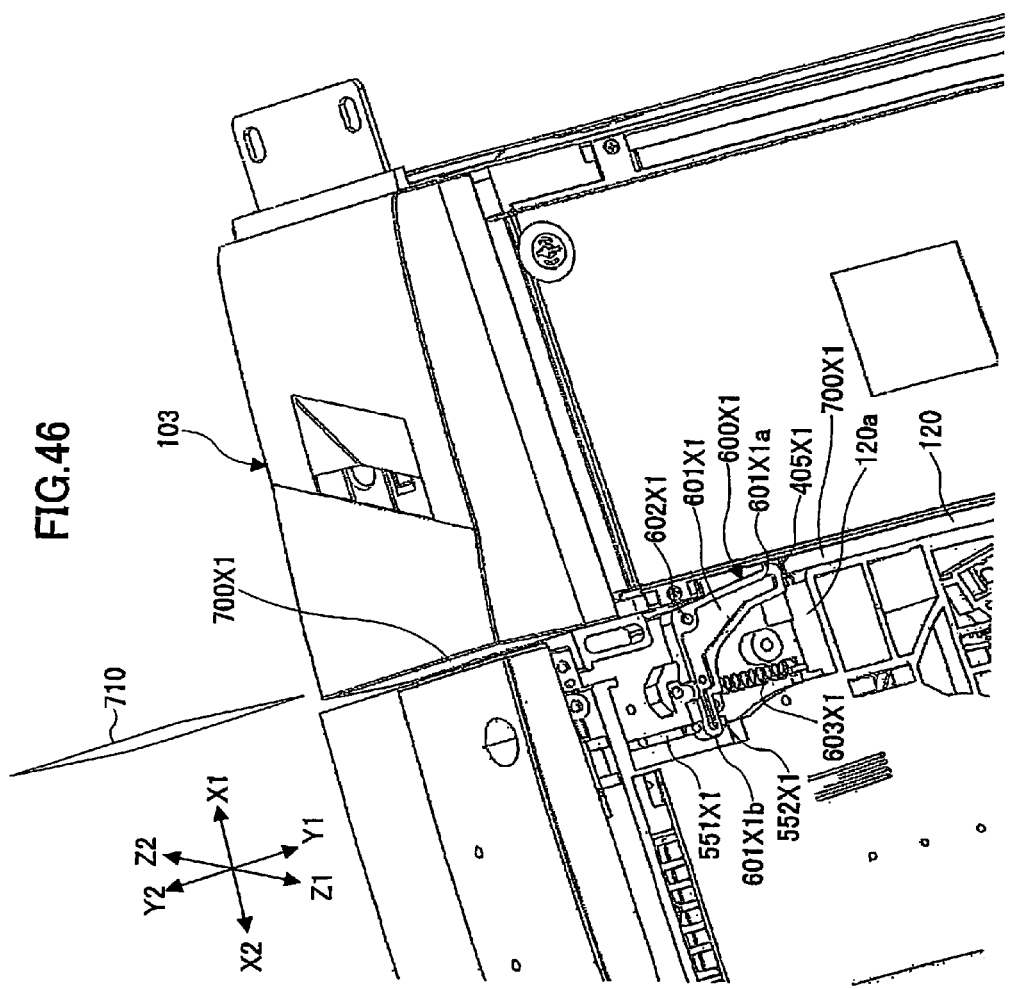
FIGS. 46 and 47 illustrate emergency operations for releasing the lock by the X1-side media cartridge transport magazine.

With reference to FIG. 46, the arm 601X1a of the locking member 601X1 extends across the gap 700X1. Similarly, with reference to FIG. 48, the arm 601X2a of the locking member 601X2 extends across the gap 700X2.

There might be a case where the transport magazine locking mechanism 600X1 does not release the tape cartridge transport magazine 103 from the locked state although a command to do so is entered. In such a case, if there is an urgent need to remove the tape cartridge transport magazine 103, an operator can manually insert a thin plate member 710, which is sufficiently rigid and can be about the size of a business card, from the front panel side of the tape cartridge autoloader 100 into the gap 700X1 to move the plate member 710 in the Y1 direction while holding the Z2 side of the plate member 710 (FIG. 46).

Figure 47:
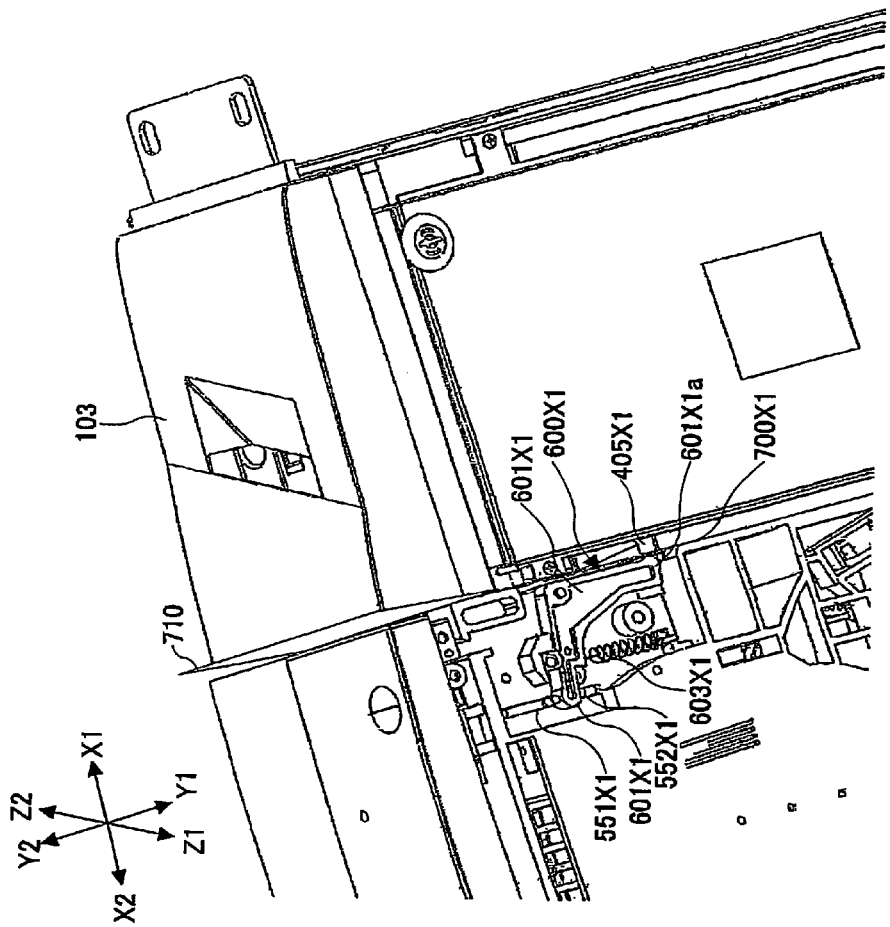

Thus, with reference to FIG. 47, the arm 601X1a of the locking member 601X1 is pushed by the inserted plate member 710, and rotated in the X2 direction, i.e., toward the inner side of the main module 110. As a result, the transport magazine locking mechanism 600X1 releases the tape cartridge transport magazine 103 from the locked state. The tape cartridge transport magazine 103 is then pushed slightly in the Y2 direction by the pushing mechanism 610X1.

Figure 48:
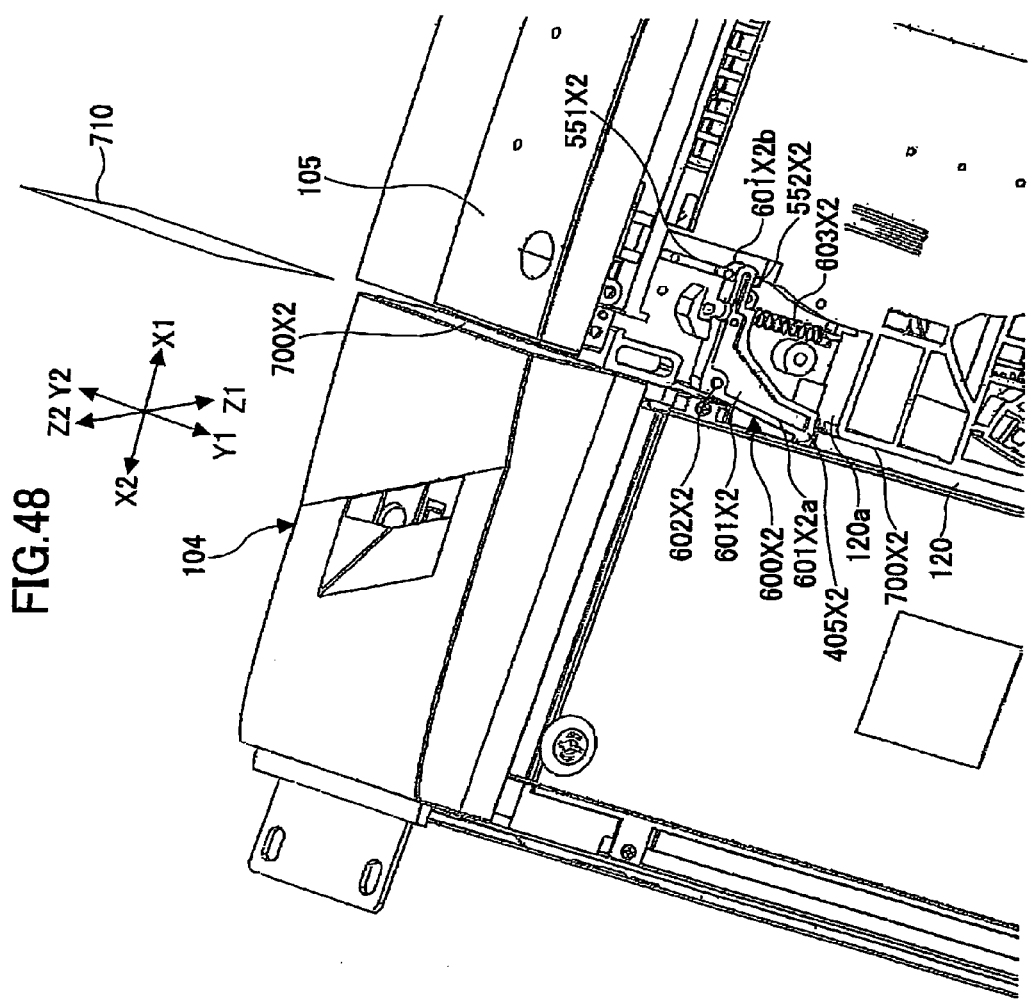
FIGS. 48 and 49 illustrate emergency operations for releasing the lock by the X2-side media cartridge transport magazine.

There might also be a case where the transport magazine locking mechanism 600X2 does not release the tape cartridge transport magazine 104 from the locked state although a command to do so is entered. In such a case, if there is an urgent need to remove the tape cartridge transport magazine 104, an operator can manually insert the plate member 710 from the front panel side of the tape cartridge autoloader 100 into the gap 700X2 to move the plate member 710 in the Y1 direction while holding the Z2 side of the plate member 710 (FIG. 48).

Figure 49:
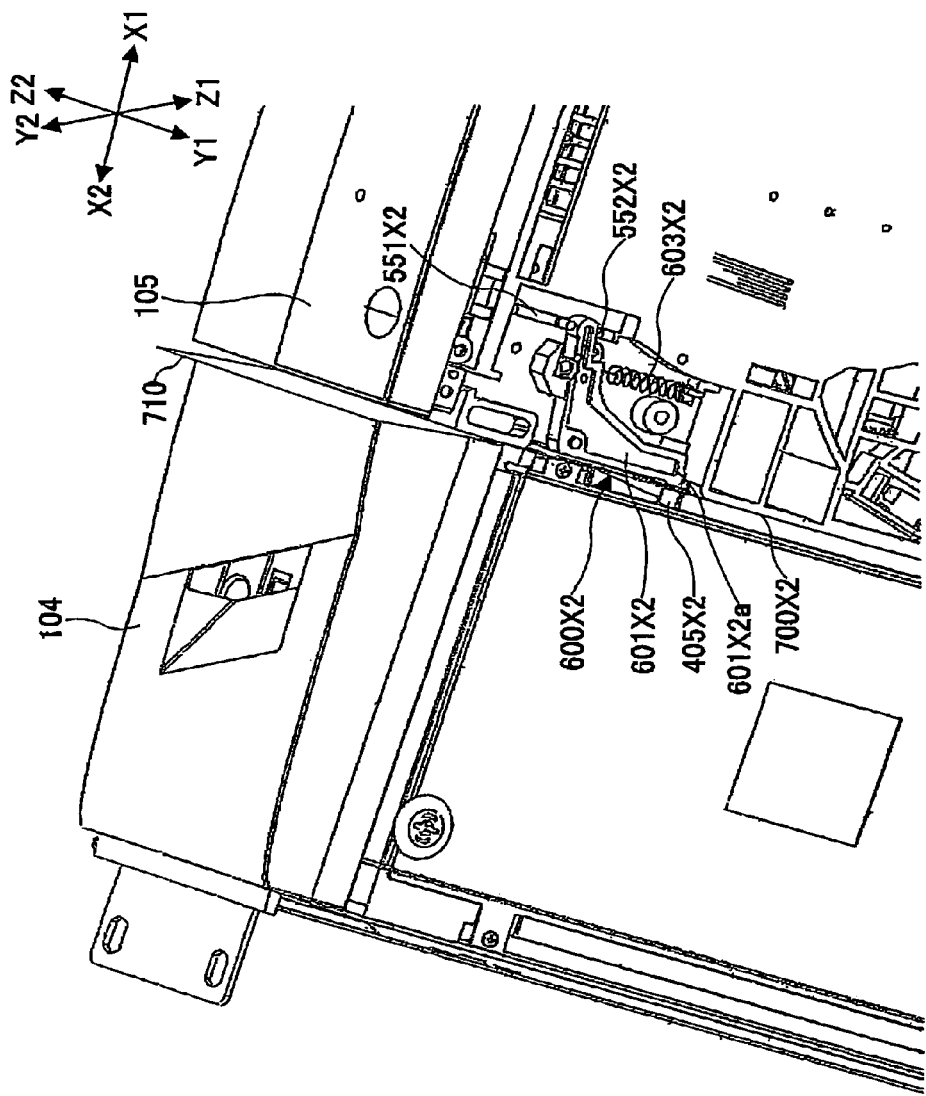

Thus, with reference to FIG. 49, the arm 601X2a of the locking member 601X2 is pushed by the inserted plate member 710, and rotated in the X1 direction, i.e., toward the inner side of the main module 110. As a result, the transport magazine locking mechanism 600X2 releases the tape cartridge transport magazine 104 from the locked state.

The tape cartridge transport magazine 104 is then pushed slightly in the Y2 direction by the pushing mechanism 610X2.

The tape cartridge transport magazines 103 and 104 can be released from the locked states and removed in the above-described manner even if the tape cartridge autoloader 100 is powered off.

The present application is based on Japanese Priority Application No. 2005-246541 filed on Aug. 26, 2005, with the Japanese Patent Office, the entire contents of which are hereby incorporated by reference.

While the particular autoloader 100 as herein shown and disclosed in detail is fully capable of obtaining the objects and providing the advantages herein before stated, it is to be understood that it is merely illustrative of various embodiments of the invention. No limitations are intended to the details of construction or design herein shown other than as described in the appended claims.

What is claimed is:

1. A media cartridge autoloader for use with a media cartridge, comprising:
   a media drive that receives the media cartridge;
   first and second media cartridge transport magazines positioned near the media drive, each media cartridge transport magazine being configured to transportably store the media cartridge; and
   a main module including (i) a media cartridge picker that transports the media cartridge to and from the media drive and the first and second media cartridge transport magazines, (ii) a magazine drive motor that drives the first and second media cartridge transport magazines, (iii) a first magazine locking mechanism that includes a first locking member to engage the first media cartridge transport magazine, (iv) a second magazine locking mechanism that includes a second locking member to engage the second media cartridge transport magazine, and (v) a rotation transmission path forming unit that selectively transmits a rotational force of the magazine drive motor to one of the first media cartridge transport magazine, the second media cartridge transport magazine, the first magazine locking mechanism, and the second magazine locking mechanism, in accordance with a command;
   wherein one of the first and second magazine locking members is selectively moved with the rotational force of the magazine drive motor transmitted by the rotation transmission path forming unit so as to disengage the corresponding first or second media cartridge transport magazine.

2. The media cartridge autoloader as claimed in claim 1, wherein the first magazine locking mechanism further includes a first magazine rack member through whose movement the first magazine locking member is moved so as to disengage the first media cartridge transport magazine;
   the second magazine locking mechanism further includes a second magazine rack member through whose movement the second magazine locking member is moved so as to disengage the second media cartridge transport magazine;
   the rotation transmission path forming unit includes (i) a drive shaft unit that is movable in a lateral direction, and includes a drive shaft, first and second drive gears provided first and second ends of the drive shaft, a swing arm supported by the drive shaft, and a swing pinion supported by the swing arm and configured to engage a gear attached to the drive shaft, and (ii) a drive shaft unit shifter that moves the drive shaft unit in the lateral direction; and
   the drive shaft unit shifter is configured
   to move the drive shaft unit such that the first drive gear provided on the first end of the drive shaft engages a gear provided on the first media cartridge transport magazine at the time of operating the first media cartridge transport magazine,
   to move the drive shaft unit such that the second drive gear provided on the second end the drive shaft engages a gear provided on the second media cartridge transport magazine at the time of operating the second media cartridge transport magazine,
   to move the drive shaft unit such that the swing pinion faces the first magazine rack member, rotate the swing arm with rotation of the magazine drive motor such that the swing pinion engages a first rack section formed on the first magazine rack member, and move the first magazine locking member through the movement of the first magazine rack member so as to disengage the first media cartridge transport magazine, at the time of operating the first magazine locking mechanism, and
   to move the drive shaft unit such that the swing pinion faces the second magazine rack member, rotate the swing arm with rotation of the magazine drive motor such that the swing pinion engages a second rack section formed on the second magazine rack member, and move the second magazine locking member through the movement of the second magazine rack member so as to disengage the second media cartridge transport magazine, at the time of operating the second magazine locking mechanism.

3. The media cartridge autoloader as claimed in claim 2, wherein the media cartridge picker includes a turntable that supports the media cartridge, and a turntable motor that rotates the turntable so as to change the orientation of the media cartridge; and
   the drive shaft unit shifter is driven with a driving force of the turntable motor.

4. The media cartridge autoloader as claimed in claim 2, wherein the media cartridge picker includes a turntable that supports the media cartridge, a turntable motor that rotates the turntable so as to change the orientation of the media cartridge, and a sensor that detects a rotating angle of the turntable with respect to a home position of the turntable; and
   the drive shaft unit shifter is driven with a driving force of the turntable motor, and a timing to stop operations of the drive shaft unit shifter is determined in accordance with a detection by the sensor.

5. The media cartridge autoloader as claimed in claim 2, wherein the first magazine locking mechanism further includes a first spring member to move back the first magazine rack member to an original position thereof;
   the second magazine locking mechanism further includes a second spring member to move back the second magazine rack member to an original position thereof; and
   the first or second spring member moves back the corresponding first or second magazine rack member to the corresponding original position when the swing pinion is separated from the first or second rack section of the first or second rack member.

6. The media cartridge autoloader as claimed in claim 2, wherein the swing arm includes a first swing arm disposed at the first side of the drive shaft, and a second swing arm disposed at the second side of the drive shaft;
the swing pinion includes a first swing pinion supported by the first swing arm, and a second swing pinion supported by the second swing arm; and
the drive shaft unit shifter is configured to move the drive shaft unit such that the first swing pinion engages the first rack section of the first magazine rack member, and to move the drive shaft unit such that the second swing pinion engages the second rack section of the second magazine rack member.

7. The media cartridge autoloader as claimed in claim 1, wherein the main module further includes a base; and
the first and second magazine locking mechanisms are disposed on a lower face of the base.

8. The media cartridge autoloader as claimed in claim 2, wherein the main module and the first media cartridge transport magazine are arranged to have a first gap therebetween, across which the first magazine locking member extends;
the main module and the second media cartridge transport magazine are arranged to have a second gap therebetween, across which the second magazine locking member extends;
the first magazine locking member disengages the first media cartridge transport magazine when a plate member is inserted into the first gap to push and move the first magazine locking member; and
the second magazine locking member disengages the second media cartridge transport magazine when the plate member is inserted into the second gap to push and move the second magazine locking member.

9. A main module for a media cartridge autoloader, the media cartridge autoloader including a media drive that receives a media cartridge, a first media cartridge transport magazine that releasably engages the main module, the first media transport magazine including a media cartridge container, the first media cartridge transport magazine movably storing the media cartridge in the media cartridge container, the main module comprising:
a drive motor that generates a rotational force;
a first magazine locking mechanism that selectively inhibits disengagement of the first media cartridge transport magazine from the main module; and
a rotation transmission path forming unit that translates the rotational force of the drive motor to alternately drive movement of (i) the first media cartridge transport magazine to move the media cartridge container, and (ii) the first magazine locking mechanism to allow disengagement of the first media cartridge transport magazine from the main module.

10. The main module as claimed in claim 9, wherein the media cartridge autoloader includes a second media cartridge transport magazine that is releasably engaged to the main module, the second media cartridge transport magazine movably storing the media cartridge;
wherein the main module further comprises a second magazine locking mechanism that inhibits disengagement of the second media cartridge transport magazine from the main module.

11. The main module as claimed in claim 10, wherein the rotation transmission path forming unit translates the rotational force of the drive motor to selectively drive movement of (a) the second media cartridge transport magazine, and (b) the second magazine locking mechanism to allow disengagement of the second media cartridge transport magazine from the main module.

12. The main module as claimed in claim 11, wherein the rotation transmission path forming unit includes (i) a drive shaft unit, and (ii) a drive shaft unit shifter that moves the drive shaft unit along an axis; and
wherein the extent and direction of movement of the drive shaft unit along the axis determines the structure to which the rotational force of the drive motor is translated.

13. The main module as claimed in claim 12, wherein the drive shaft unit includes a first drive gear that selectively engages and moves a portion of the first media cartridge transport magazine, and a second drive gear that and selectively engages and moves a portion of the second media cartridge transport magazine.

14. The main module as claimed in claim 13, wherein at least one of the first drive gear and the second drive gear rotates substantially about the axis.

15. The main module as claimed in claim 12, wherein the drive shaft unit shifter moves the drive shaft unit to alternately engage the first media cartridge transport magazine and the second media cartridge transport magazine.

16. The main module as claimed in claim 12, further comprising a media cartridge picker including a turntable that supports the media cartridge and a turntable motor that rotates the turntable to change the orientation of the media cartridge.

17. The main module as claimed in claim 16, wherein the drive shaft unit shifter is driven with a driving force generated by the turntable motor.

18. The main module as claimed in claim 12, further comprising a media cartridge picker including a turntable that supports the media cartridge, a turntable motor that rotates the turntable to change the orientation of the media cartridge, and a sensor that detects a rotating angle of the turntable relative to a home position of the turntable.

19. The main module as claimed in claim 18, wherein the drive shaft unit shifter is driven with a driving force generated by the turntable motor, and a timing to stop movement of the drive shaft unit shifter is based at least partially on the rotating angle detected by the sensor.

20. The main module as claimed in claim 9, wherein the main module further includes a base having a lower face, and wherein the first magazine locking mechanism is disposed on the lower face of the base.

21. The main module as claimed in claim 9, wherein the main module and the first media cartridge transport magazine are arranged to have a first gap therebetween when the first media cartridge transport magazine and the main module are engaged, the first magazine locking mechanism extending across the gap, and wherein the first magazine locking mechanism disengages the first media cartridge transport magazine when a plate member is inserted into the first gap to move the first magazine locking member relative to the first media cartridge transport magazine.

22. A method for operating a media cartridge autoloader having a first media cartridge transport magazine that selectively stores a media cartridge in a media cartridge container, the method comprising the steps of:
generating a rotational force with a drive motor;

selectively inhibiting disengagement between the first media cartridge transport magazine and the main module with a first magazine locking mechanism; and selectively moving a rotation transmission path forming unit so that the drive motor alternately drives movement of (i) the first media cartridge transport magazine to move the media cartridge container, and (ii) the first magazine locking mechanism to allow disengagement between the first media cartridge transport magazine and the main module.

* * * * *